(12) United States Patent
Ohkawa

(10) Patent No.: US 6,921,178 B2
(45) Date of Patent: Jul. 26, 2005

(54) SURFACE LIGHT DEVICE, IMAGE DISPLAY DEVICE AND LIGHT GUIDE PLATE

(75) Inventor: Shingo Ohkawa, Saitama (JP)

(73) Assignee: Enplas Corporation, Saitama (JP)

( * ) Notice: Subject to any disclaimer, the term of this patent is extended or adjusted under 35 U.S.C. 154(b) by 95 days.

(21) Appl. No.: 10/380,230

(22) PCT Filed: Jul. 26, 2002

(86) PCT No.: PCT/JP02/07594
§ 371 (c)(1),
(2), (4) Date: Mar. 11, 2003

(87) PCT Pub. No.: WO03/010466
PCT Pub. Date: Feb. 6, 2003

(65) Prior Publication Data
US 2003/0174492 A1 Sep. 18, 2003

(30) Foreign Application Priority Data

| Jul. 27, 2001 | (JP) | ................................ 2001-228670 |
| Feb. 27, 2002 | (JP) | ................................ 2002-50858 |
| Apr. 18, 2002 | (JP) | ................................ 2002-116329 |
| Jun. 28, 2002 | (JP) | ................................ 2002-190053 |

(51) Int. Cl.$^7$ ............................................. F21V 8/00
(52) U.S. Cl. .................. 362/31; 362/330; 362/620; 362/626
(58) Field of Search ............... 362/26, 31, 330, 362/558, 561; 349/64, 65

(56) References Cited

U.S. PATENT DOCUMENTS

| 4,460,940 | A | * | 7/1984 | Mori ........................... 362/558 |
| 5,521,796 | A | | 5/1996 | Osakada et al. |
| 5,719,649 | A | * | 2/1998 | Shono et al. ............... 349/65 |
| 5,779,337 | A | * | 7/1998 | Saito et al. ................ 362/31 |
| 5,926,601 | A | * | 7/1999 | Tai et al. ................... 349/64 |
| 6,347,873 | B1 | * | 2/2002 | Hosseini et al. ............ 362/31 |
| 6,712,481 | B2 | * | 3/2004 | Parker et al. .............. 362/31 |

FOREIGN PATENT DOCUMENTS

| EP | 0 544 332 | 6/1993 |
| EP | 1 072 907 | 1/2001 |
| JP | 8-29624 | 2/1996 |
| JP | 10-268138 | 10/1998 |
| JP | 2000305073 | 2/2000 |
| WO | WO 98/27382 | 6/1998 |

* cited by examiner

Primary Examiner—Alan Cariaso
(74) Attorney, Agent, or Firm—Bachman & LaPointe, P.C.

(57) ABSTRACT

LEDs 5 serving as light sources are arranged so as to face an incidence surface 4 of a light guide plate 3. Light emitted from the LEDs 5 is incident on the incidence surface 4 of the light guide plate 3 to enter the light guide plate 3 to be propagated through the light guide plate 3. When the angle of incidence of the light on an emission surface 6 of the light guide plate 3 is a critical angle or less while the light is propagated, the light leaves the emission surface 6. On at least one of the emission surface 6 of the light guide plate 6 and a surface 10 opposite to the emission surface 6 of the light guide plate 6, a large number of prism protrusions 12 extending in parallel to such a direction that a distance from the incidence surface 4 increases are formed along the incidence surface 4. A side-face side portion 10b of the prism protrusions 12 is formed so as to have a height gradually decreasing as a distance from the incidence surface 4 decreases. With this construction, even if the LEDs are used as light sources, abnormal emission can be suppressed in the vicinity of the incidence surface of the light guide plate, and the luminance of exiting light can be uniform.

93 Claims, 35 Drawing Sheets

FIG. 16A
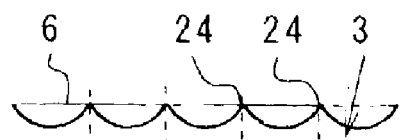
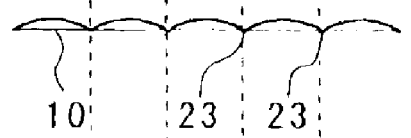
FIG. 16B
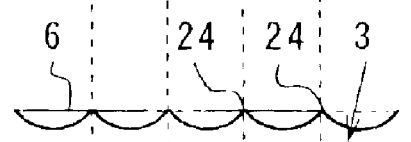
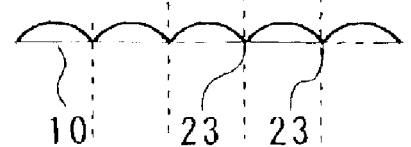
FIG. 16C
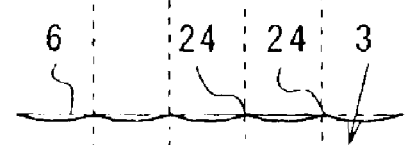
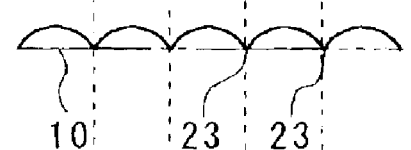
FIG. 16D
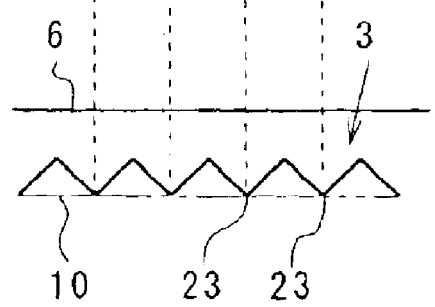

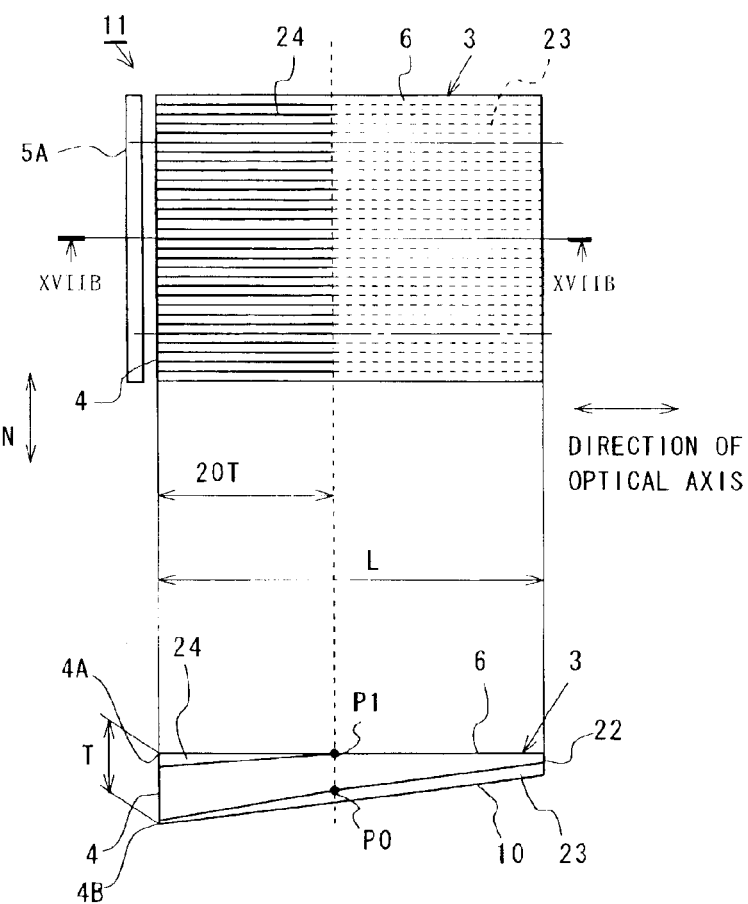

FIG. 18A
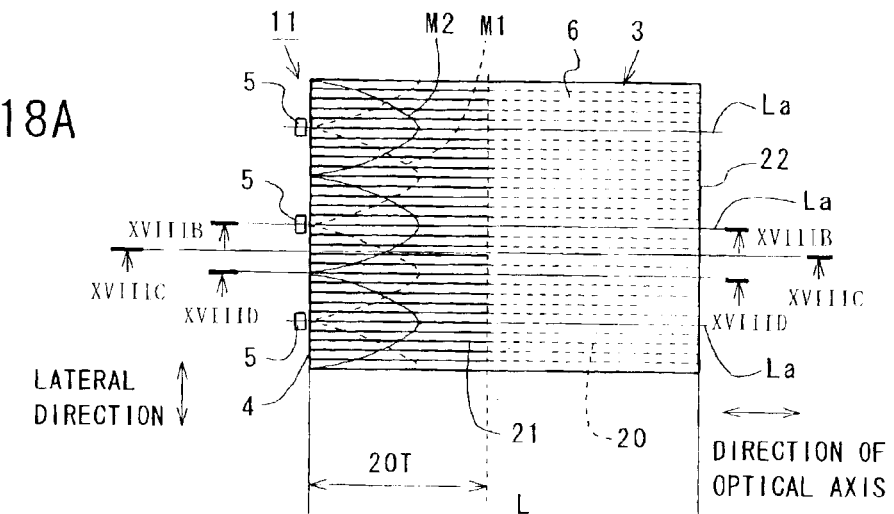
FIG. 18B
FIG. 18C
FIG. 18D
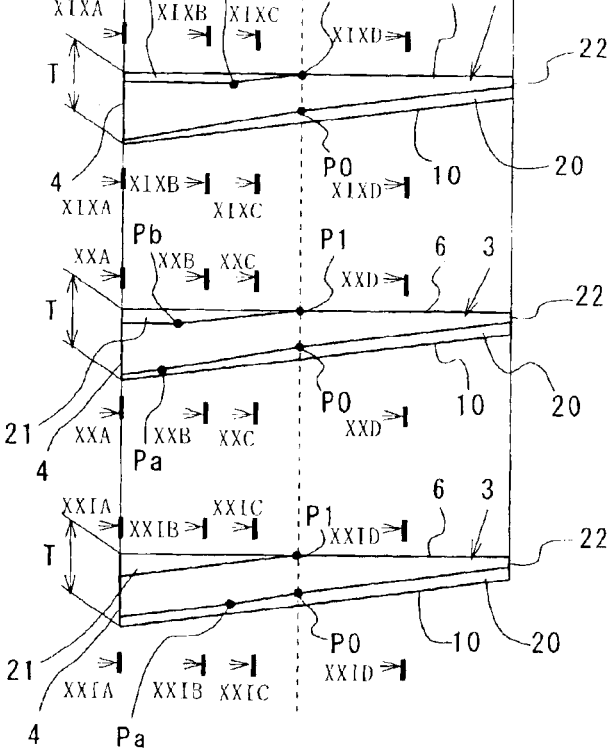

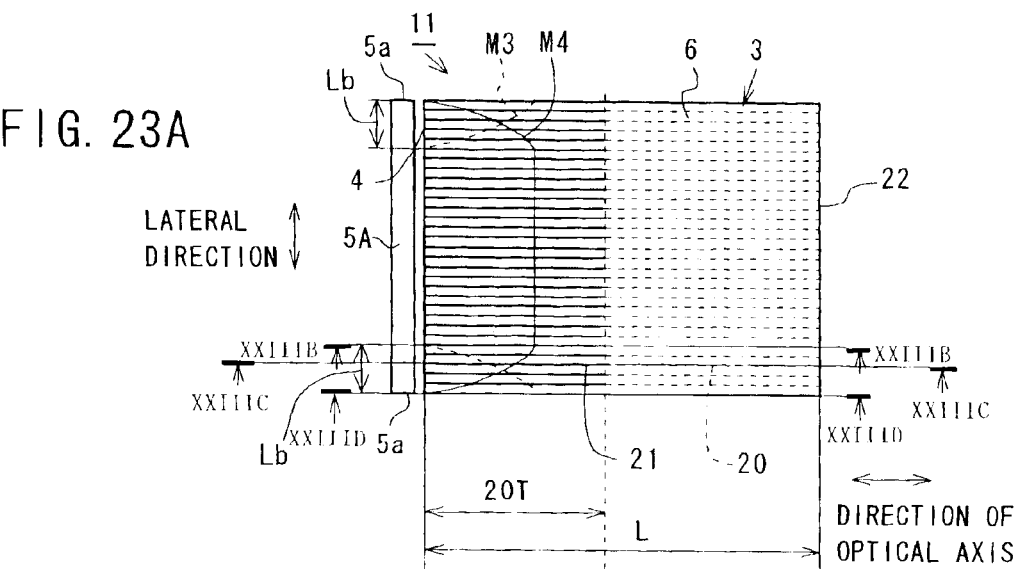
FIG. 23A
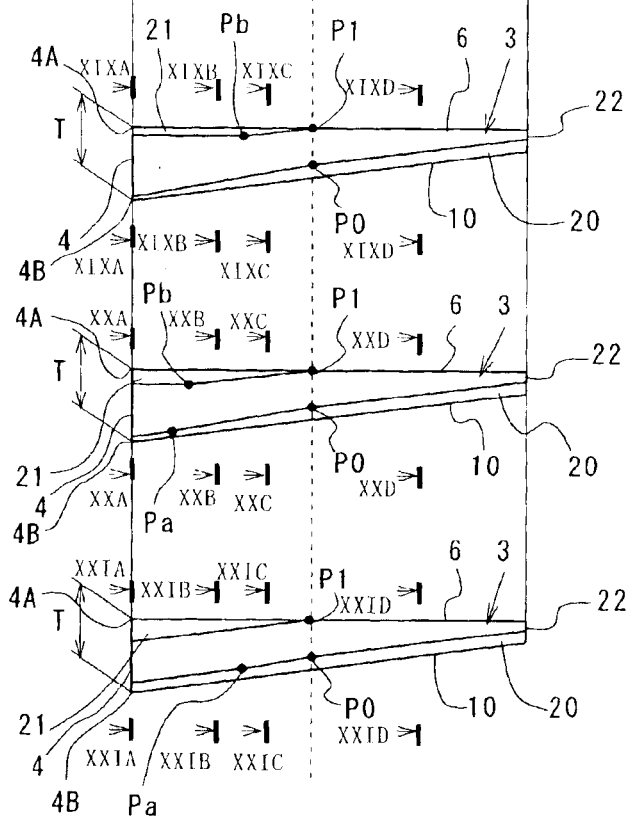
FIG. 23B
FIG. 23C
FIG. 23D

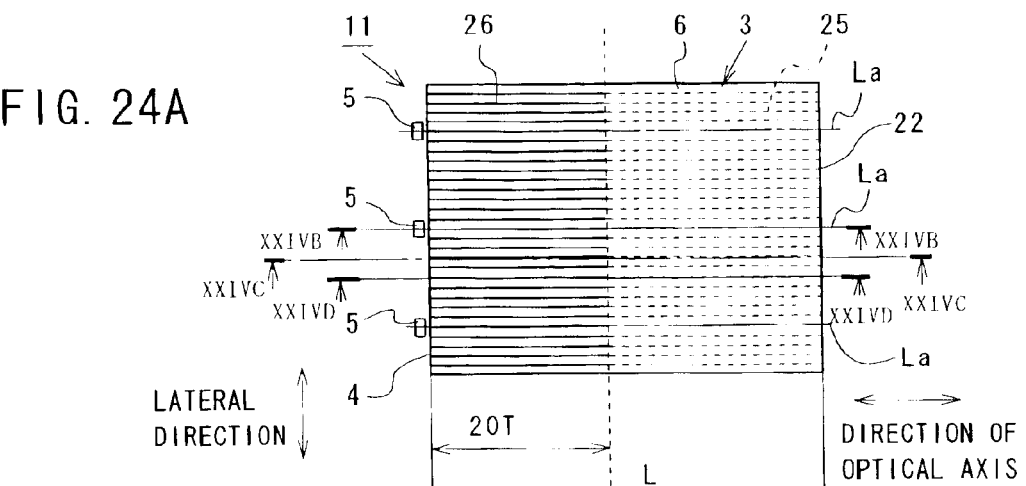
FIG. 24A
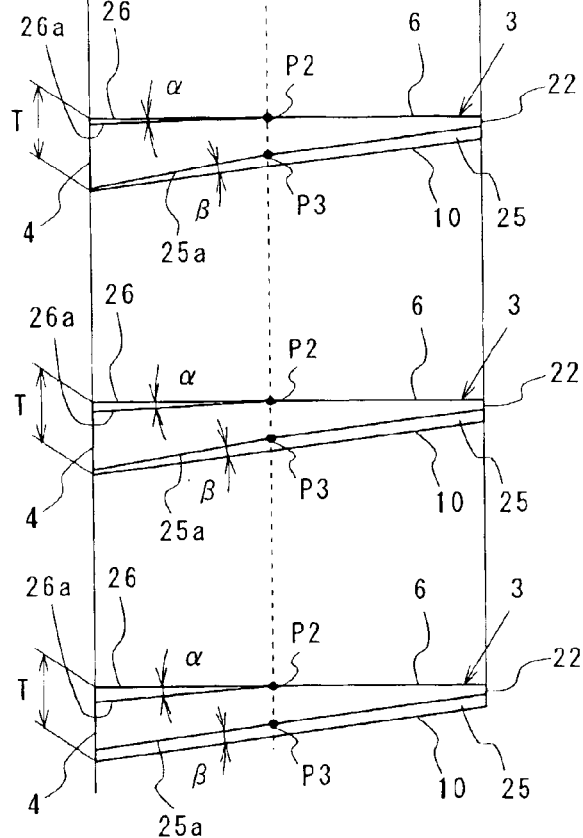
FIG. 24B
FIG. 24C
FIG. 24D

FIG. 26A
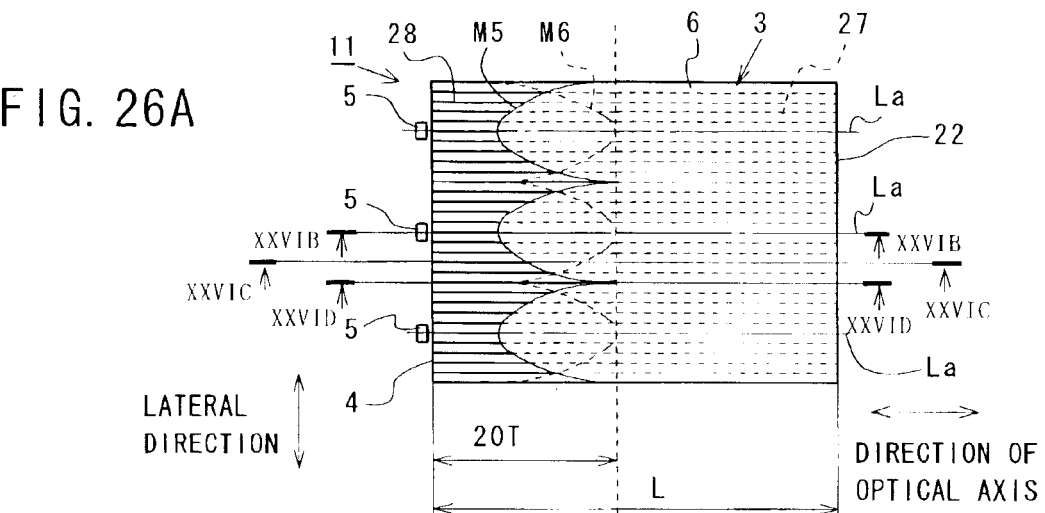
FIG. 26B
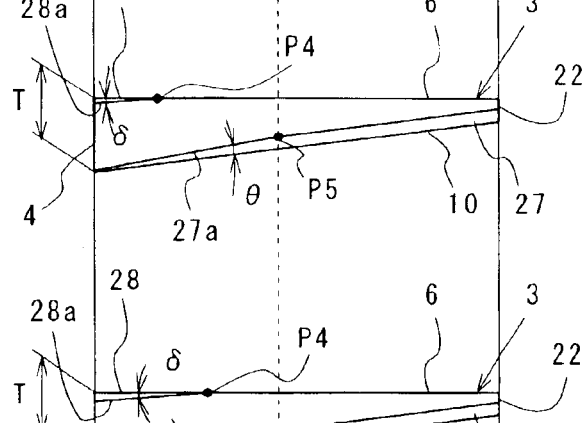
FIG. 26C
FIG. 26D
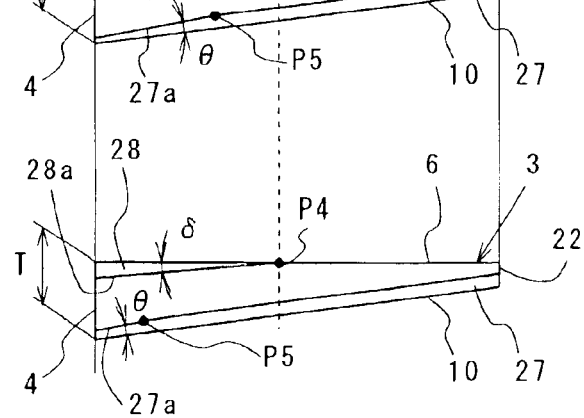

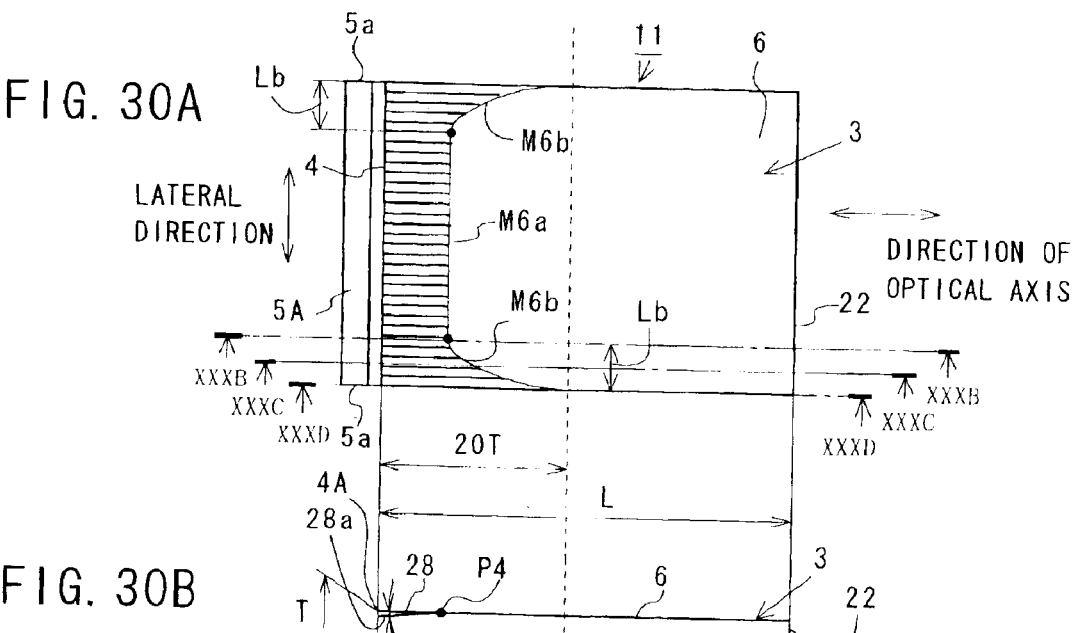
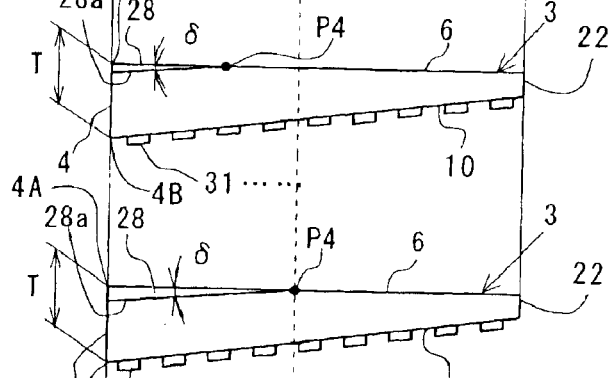
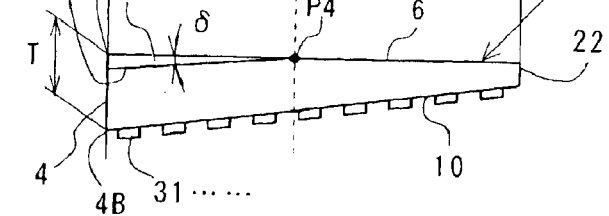

LATERAL DIRECTION

DIRECTION OF OPTICAL AXIS

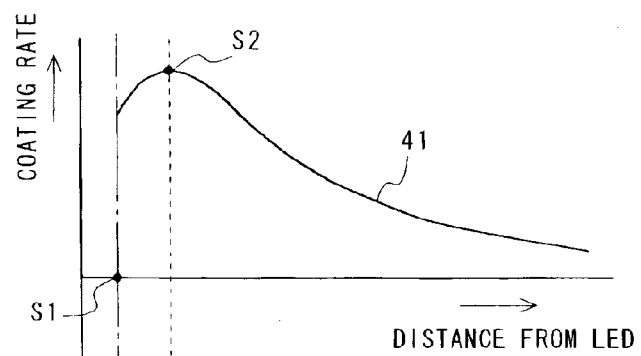
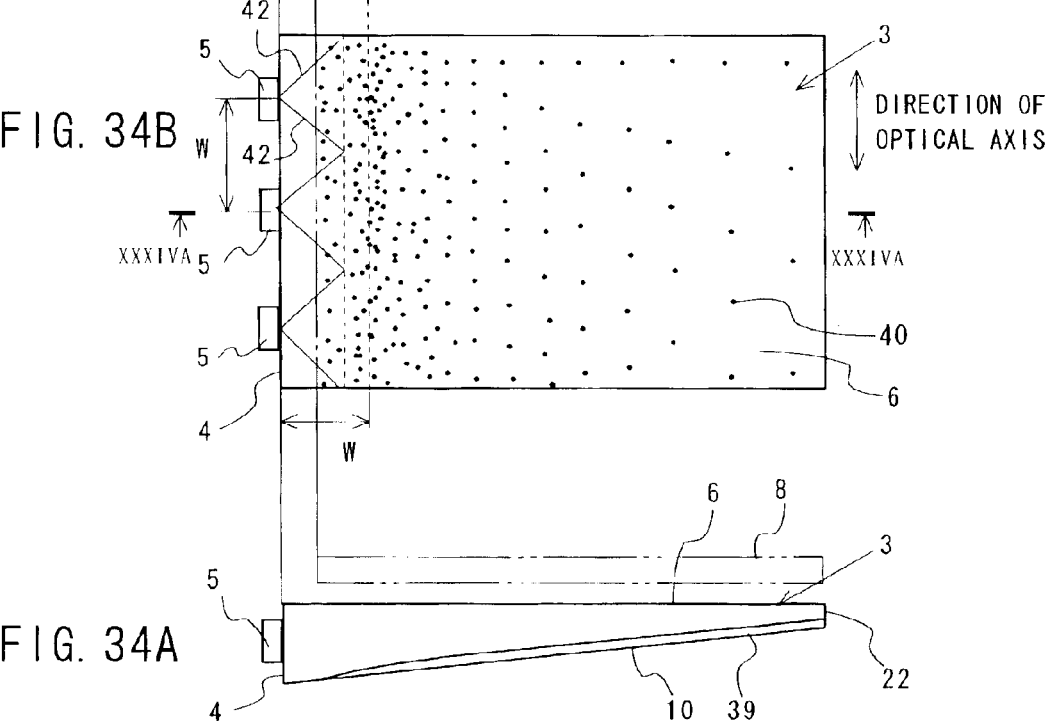

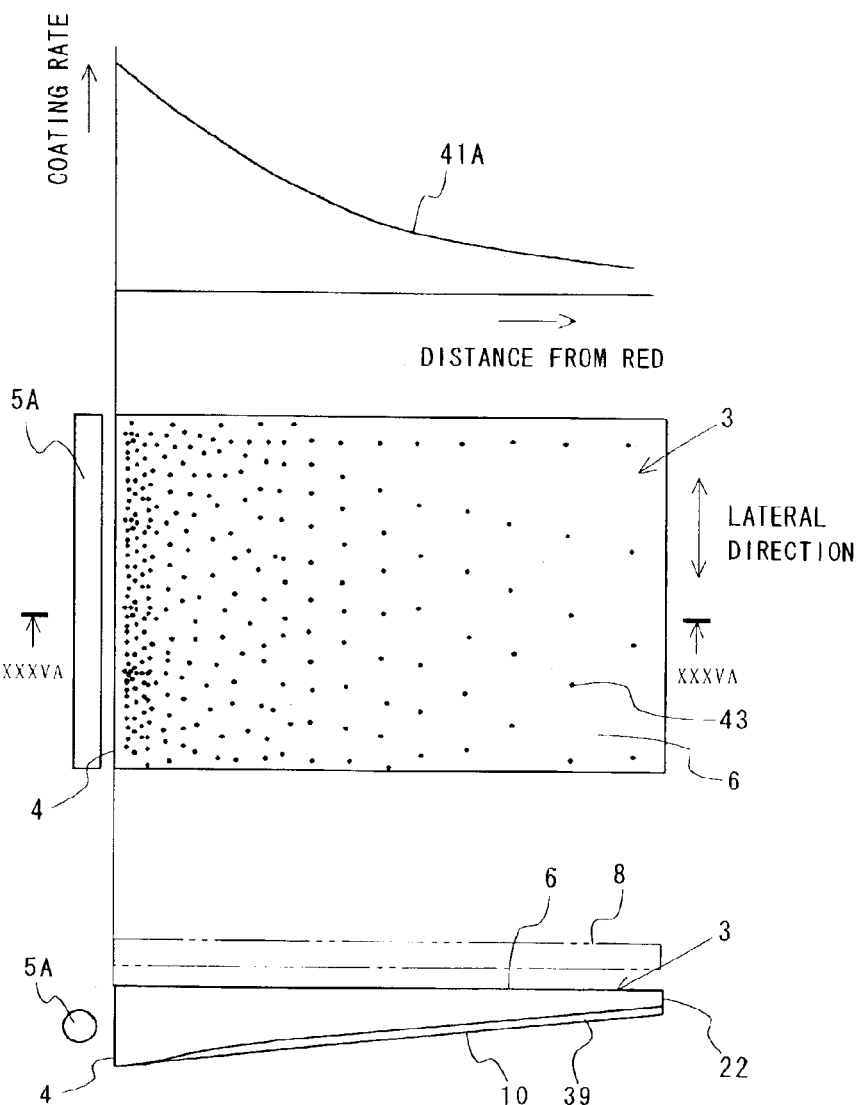

PRIOR ART

PRIOR ART

SURFACE LIGHT DEVICE, IMAGE DISPLAY DEVICE AND LIGHT GUIDE PLATE

TECHNICAL FIELD

The present invention relates to a surface light source device used as a back light or the like for illuminating a plane of a liquid crystal display panel (a member to be illuminated), in portable telephones, portable electronic terminal units, electronic notebooks, car navigation systems, digital cameras, videotape recorders, personal computers, televisions and various office appliances, an image display unit having the surface light source device, and a light guide plate used for the surface light source or image display unit.

BACKGROUND ART

A typical one of surface light source devices used for portable telephones, portable electronic terminal units and so forth, has a fluorescent lamp on a side of the side face (on the side of an incidence surface) of a light guide plate as a light source, to emit light to a plane from the fluorescent lamp through the light guide plate to irradiate a liquid crystal display panel with the exiting light. Such a surface light source device is combined with the liquid crystal display panel to form an image display unit. In order to improve the luminance of the surface light source device, various devices have been made to the light guide plate. As one of them, the applicant of the present application has proposed a surface light source device wherein a large number of prisms-like protrusions extending in directions substantially perpendicular to an incidence surface of a light guide plate (see, e.g., Japanese Patent Laid-Open No. 10-268138).

By the way, in recent years, in order to improve the user's handling of portable telephones, portable electronic terminal units and so forth, it has been attempted to increase a display screen as large as possible while decreasing the thickness and weight of the telephone or unit body. In such a technical background, there has been developed a surface light source device which uses light emitting diodes (LEDs) as point light sources to decrease a light source housing space to increase the size of a display screen by the decrease of the light source housing space. In addition, portable telephones, portable electronic terminal units and so forth using the surface light source device have been put on the market.

FIGS. 40 and 41 show an example of a surface light source device 101 using LEDs 100 as light sources in the above described light guide plate having a large number of prism-like protrusions. As shown in these figures, the surface light source device 101 has a plurality of LEDs 100 which face a side face (an incidence surface) 103 of a light guide plate 102. A back surface (a surface opposite to an emission surface 106) of the surface light source device 101 is formed with a large number of prism protrusions 104 extending in directions substantially perpendicular to the incidence surface 103 of the light guide plate 102. The prism protrusions 104 are designed to reflect light L, which is propagated through the light guide plate 102, to condense the light L, which leaves the emission surface 106 of the light guide plate 102, in a direction substantially normal to the emission surface 106 to enhance luminance (see FIG. 42).

However, if a fluorescent lamp is substituted for the LEDs 100 as a light source for such a light guide plate 102, there are some cases where V-shaped abnormal emissions (bright lines) H are produced at positions, which substantially correspond to the LEDs 100, in the vicinity of the incidence surface 103 to remarkably damage the quality of illumination when the light guide plate 102 is viewed from the side of the emission surface 106 as shown in FIG. 40. The reasons for this are considered that the LEDs 100 have directivity unlike fluorescent lamps and that the light L propagated through the light guide plate 102 is easily reflected on the prism protrusions 104, which are positioned in the vicinity of the incidence surface, to leave the emission surface in a specific direction.

As shown in FIGS. 43 and 44, in a surface light source device for use in a portable telephone, portable electronic terminal unit or the like, a fluorescent lamp 100A is arranged on the side of the side face (the incidence surface 103) of the light guide plate 102 for emitting light to a plane through the light guide plate 102 to irradiate a liquid display panel (not shown) with the emitted light. Such a surface light source device 101 is combined with the liquid crystal display panel (not shown), which is arranged so as to face the emission surface 106 of the light guide plate 102, to form an image display unit. In such a surface light source device 101, the light guide plate has been conventionally devised in various ways. For example, a large number of prism protrusions 104 extending in directions substantially perpendicular to the incidence surface 103 of the light guide plate 102 are formed on the back surface 105 of the light guide plate 102 to utilize the light reflecting function of the prism protrusions 104 for enhancing the luminance of illuminating light (see, e.g., Japanese Patent Laid-Open No. 10-268138).

However, in such a surface light source device 101 using the fluorescent lamp 100A as a linear light source, there is a structural problem in that darker portions (low luminance portions 110 shown by slant lines in FIG. 43) than other portions are easily caused in both end portions on the side of the incidence surface 103 of the light guide plate 102 since electrode portions positioned in both end portions of the fluorescent lamp 100A do not emit light. As shown in FIGS. 43 and 44, in such a surface light source device, there is a problem in that light beams H1 and H2 incident on upper and lower edge portions 103A and 103B of the incidence surface 103 of the light guide plate 102 are easy to leave portions of the emission surface 106 in the vicinity of the incidence surface as brightly shining lines (bright lines) 111 (are easy to be visually recognized). In recent years, such problems of the surface light source device 101 are highlighted in the industry since it is required to increase the effective emission area of the light guide plate 102 (the area of the emission surface capable of being used for emitting uniform surface illuminating light) as large as possible in order to increase the size of the display screen.

DISCLOSURE OF THE INVENTION

It is therefore an object of the present invention to suppress abnormal emission in the vicinity of an incidence surface of a light guide plate and surface light source device using LEDs as point light sources or using a fluorescent lamp as a linear light source to cause the luminance of exiting light to be uniform. It is another object of the present invention to improve the quality of illumination of an image display unit having such a light guide plate and surface light source device.

According to one aspect of the present invention, a surface light source device comprises: a light guide plate having a side face and an emission surface; and a light source, arranged on the side face of the light guide plate, for emitting light which enters the light guide plate to be propagated through the light guide and which leaves the emission surface of the light guide plate when an angle of incidence of the light on the emission surface is a critical angle or less while the light is propagated, wherein the light guide plate has a large number of first prism protrusions which are formed on one of the emission surface of the light guide plate and a surface opposite to the emission surface of the light guide plate to extend in parallel to such a direction that a distance from the side face increases and which are arranged along the side face, and part of the first prism protrusions on the side of the side face have a height having a tendency to gradually decrease as a distance from the side face decreases. The expression "a height having a tendency to gradually decrease" means that part of prism protrusions also include a portion in which the height of the prism protrusions is constant (in a range from a side face 4 to a point Pa) as shown in, e.g., FIGS. 18C and 18D.

In this surface light source device, the light source may be a point light source or a linear light source. The same prism protrusions as the first prism protrusions formed on the one of the emission surface of the light guide plate and the surface opposite to the emission surface of the light guide plate may be formed on the other of the emission surface of the light guide plate and the surface opposite to the emission surface of the light guide plate. The surface on which the first prism protrusions are formed may be flat in the vicinity of the side face. Part of the first prism protrusions on the side of the side face may include a portion in which a groove between adjacent two of the first prism protrusions has a substantially circular-arc-shaped cross section. If the light source is the point light source, the first prism protrusions preferably have a height which is minimum on an optical axis of the point source and which gradually increases as a distance from the optical axis of the point light source increases in directions in parallel to the side face, in at least the vicinity of the side face. If the light source is the linear light source, the first prism protrusions preferably have a height which gradually increases in a direction from a vicinity of each of both end portions of the linear light source toward a corresponding one of the both end portions of the linear light source, in at least the vicinity of the side face.

In this surface light source device, the light guide plate may have second prism protrusions which are formed on the other of the emission surface of the light guide plate and the surface opposite to the emission surface of the light guide plate, the second prism protrusions having a height which has a tendency to gradually decrease as a distance from the side face increases and which is zero at a position being a predetermined distance away from the side face, and the second prism protrusions including a portion in which a groove between adjacent two of the second prism protrusions has a substantially circular-arc-shaped cross section. If the light source is the point light source, the second prism protrusions preferably have a height which is minimum on an optical axis of the point source and which gradually increases as a distance from the optical axis of the point light source increases in directions in parallel to the side face, in at least the vicinity of the side face. If the light source is the linear light source, the second prism protrusions preferably have a height which gradually increases in a direction from a vicinity of each of both end portions of the linear light source toward a corresponding one of the both end portions of the linear light source, in at least the vicinity of the side face.

In the above described surface light source device, the light guide plate may have a large number of second prism protrusions which are formed on the other of the emission surface of the light guide plate and the surface opposite to the emission surface of the light guide plate to extend in parallel to such a direction that a distance from the side face increases and which are arranged along the side face, and the second prism protrusions may have a height which has a tendency to gradually decrease as a distance from the side face increases and which is zero at a position being a predetermined distance away from the side face. The expression "a height which has a tendency to gradually decrease" means that part of prism protrusions also include a portion in which the height of the prism protrusions is constant (in a range from a side face 4 to a point Pb) as shown in, e.g., FIGS. 18B and 18C. In this case, the second prism protrusions preferably include a portion in which a groove between adjacent two of the second prism protrusions has a substantially circular-arc-shaped cross section. If the light source is the point light source, the second prism protrusions preferably have a height which is minimum on an optical axis of the point source and which gradually increases as a distance from the optical axis of the point light source increases in directions in parallel to the side face, in at least the vicinity of the side face. If the light source is the linear light source, the second prism protrusions preferably have a height which gradually increases in a direction from a vicinity of each of both end portions of the linear light source toward a corresponding one of the both end portions of the linear light source, in at least the vicinity of the side face. In this surface light source device, part of the first prism protrusions on the side of the side face preferably include a portion in which a groove between adjacent two of the first prism protrusions has a substantially circular-arc-shaped cross section. If the light source is the point light source, the first prism protrusions preferably have a height which is minimum on an optical axis of the point source and which gradually increases as a distance from the optical axis of the point light source increases in directions in parallel to the side face, in at least the vicinity of the side face. If the light source is the linear light source, the first prism protrusions preferably have a height which gradually increases in a direction from a vicinity of each of both end portions of the linear light source toward a corresponding one of the both end portions of the linear light source, in at least the vicinity of the side face.

In the above described surface light source device, a roughened surface capable of irregularly reflecting or diffusing light may be formed on at least one of the emission surface of the light guide plate and the surface opposite to the emission surface of the light guide plate, and part of the first prism protrusions on the side of the side face may include a portion in which a groove between adjacent two of the first prism protrusions has a substantially circular-arc-shaped cross section.

According to another aspect of the present invention, a surface light source device comprises: a light guide plate having a side face and an emission surface; and a light source, arranged on the side face of the light guide plate, for emitting light which enters the light guide plate to be propagated through the light guide and which leaves the emission surface of the light guide plate when an angle of incidence of the light on the emission surface is a critical angle or less while the light is propagated, wherein the light guide plate has a large number of prism protrusions which are formed on one of the emission surface of the light guide plate and a surface opposite to the emission surface of the light guide plate to extend in parallel and which are arranged along the side face, the prism protrusions having a height which has a tendency to gradually decrease as a distance from the side face increases and which is zero at a position being a predetermined distance away from the side face, the light guide plate has a roughened surface which is formed on at least one of the emission surface of the light guide plate and the surface opposite to the emission surface of the light guide plate, the roughened surface being capable of irregularly reflecting or diffusing light, and the prism protrusions include a portion in which a groove between adjacent two of the prism protrusions has a substantially circular-arc-shaped cross section.

In this surface light source device, the light source may be a point light source or a linear light source. If the light source is the point light source, the prism protrusions preferably have a height which is minimum on an optical axis of the point source and which gradually increases as a distance from the optical axis of the point light source increases in directions in parallel to the side face, in at least the vicinity of the side face. If the light source is the linear light source, the prism protrusions preferably have a height which gradually increases in a direction from a vicinity of each of both end portions of the linear light source toward a corresponding one of the both end portions of the linear light source, in at least the vicinity of the side face.

According to one aspect of the present invention, a light guide plate comprises: a side face on which light emitted from a light source is incident; and an emission surface for allowing the light, which is incident on the side face to be propagated through the light guide plate, to leave the light guide plate when an angle of incidence of the light on the emission surface is a critical angle or less while the light is propagated, wherein a large number of first prism protrusions are formed on one of the emission surface of the light guide plate and a surface opposite to the emission surface of the light guide plate to extend in parallel to such a direction that a distance from the side face increases, and are arranged along the side face, and part of the first prism protrusions on the side of the side face have a height having a tendency to gradually decrease as a distance from the side face decreases.

In this light guide plate, the light source may be a point light source or a linear light source. The same prism protrusions as the first prism protrusions formed on the one of the emission surface of the light guide plate and the surface opposite to the emission surface of the light guide plate may be formed on the other of the emission surface of the light guide plate and the surface opposite to the emission surface of the light guide plate. The surface on which the first prism protrusions are formed may be flat in the vicinity of the side face. If the light source is the point light source, the first prism protrusions preferably have a height which is minimum on an optical axis of the point source and which gradually increases as a distance from the optical axis of the point light source increases in directions in parallel to the side face, in at least the vicinity of the side face. If the light source is the linear light source, the first prism protrusions preferably have a height which gradually increases in a direction from a vicinity of each of both end portions of the linear light source toward a corresponding one of the both end portions of the linear light source, in at least the vicinity of the side face.

In this light guide plate, second prism protrusions may be formed on the other of the emission surface of the light guide plate and the surface opposite to the emission surface of the light guide plate, the second prism protrusions having a height which has a tendency to gradually decrease as a distance from the side face increases and which is zero at a position being a predetermined distance away from the side face, and the second prism protrusions including a portion in which a groove between adjacent two of the second prism protrusions has a substantially circular-arc-shaped cross section. If the light source is the point light source, the second prism protrusions preferably have a height which is minimum on an optical axis of the point source and which gradually increases as a distance from the optical axis of the point light source increases in directions in parallel to the side face, in at least the vicinity of the side face. If the light source is the linear light source, the second prism protrusions preferably have a height which gradually increases in a direction from a vicinity of each of both end portions of the linear light source toward a corresponding one of the both end portions of the linear light source, in at least the vicinity of the side face.

In the above described light guide plate, a large number of second prism protrusions may be formed on the other of the emission surface and the surface opposite to the emission surface to extend in parallel to such a direction that a distance from the side face increases, and may be arranged along the side face, and the second prism protrusions may have a height which has a tendency to gradually decrease as a distance from the side face increases and which is zero at a position being a predetermined distance away from the side face. In this case, the second prism protrusions preferably include a portion in which a groove between adjacent two of the second prism protrusions has a substantially circular-arc-shaped cross section. If the light source is the point light source, the second prism protrusions preferably have a height which is minimum on an optical axis of the point source and which gradually increases as a distance from the optical axis of the point light source increases in directions in parallel to the side face, in at least the vicinity of the side face. If the light source is the linear light source, the second prism protrusions preferably have a height which gradually increases in a direction from a vicinity of each of both end portions of the linear light source toward a corresponding one of the both end portions of the linear light source, in at least the vicinity of the side face. In this light guide plate, part of the first prism protrusions on the side of the side face preferably include a portion in which a groove between adjacent two of the first prism protrusions has a substantially circular-arc-shaped cross section. If the light source is the point light source, the first prism protrusions preferably have a height which is minimum on an optical axis of the point source and which gradually increases as a distance from the optical axis of the point light source increases in directions in parallel to the side face, in at least the vicinity of the side face. If the light source is the linear light source, the first prism protrusions preferably have a height which gradually increases in a direction from a vicinity of each of both end portions of the linear light source toward a corresponding one of the both end portions of the linear light source, in at least the vicinity of the side face.

In the above described light guide plate, a roughened surface capable of irregularly reflecting or diffusing light may be formed on at least one of the emission surface and the surface opposite to the emission surface, and part of the first prism protrusions on the side of the side face may include a portion in which a groove between adjacent two of the first prism protrusions has a substantially circular-arc-shaped cross section.

According to another aspect of the present invention, a light guide plate comprises: a side face on which light emitted from a light source is incident; and an emission surface for allowing the light, which is incident on the side face to be propagated through the light guide plate, to leave the light guide plate when an angle of incidence of the light on the emission surface is a critical angle or less while the light is propagated, wherein a large number of prism protrusions are formed on one of the emission surface and a surface opposite to the emission surface to extend in parallel and are arranged along the side face, the prism protrusions having a height which has a tendency to gradually decrease as a distance from the side face increases and which is zero at a position being a predetermined distance away from the side face, a roughened surface is formed on at least one of the emission surface of the light guide plate and the surface opposite to the emission surface, the roughened surface being capable of irregularly reflecting or diffusing light, and the prism protrusions include a portion in which a groove between adjacent two of the prism protrusions has a substantially circular-arc-shaped cross section.

In this light guide plate, the light source may be a point light source or a linear light source. If the light source is the point light source, the prism protrusions preferably have a height which is minimum on an optical axis of the point source and which gradually increases as a distance from the optical axis of the point light source increases in directions in parallel to the side face, in at least the vicinity of the side face. If the light source is the linear light source, the prism protrusions preferably have a height which gradually increases in a direction from a vicinity of each of both end portions of the linear light source toward a corresponding one of the both end portions of the linear light source, in at least the vicinity of the side face.

According to a further aspect of the present invention, an image display unit comprises any one of the above described surface light source devices, and a member to be illuminated, light emitted from the surface light source device illuminating a plane of the member.

BRIEF DESCRIPTION OF THE DRAWINGS

FIGS. 16A through 16D are enlarged sectional views of a part of the light guide plate taken along lines XVIA—XVIA through XVID—XVID of FIG. 15B, respectively;

FIG. 17A is a plan view showing a modified example of the second preferred embodiment of a light guide plate according to the present invention, and FIG. 17B is a sectional view taken along line XVIIB—XVIIB of FIG. 17A;

FIGS. 18A through 18D are views showing the third preferred embodiment of a light guide plate according to the present invention, FIG. 18A being a plan view of the light guide plate, FIG. 18B being a sectional view taken along line XVIIIB—XVIIIB of FIG. 18A, FIG. 18C being a sectional view taken along line XVIIIC—XVIIIC of FIG. 18A, and FIG. 18D being a sectional view taken along line XVIIID—XVIIID of FIG. 18A;

FIGS. 23A through 23D are views showing a modified example of the third preferred embodiment of a light guide plate according to the present invention, FIG. 23A being a plan view of the light guide plate, FIG. 23B being a sectional view taken along line XXIIIB—XXIIIB of FIG. 23A, FIG. 23C being a sectional view taken along line XXIIIC—XXIIIC of FIG. 23A, and FIG. 23D being a sectional view taken along line XXIIID—XXIIID of FIG. 23A;

FIGS. 24A through 24D are views showing the fourth preferred embodiment of a light guide plate according to the present invention, FIG. 24A being a plan view of the light guide plate, FIG. 24B being a sectional view taken along line XXIVB—XXIVB of FIG. 24A, FIG. 24C being a sectional view taken along line XXIVC—XXIVC of FIG. 24A, and FIG. 24D being a sectional view taken along line XXIVD—XXIVD of FIG. 24A;

FIGS. 26A through 26D are views showing the fifth preferred embodiment of a light guide plate according to the present invention, FIG. 26A being a plan view of the light guide plate, FIG. 26B being a sectional view taken along line XXVIB—XXVIB of FIG. 26A, FIG. 26C being a sectional view taken along line XXVIC—XXVIC of FIG. 26A, and FIG. 26D being a sectional view taken along line XXVID—XXVID of FIG. 26A;

FIGS. 30A through 30D are views showing the seventh preferred embodiment of a light guide plate according to the present invention, FIG. 30A being a plan view of the light guide plate, FIG. 30B being a sectional view taken along line XXXB—XXXB of FIG. 30A, FIG. 30C being a sectional view taken along line XXXC—XXXC of FIG. 30A, and FIG. 30D being a sectional view taken along line XXXD—XXXD of FIG. 30A;

FIGS. 34A through 34C are views showing the tenth preferred embodiment of a light guide plate according to the present invention, FIG. 34A being a longitudinal sectional view (a sectional view taken along line XXXIVA—XXXIVA of FIG. 34B) schematically showing the relationship between the light guide plate and a liquid crystal display panel, FIG. 34B being a plan view of the light guide plate, and FIG. 34C being a coating rate curve of frosting patterns formed on an emission surface of the light guide plate;

FIGS. 35A through 35C are views showing the tenth preferred embodiment of a light guide plate according to the present invention, FIG. 35A being a longitudinal sectional view (a sectional view taken along line XXXVA—XXXVA of FIG. 35B) schematically showing the relationship between the light guide plate and a liquid crystal display panel, FIG. 35B being a plan view of the light guide plate, and FIG. 35C being a coating rate curve of frosting patterns formed on an emission surface of the light guide plate;

BEST MODE FOR CARRYING OUT THE INVENTION

Referring to the accompanying drawings, the preferred embodiments of the present invention will be described below in detail.

[First Preferred Embodiment]

Figure 1:
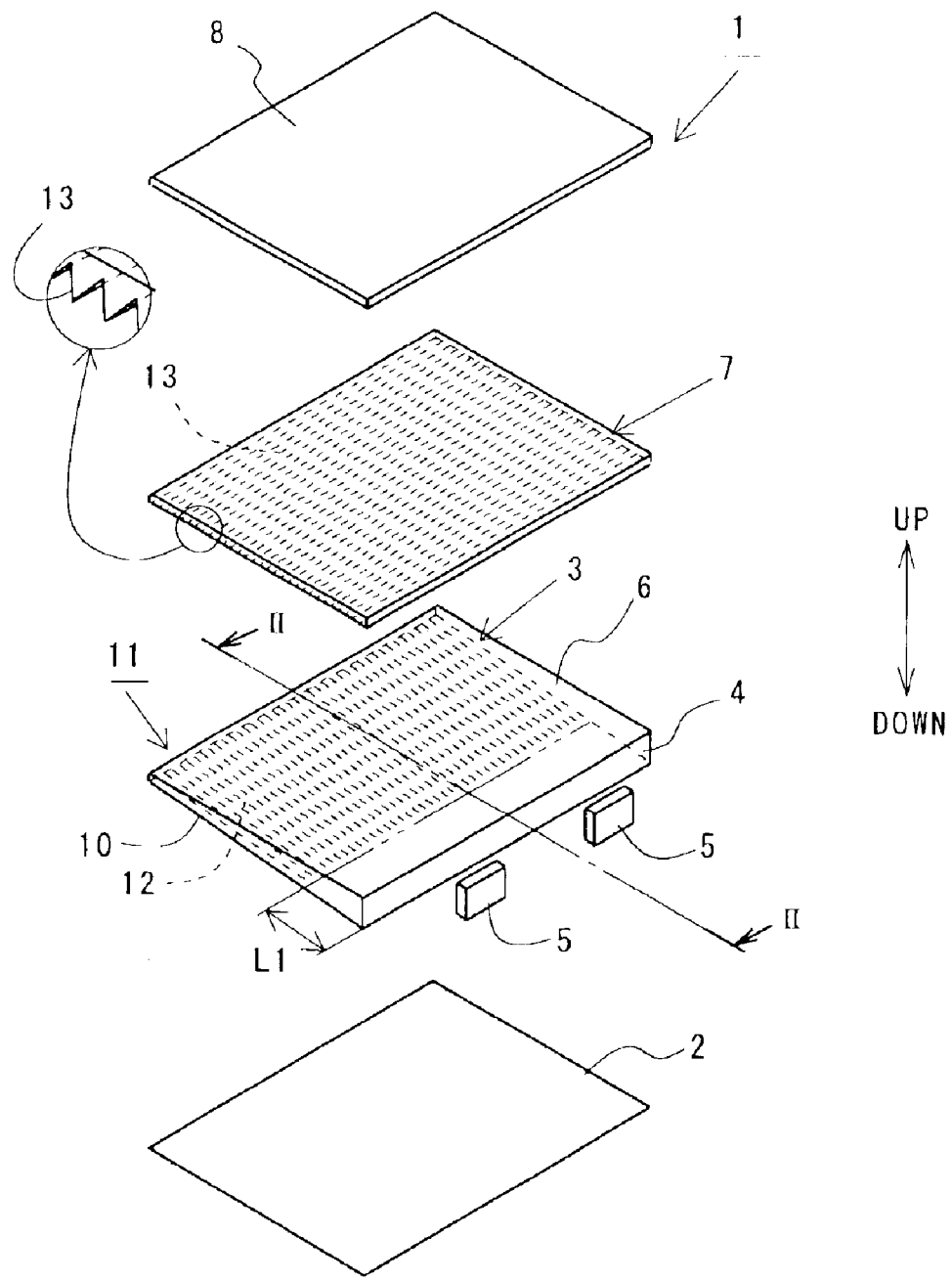
FIG. 1 is an exploded perspective view showing the first preferred embodiment of an image display unit according to the present invention.
Figure 2:
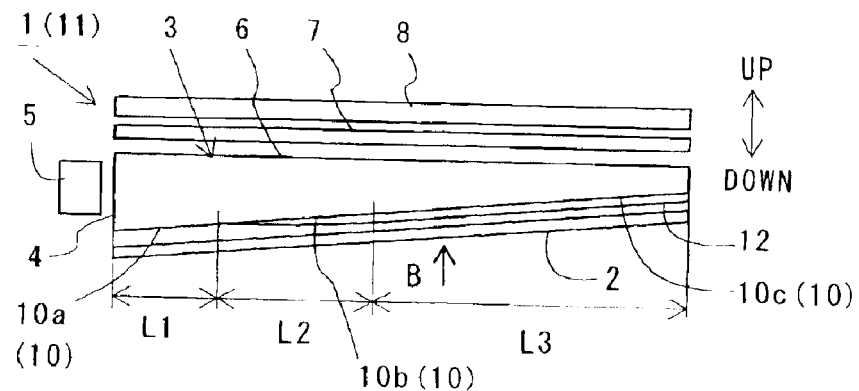
FIG. 2 is a sectional view taken along line II—II of FIG. 1.
Figure 3:
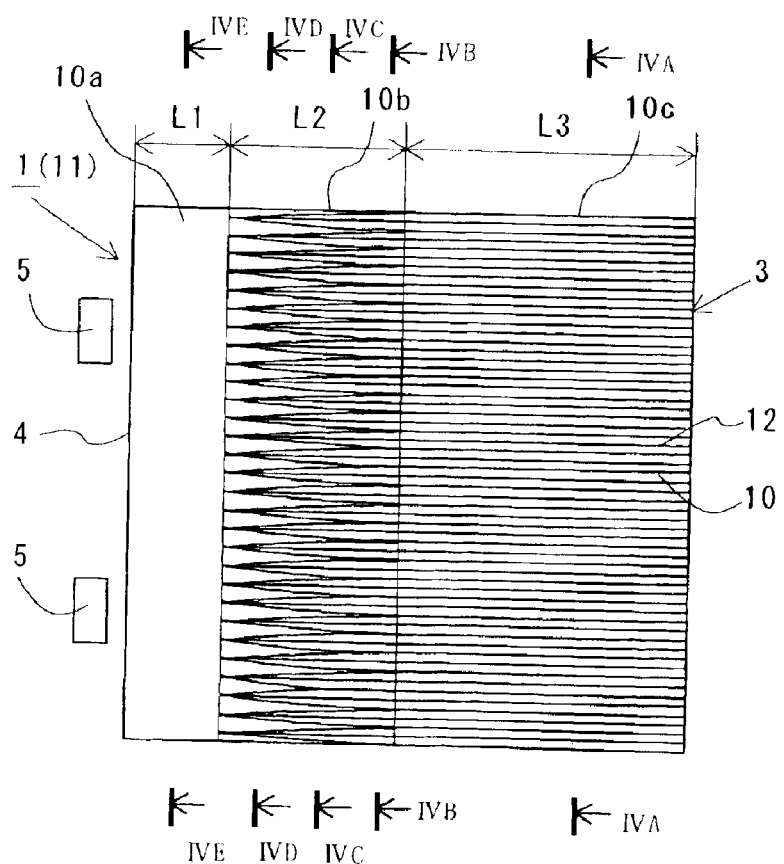
FIG. 3 is a plan view which is shown by removing a reflecting sheet from FIG. 2 and which is viewed in the direction of arrow B of FIG. 2.

FIGS. 1 through 3 show the first preferred embodiment of an image display unit 1 according to the present invention. FIG. 1 is an exploded perspective view of the image display unit 1. FIG. 2 is a sectional view taken along line II—II of FIG. 1, and FIG. 3 is a plan view which is shown by removing a reflecting sheet 2 from FIG. 2 and which is viewed in the direction of arrow B of FIG. 2.

In these figures, the image display unit 1 has a plurality of LEDs (light emitting diodes) 5 serving as point light sources which are arranged so as to face an incidence surface 4 (a side face) of a light guide plate 3. A prism sheet 7 serving as a light control member is stacked thereon so as to face an emission surface 6 (a top face in FIG. 1) of the light guide plate 3. A liquid crystal display panel 8, which serves as a member to be illuminated, is stacked on the top face (in FIG. 1) of the prism sheet 7. A reflecting sheet 2 having an excellent light reflectivity is arranged so as to face aback surface 10 of the light guide plate 3 (a bottom face in FIG. 1, which is a surface opposite to the emission surface 6). Furthermore, the above described LEDs 5, light guide plate 3, prism sheet 7 and reflecting sheet 2 are combined to form a surface light source device 11 for illuminating a plane of the liquid crystal display panel 8.

The light guide plate 3 is formed of a material having an excellent light permeability, such as PMMA (polymethylmethacrylate), PC (polycarbonate) and cycloolefin resin materials. The light guide plate 3 has a substantially wedge-shaped cross section so as to have a thickness decreasing as a distance from the incidence surface 4 increases (see FIG.

2), and has a substantially rectangular shape on a plane (see FIG. 3). On the back surface 10 of the light guide plate 3, a large number of prism protrusions 12 extending in parallel to directions substantially perpendicular to the incidence surface 4 are arranged along the incidence surface 4.

Figure 4E:
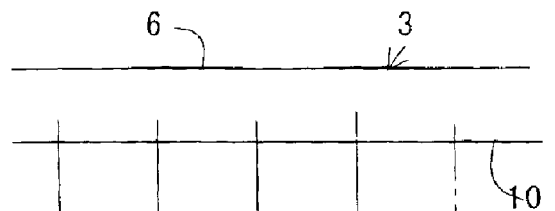
FIGS. 4A through 4E are enlarged sectional views of a part of a light guide plate in the first preferred embodiment, FIG. 4A being a partially enlarged sectional view taken along line IVA—IVA of FIG. 3, FIG. 4B being a partially enlarged sectional view taken along line IVB—IVB of FIG. 3, FIG. 4C being a partially enlarged sectional view taken along line IVC—IVC of FIG. 3, FIG. 4D being a partially enlarged sectional view taken along line IVD—IVD of FIG. 3, and FIG. 4E being a partially enlarged sectional view taken along line IVE—IVE of FIG. 3.

The prism protrusions 12 formed on the back surface 10 of the light guide plate 3 have a height gradually decreasing as a distance from the incidence surface 4 decreases in a predetermined range L2 of a side-face side portion 10b of the light guide plate 3, and have a height being zero in a portion 10a in the vicinity of the incidence surface 4 of the light guide plate 3 (in a portion of the back surface 10 between a position, which is nearest to the incidence surface 4 of the light guide plate 3, and a position which is a predetermined distance L1 away from the incidence surface 4). That is, the back surface 10 of the light guide plate 3 is formed so as to be flat in the portion 10a in the vicinity of the incidence surface (see FIG. 4E). Furthermore, the optimum values of the above described predetermined distance L1 and predetermined range L2 are suitably set in accordance with the thickness of the light guide plate 3 (particularly the thickness of the light guide plate 3 on the side of the incidence surface 4), characteristics of the LEDs 5 and so forth.

Figure 4D:
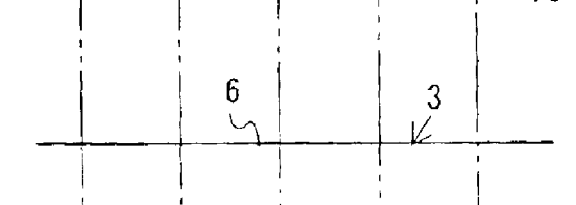
Figure 4C:
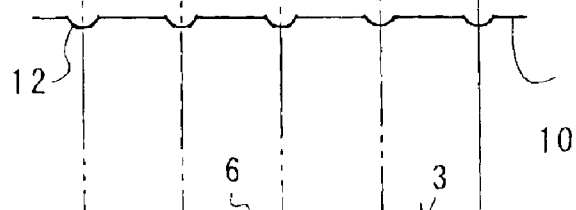
Figure 4B:
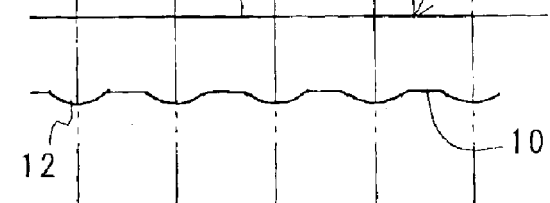
Figure 4A:
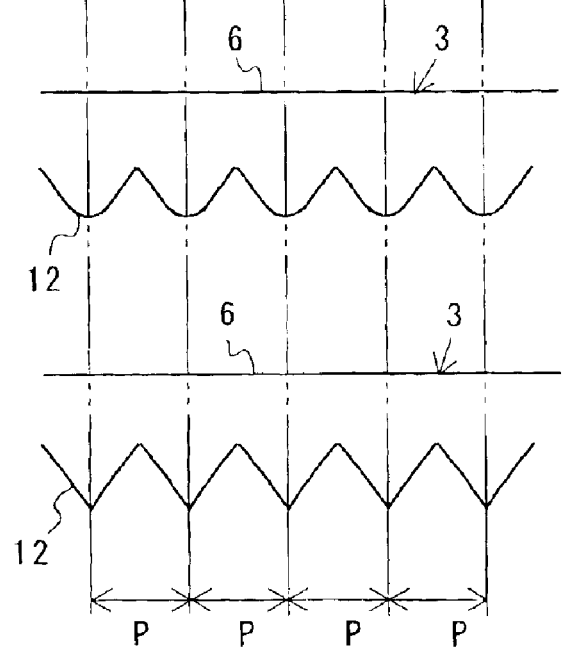

FIGS. 4A through 4D show cross sections of the above described prism protrusions 12, and are enlarged sectional views of a part of the light guide plate of FIG. 3 taken along lines IVA—IVA through IVD—IVD of FIG. 3, respectively. That is, as shown in FIG. 4A, the prism protrusions 12 are formed so that the height of the prism protrusions 12 in a portion 10c (a portion of the back surface shown by L3) except for the predetermined range L2 of the side-face side portion 10b is substantially the same. The sectional shape of each of the prism protrusions 12 is a substantially triangle, and the vertical angle of each of the prism protrusions 12 is determined so as to be in the range of from 50 degrees to 130 degrees, preferably in the range of from 60 degrees to 110 degrees. As shown in FIGS. 4B through 4D, each of the prism protrusions 12 in the side-face side portion (the range shown by L2) 10b of the light guide plate 3 is formed so as to continuously extend from a portion, which has a top portion formed by a substantially circular-arc-curved surface (FIG. 4B), to a substantially semi-circular portion as a whole (FIG. 4D). Furthermore, in the vicinity of the boundary between the above described ranges of L2 and L3, the shape of each of the prism protrusions 12 continuously varies from an acute triangle shown in FIG. 4A to a smooth triangle having a substantially circular-arc top portion. The pitch P between adjacent prism protrusions 12 and 12 is substantially the same in FIGS. 4A through 4D.

The prism protrusions 12 formed on the side of the back surface 10 of the light guide plate 3 with this construction have the function of condensing light, which is incident on the incidence surface 4 to be propagated through the light guide plate 3 to travel on a plane substantially parallel to the incidence surface 4, in a direction normal to the emission surface 6. However, since the height of each of the prism protrusions 12 in the side-face side portion (the range of L2) 10b gradually decreases as a distance from the incidence surface 4 decreases and since the sectional shape of each of the prism protrusions 12 continuously varies from the substantially triangle to the substantially semi-circle, the above described condensing function of the prism protrusions 12 decreases as a distance from the incidence surface 4 decreases. In addition, no prism protrusions 12 are formed on the back surface 10 of the light guide plate 3 in the vicinity of the incidence surface (in the range of L1).

Figure 5:
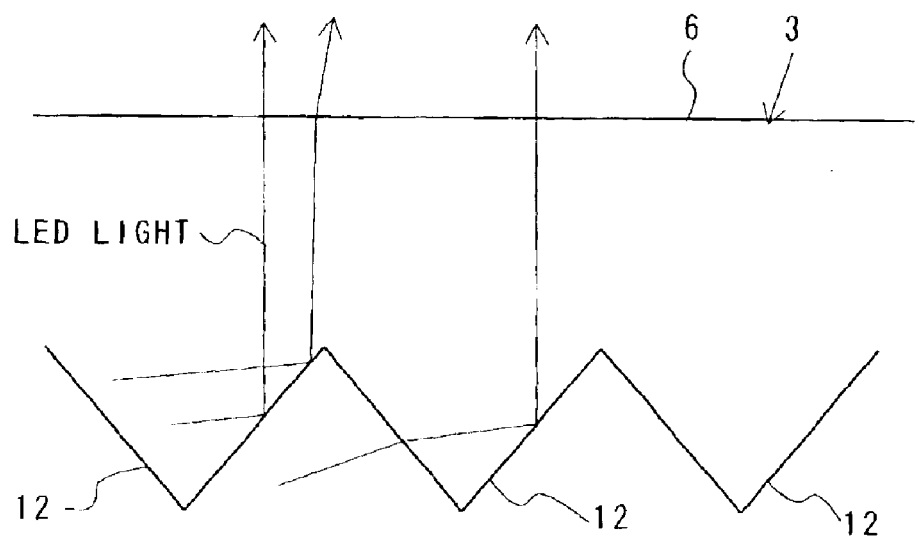
FIG. 5 is an illustration showing the condensing function of prism protrusions of a light guide plate.
Figure 40:
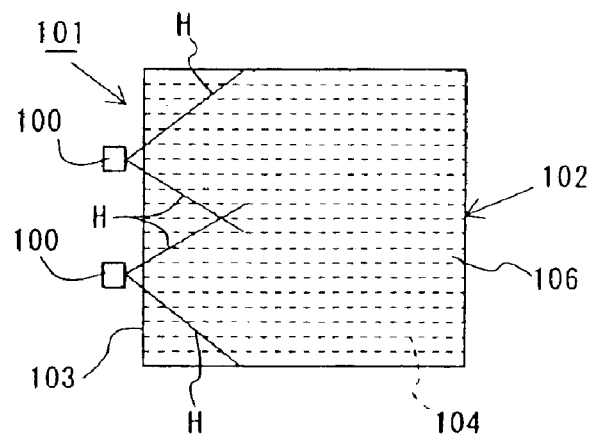
FIG. 40 is a plan view of a conventional surface light source device.
Figure 41:
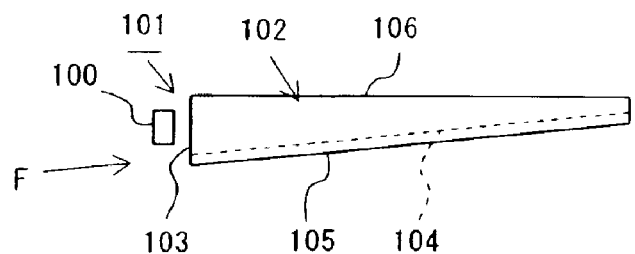
FIG. 41 is a side view of the surface light source device of FIG. 40.
Figure 42:
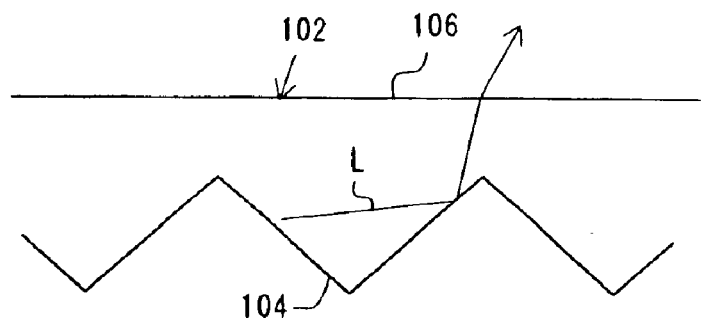
FIG. 42 is an enlarged view of a part of a light guide plate which is viewed in a direction of arrow F of FIG. 41.
Figure 43:
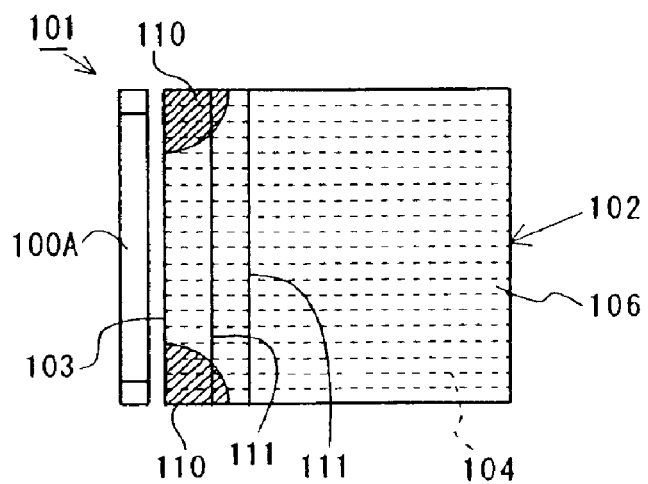
FIG. 43 is a plan view of another conventional surface light source device.
Figure 44:
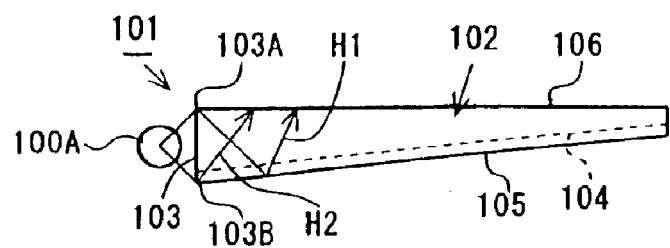
FIG. 44 is a side view of the surface light source device of FIG. 43.

Therefore, the light guide plate 3 in this preferred embodiment can effectively prevent abnormal emission (see H in FIG. 40), which causes problems in the conventional example and which is caused by the prism protrusions 12 formed in the portion 10a in the vicinity of the incidence surface of the light guide plate 3, even if it uses the LEDs 5 as light sources. On the other hand, the light guide plate 3 in this preferred embodiment can sufficiently utilize the condensing function of the prism protrusions 12 in the portion 10c, in which the luminance of the exiting light is easy to decrease (in the portion away from the incidence surface and in the region of L3), to promote emission in a direction normal to the emission surface 6 (see FIG. 5) to provide uniform and bright surface illumination on the light guide plate 3 as a whole. Furthermore, light, which is propagated through the light guide plate 3 and which exists in a portion away from the incidence surface 4, reflects inside of the light guide plate 3 many times to weaken the directivity of the light, so that abnormal emission does not occur unlike conventional examples even if the condensing function of the prism protrusions 12 is sufficiently utilized.

On the emission surface 6 of the light guide plate 3, fine irregularities (not shown) for diffusing light leaving the emission surface 6 are suitably formed so as to have a pattern. Furthermore, if the density of the fine irregularities is suitably changed in accordance with the place of the emission surface, exiting light can be more preferably adjusted. Thus, if the fine irregularities are formed on the emission surface 6 of the light guide plate 3 so as to have a pattern, the uniformity of surface illumination from the light guide plate 3 can be obtained in cooperation with the advantageous effects of the prism protrusions 12.

The prism sheet 7 is formed of a material having an excellent light permeability, such as PET (polyethylene terephthalate) PMMA or PC, and substantially has the same rectangular shape as that of the emission surface 6 of the light guide plate 3. On a surface of the prism sheet 7 facing the emission surface 6 of the light guide plate 3 (on a bottom surface in FIGS. 1 and 2), a large number of prism protrusions 13 are formed. The prism protrusions 13 of the prism sheet 7 extends in parallel to directions substantially perpendicular to the prism protrusions 12 of the light guide plate 3, and are arranged in directions substantially perpendicular to the incidence surface 4. Each of the prism protrusions 13 of the prism sheet 7 substantially has the same sectional shape as that of each of the prism protrusions 12 of the light guide plate 3 shown in FIG. 4A. The prism sheet 7 with such a construction has the function of deflecting light on a plane, which is perpendicular to the incidence surface 4 of the light guide plate 3 and which is perpendicular to the emission surface 6 of the light guide plate 3, in a direction normal to the emission surface 6. That is, light emitted from the LEDs 5 is condensed and deflected in two stages by means of the prism protrusions 12 of the light guide plate 3 and the prism protrusions 13 of the prism sheet 7. Furthermore, the vertical angle, pitch and height of the prism protrusions 12 formed on the light guide plate 3 may be suitably different from those of the prism protrusions 13 formed on the prism sheet 7.

The reflecting sheet 2 is formed of a material having an excellent light reflectivity, such as white PET, and substantially has the same size and rectangular shape as those of the back surface 10 of the light guide plate 3. The reflecting sheet 2 allows light, which leaves the back surface 10 of the light guide plate 3, to reflect to be returned into the light guide plate 3 to effectively utilize light emitted from the LEDs 5.

In the image display unit 1 in this preferred embodiment with the above described construction, light emitted from the LEDs 5 is incident on the incidence surface 4 of the light guide plate 3 to enter the light guide plate 3. Light entering the light guide plate 3 from the LEDs 5 repeatedly reflects between the emission surface 6 and the back surface 10 to be propagated through the light guide plate 3. Then, every time light propagated through the light guide plate 3 reflects on the back surface 10, its angle of incidence decreases. If the angle of incidence of the light on the emission surface 6 is the critical angle or less during the propagation of the light, the light leaves the light guide plate 3 from the emission surface 6.

In this preferred embodiment, the light guide plate 3 has the prism protrusions 12 on the back surface 10 as described above. However, the height of each of the prism protrusions 12 in the side-face side portion 10b gradually decreases as a distance from the incidence surface 4 decreases, and the sectional shape thereof continuously varies from the substantially triangle to the substantially semicircle. In addition, the prism protrusions 12 are not formed in the portion 10a in the vicinity of the incidence surface. Thus, in the image display unit 1 in this preferred embodiment, the condensing function of the prism protrusions 12 is not fulfilled in the portion 10a in the vicinity of the incidence surface of the light guide plate 3, and the condensing function decreases in the side-face side portion 10b of the light guide plate 3 as a distance from the incidence surface 4 decreases. On the other hand, in the image display unit 1 in this preferred embodiment, the condensing function of the prism protrusions 12 is sufficiently fulfilled in the portion 10c (the portion which is far from the incidence surface 4), in which the luminance of the light leaving the light guide plate 3 decreases, to promote emission in a direction normal to the emission surface 6 of the light guide plate 3.

Therefore, even if the image display unit 1 in this preferred embodiment uses the LEDs 5 as light sources, it is possible to prevent abnormal emission from being caused by the prism protrusions 12 of the light guide plate 3, and it is possible to illuminate the liquid crystal display panel 8 with uniform and bright surface illuminating light leaving the whole light guide plate 3, so that the display screen is brightly and easily visible.

While the prism protrusions 12 have been formed on the back surface 10 of the light guide plate 3 in the above described first preferred embodiment, the same prism protrusions as the prism protrusions 12 in the above described preferred embodiment may be formed on the emission surface 6 of the light guide plate 3, or the same protrusions as the prism protrusions 12 in the above described preferred embodiment may be formed on both of the back surface 10 and emission surface 6 of the light guide plate 3. If the prism protrusions are formed on both sides, the prism protrusions formed on one side may be partially formed. For example, the prism protrusions formed on the one side may be formed on only a portion corresponding to the above described range L2.

Figure 6:
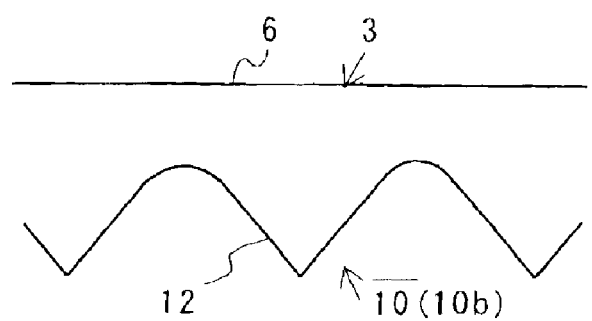
FIG. 6 is an illustration showing a modified example of the shape of prism protrusions.
Figure 7:
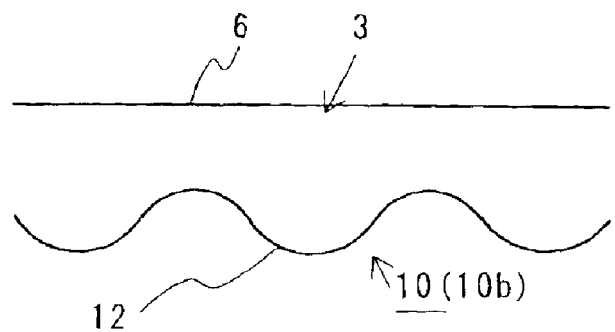
FIG. 7 is an illustration showing another modified example of the shape of prism protrusions.

In the above described first preferred embodiment, each of the prism protrusions 12 formed on the side-face side portion 10b of the back surface 10 of the light guide plate 3 may be formed so that the base portion of a corresponding one of the prism protrusions 12 has a smooth semi-circular shape as shown in FIG. 6 or so that the whole portion of a corresponding one of the prism protrusions 12 has a smoothly curved portion as shown in FIG. 7.

In the above described first preferred embodiment, the prism protrusions 12 of the light guide plate 3 may be formed so as to extend in directions perpendicular to the incidence surface 4, or may be formed so as to extend in directions inclined by a few degrees from directions perpendicular to the incidence surface 4.

Figure 8:
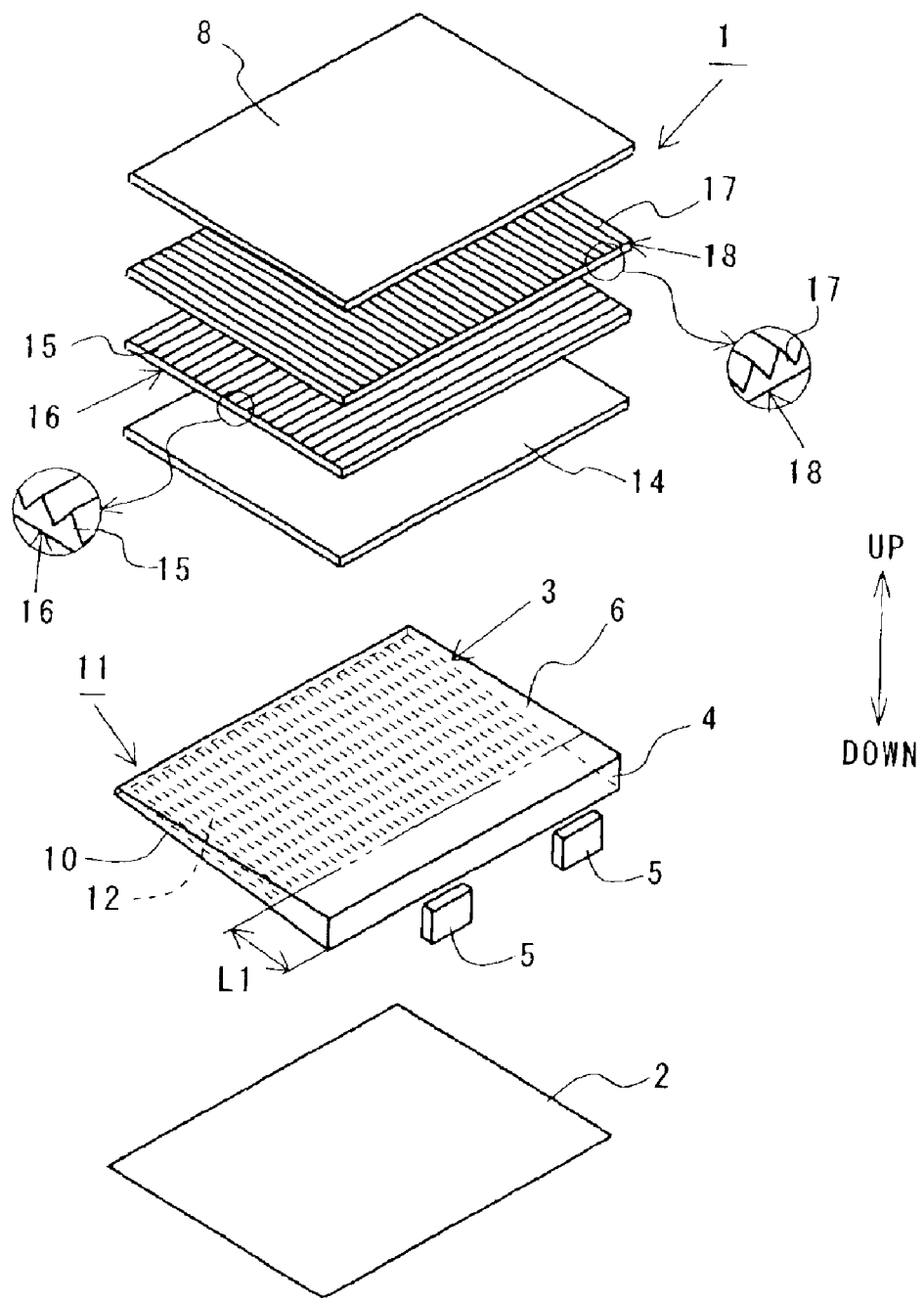
FIG. 8 is an exploded perspective view showing a modified example of the first preferred embodiment of an image display unit according to the present invention.

The present invention should not be limited to the above described first preferred embodiment. As shown in FIG. 8, the present invention may be applied to an embodiment wherein a second prism sheet 18, on which upward prism protrusions 17 are formed so as to extend in directions substantially perpendicular to prism protrusions 15 of a first prism sheet 16, is stacked on the top face of the first prism sheet 16, on which the prism protrusions 15 are formed on the side of a liquid crystal display panel 8 and which is stacked on the top face of a diffusion sheet 14 stacked on the emission surface 6 of the light guide plate 3.

While the prism protrusions 12 of the light guide plate 3 have been formed so as to protrude from the back surface 10 of the light guide plate 3 in the above described first preferred embodiment (see FIG. 2), the top portion of each of the prism protrusions 12 may be substantially formed on the same plane as that of the back surface 10.

Figure 9:
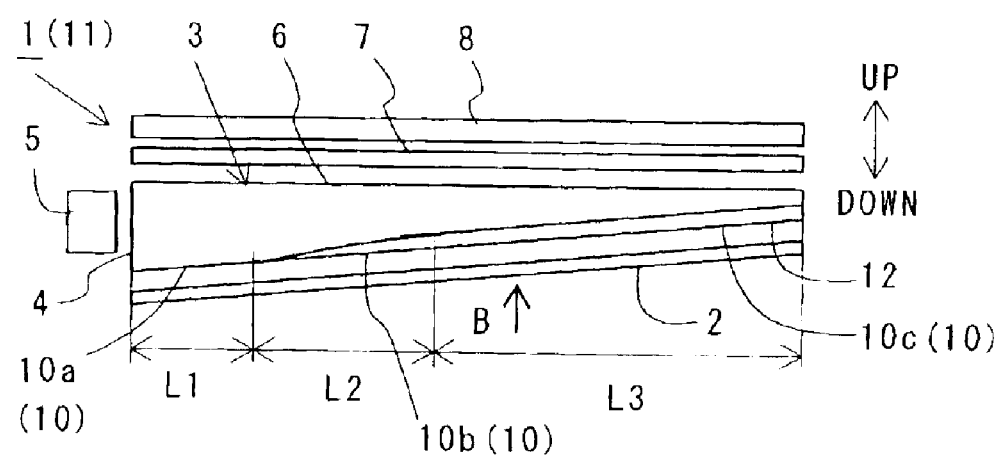
FIG. 9 is a sectional view (corresponding to FIG. 2) showing another modified example of the first preferred embodiment of an image display unit according to the present invention.
Figure 10:
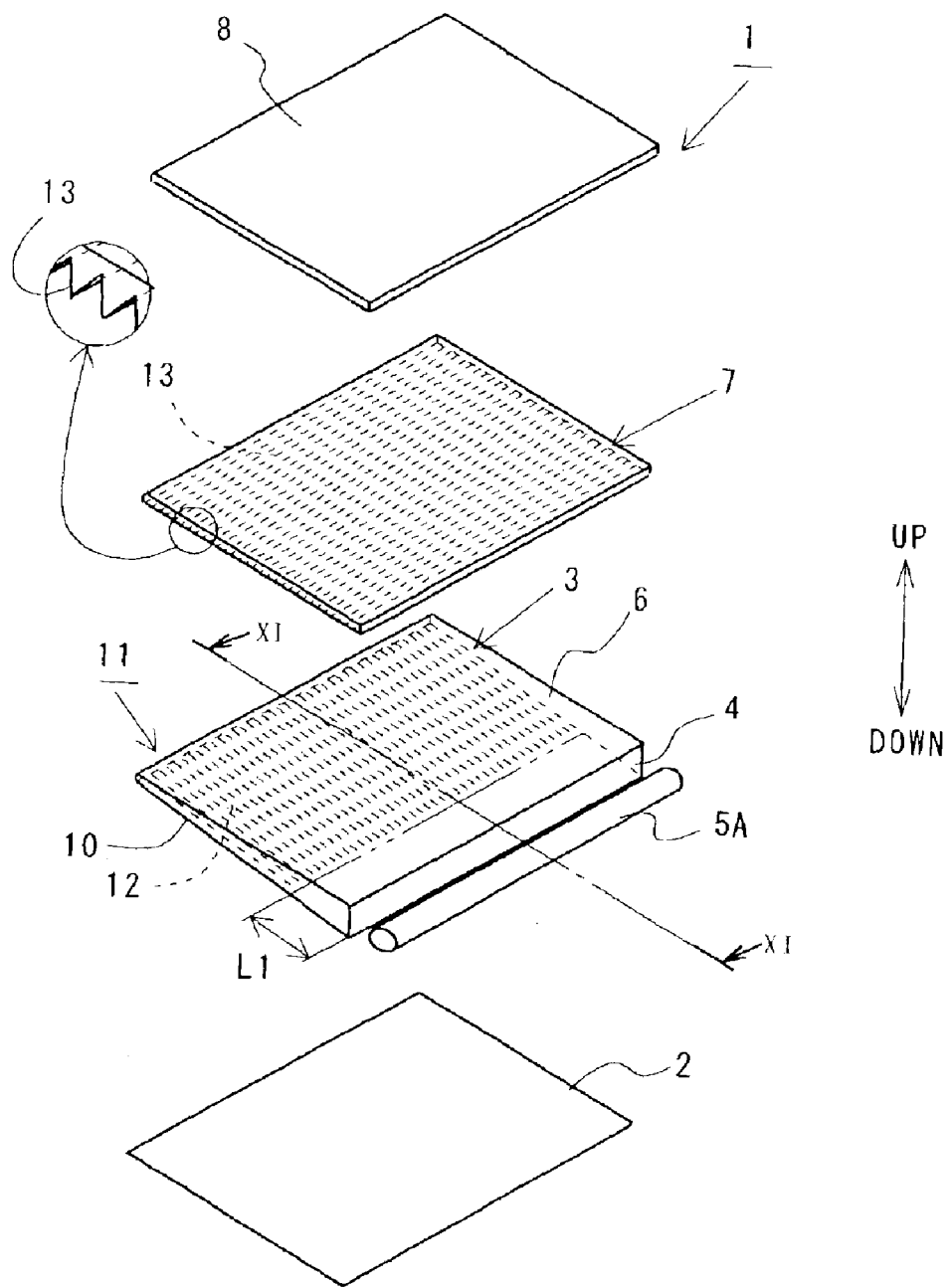
FIG. 10 is an exploded perspective view showing a modified example of the first preferred embodiment of an image display unit according to the present invention.
Figure 11:
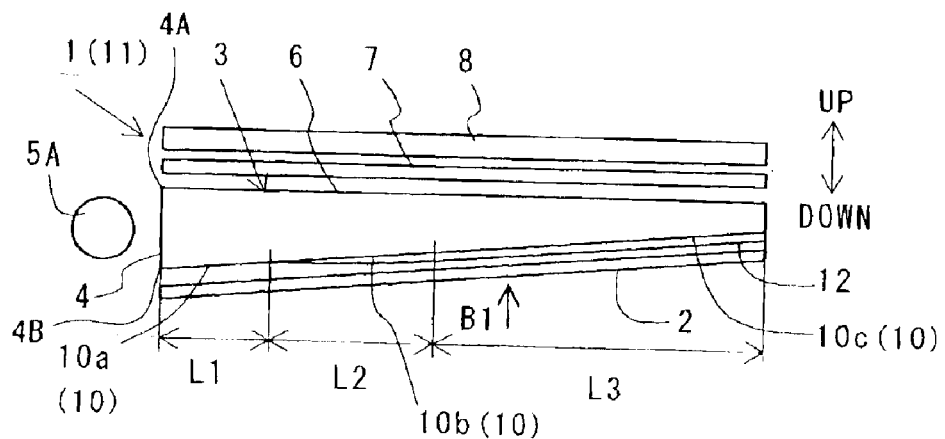
FIG. 11 is a sectional view taken along line XI-XI of FIG. 10.
Figure 12:
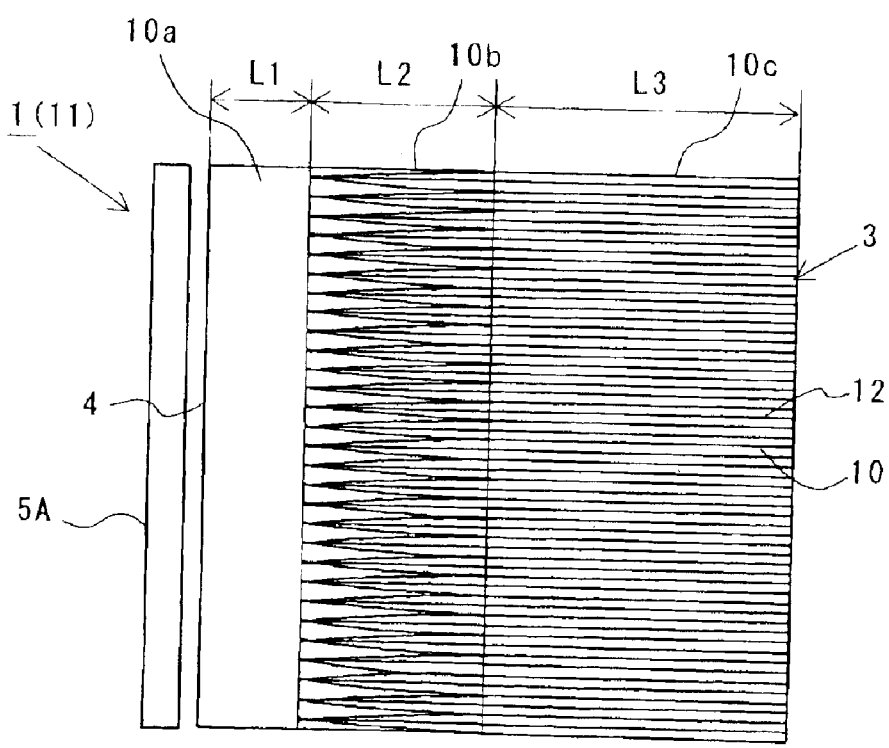
FIG. 12 is a plan view which is shown by removing a reflecting sheet from FIG. 10 and which is viewed in the direction of arrow B1 of FIG. 2.
Figure 13:
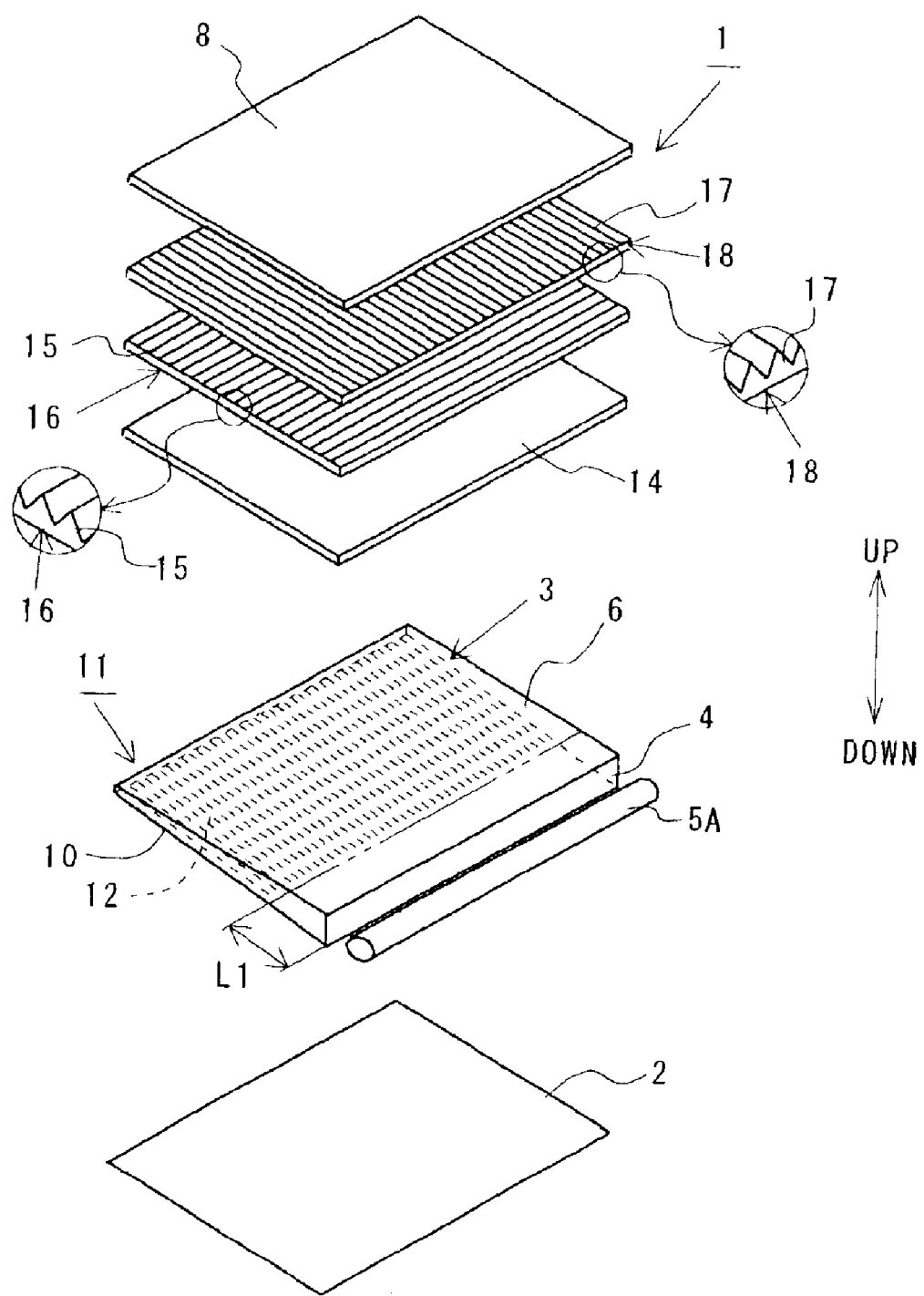
FIG. 13 is an exploded perspective view showing another modified example of the first preferred embodiment of an image display unit according to the present invention.
Figure 14:
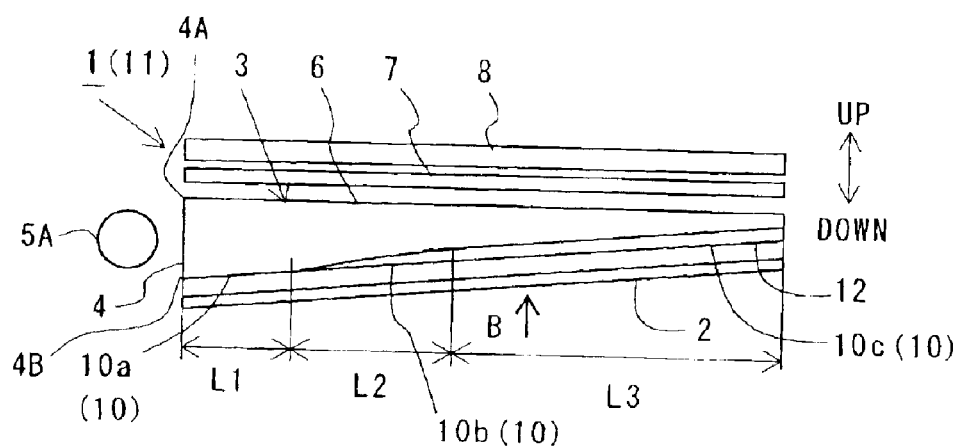
FIG. 14 is a sectional view (corresponding to FIG. 2) showing another modified example of the first preferred embodiment of an image display unit according to the present invention.

While the LEDs 5 serving as point light sources have been used in the above described first preferred embodiment, a fluorescent lamp 5A serving as a linear light source may be substituted for the LEDs 5 as shown in FIGS. 10 through 12. As shown in FIG. 13, the fluorescent lamp 5A may be substituted for the LEDs 5 of the surface light source 11 of FIG. 8. As shown in FIG. 14, the fluorescent lamp 5A may be substituted for the LEDs 5 of the surface light source 11 shown in FIG. 9. In each of the surface light source devices 11 shown in FIGS. 10 through 14, the same reference numbers are given to the same portions as those in the above described preferred embodiment, and repeated descriptions thereof are omitted.

Similar to the above described preferred embodiment, in the surface light source device 11 in the modified examples wherein the fluorescent lamp 5A is substituted for the LEDs 5, the condensing function of the prism protrusions 12 is not fulfilled in the portion 10a in the vicinity of the incidence surface of the light guide plate 3, and the condensing function decreases in the side-face side portion 10b of the light guide plate 3 as a distance from the incidence surface 4 decreases. On the other hand, the condensing function of the prism protrusions 12 in the portion 10c (the portion which is far from the incidence surface 4), in which the luminance of the light leaving the light guide plate 3 decreases, is sufficiently fulfilled. As a result, it is difficult to cause the difference in contrast in the portion 10a in the vicinity of the incidence surface of the light guide plate and in the side-face side portion 10b, so that bright lines, which are caused by light incident on the upper and lower edges 4A and 4B of the light guide plate 3, and low luminance portions, which are produced in both end portions of the emission surface 6 in the vicinity of the incidence surface 4 of the light guide plate 3, are inconspicuous.

Therefore, according to the image display unit 1 in this modified example, even if the fluorescent lamp 5A is used as a light source, it is possible to prevent abnormal emission from being caused by the prism protrusions 12 of the light guide plate 3, and it is possible to illuminate the liquid crystal display panel 8 with uniform and bright surface-like illuminating light which leaves the whole light guide plate 3.

[Second Preferred Embodiment]

Figure 15A:
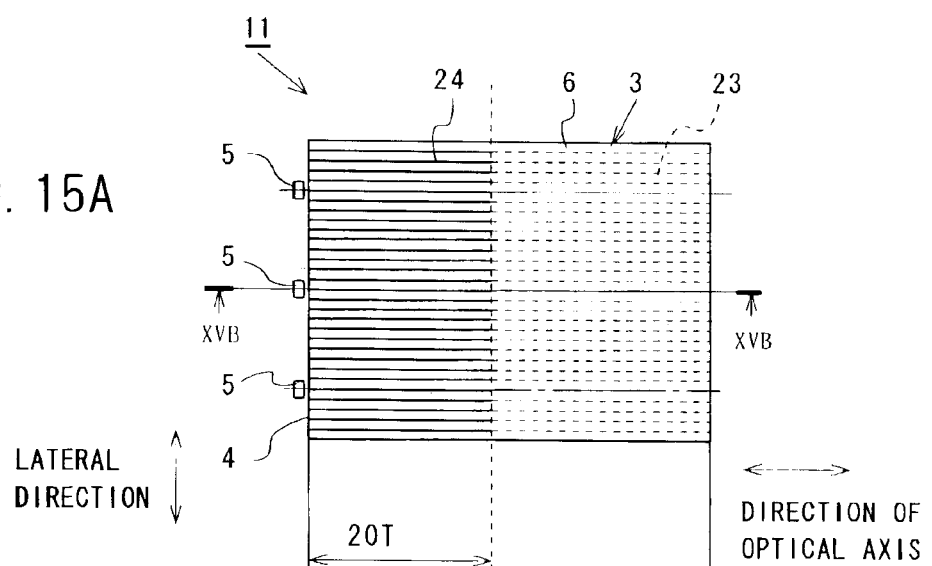
FIG. 15A is a plan view showing the second preferred embodiment of a light guide plate according to the present invention.
Figure 15B:
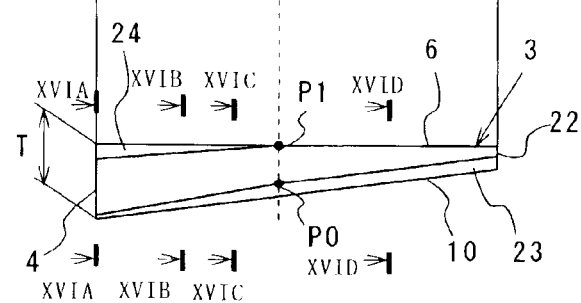
FIG. 15B is a sectional view taken along line XVB—XVB of FIG. 15A.

FIGS. 15A, 15B and 16A through 16D show the second preferred embodiment of the present invention. FIG. 15A is a plan view which is viewed from the side of the emission surface 6 of the light guide plate 3, and FIG. 15B is a sectional view taken along line XVB—XVB of FIG. 15A. FIG. 16A is a sectional view taken along line XVIA—XVIA of FIG. 15B, FIG. 16B is a sectional view taken along line XVIB—XVIB of FIG. 15B, FIG. 16C is a sectional view taken along line XVIC—XVIC of FIG. 15B, and FIG. 16D is a sectional view taken along line XVID—XVID of FIG. 15B.

As shown in these figures, similar to the light guide plate 3 in the above described first preferred embodiment, a light guide plate 3 in this preferred embodiment has a substantially wedge-shaped cross section so as to have a thickness decreasing as a distance from the incidence surface 4 increases, and has a substantially rectangular shape on a plane. On a back surface 10 of the light guide plate 3 in the whole region thereof, a large number of prism protrusions 23 are formed. On an emission surface 6 of the light guide plate 3 in a predetermined range away from the incidence surface 4, a large number of prism protrusions 24 are formed. These prism protrusions 23 and 24 extend in parallel to directions substantially perpendicular to the incidence surface 4 and are arranged along the incidence surface 4. The predetermined range is a range away from the incidence surface 4 of the light guide plate 3 to a point P1 shown in FIGS. 15A and 15B, and substantially corresponds to a range which is a distance of 20 T away from the entrance plate 4 assuming that the thickness of the light guide plate 3 on the side of the entrance plate 4 is T.

Each of the prism protrusions 23 on the side of the back surface 10 of the light guide plate 3 has the same height and shape (substantially triangle) in a range from a position P0, which is a predetermined distance away from the incidence surface 4, to the tip end of the light guide plate 3 (to a side face 22 opposite to the incidence surface 4) (see FIG. 16D).

As shown in FIG. 15B, the height of each of the prism protrusions 23 on the side of the back surface 10 of the light guide plate 3 gradually decreases from the position P0, which is the predetermined distance away from the incidence surface 4, as a distance from the incidence surface 4 decreases.

FIGS. 16A through 16D are enlarged sectional views of a part of the light guide plate 3, which are taken along lines XVIA—XVIA through XVID—XVID of FIG. 15B, respectively. As shown in these figures, on the side of the back surface 10 of the light guide plate 3, the shape of each groove between adjacent prism protrusions 23 and 23 is substantially triangular at the position P0 which is the predetermined distance away from the entrance plate 4 (see FIG. 16D), and the depth of each groove between adjacent prism protrusions 23 and 23 gradually decreases as a distance from the incidence surface 4 decreases, the shape of each groove between adjacent prism protrusions 23 and 23 smoothly varying from the substantially triangle to a substantially circular-arc.

As shown in FIG. 15B, the height of each of the prism protrusions 24 on the side of the emission surface 6 of the light guide plate 3 gradually increases from the position P1, which is the predetermined distance away from the incidence surface 4, as a distance from the incidence surface 4 decreases. As shown in FIGS. 16A through 16C, the sectional shape of the prism protrusions 24 is a substantially wave shape so that the sectional shape of each groove between adjacent prism protrusions 24 and 24 is a substantially circular arc.

As shown in FIGS. 16A through 16D, the emission surface 6 of the light guide plate 3 has no prism protrusion in a region between the position P1, which is the predetermined distance away from the incidence surface 4, and the side face 22 on the tip end side (see FIG. 16*b*). In other words, the emission surface 6 of the light guide plate 3 is formed so as to be flat between the position P1 and the side face 22, and has prism protrusions 24, the height of which gradually increases by forming grooves, the depth of each of which gradually increases from the position P1 as a distance from the incidence surface 4 decreases.

In this preferred embodiment, the reason why the prism protrusions 23 on the side of the back surface 10 of the light guide plate 3 are formed so as to have a height gradually decreasing as a distance from the position P0, which is the predetermined distance away from the incidence surface 4, increases toward the incidence surface 4 is that the condensing function of the prism protrusions 23 on the side of the incidence surface 4 of the light guide plate 3 is suppressed to allow bright lines H (see FIG. 40), which cause conventional problems, to be inconspicuous, similar to the above described first preferred embodiment. Moreover, in this preferred embodiment, the sectional shape of each groove between adjacent prism protrusions 23 and 23 smoothly varies from the substantially triangle to the substantially circular arc as a distance from the incidence surface 4 decreases, so that bright lines H can be more inconspicuous. It is considered that, if the sectional shape of each groove between adjacent prism protrusions 23 and 23 is the substantially circular arc, the substantially circular-arc portion acts as a concave lens to allow light, which reaches the interface, to reflect and deflect so as to diverge, so that the light diffusing function is fulfilled to prevent bright lines H from being caused.

The prism protrusions 24 on the side of the emission surface 6 of the light guide plate 3 in this preferred embodiment are also formed to expect the same light diffusing function, and can effectively prevent bright lines H from being caused in combination with the prism protrusions 23 which are formed on the side of the back surface 10 of the light guide plate.

If only the prism protrusions 23 formed on the side of the back surface 10 of the light guide plate 3 can sufficiently cope in practice, the prism protrusions 24 formed on the side of the emission surface 6 of the light guide plate 3 can be omitted if necessary. That is, if the bright line preventing effect of the prism protrusions 23 is insufficient, the prism protrusions 24 are provided for compensating for this. From such a standpoint, the prism protrusions 24 can be combined with the prism protrusions 12 which are formed on the side of the back surface 10 of the light guide plate 3 in the above described first preferred embodiment. Moreover, the prism protrusions 24 can be applied to take measures to cope with luminance unevenness in a conventional light guide plate, the back surface of which is partially roughened or the like, when LEDs are used as light sources.

While the LEDs 5 serving as point light sources have been used in the above described second preferred embodiment, a fluorescent lamp 5A serving as a linear light source may be substituted for the LEDs 5 as shown in FIGS. 17A and 17B. In the surface light source device 11 shown in FIGS. 17A and 17B, the same reference numbers are given to the same portions as those in the above described second preferred embodiment, and repeated descriptions thereof are omitted.

Similar to the above described second preferred embodiment, in the surface light source device 11 in the modified example wherein the fluorescent lamp 5A is substituted for the LEDs 5, the height of each of the prism protrusions 23 on the side of the back surface 10 of the light guide plate 3 gradually decreases as a distance from the entrance plate 4 decreases, so that the condensing function of the prism protrusions 23 is suppressed. In addition, the sectional shape of each groove between adjacent prism protrusions 23 and 23 is a substantially circular arc, so that the light diffusing function is fulfilled by each groove between adjacent prism protrusions 23 and 23. Therefore, bright lines, which are caused by light incident on the upper and lower edges 4A and 4B of the incidence surface 4, and low luminance portions, which are produced in both end portions on the side of the incidence surface 4 of the light guide plate 3, can be inconspicuous.

In this modified example, the prism protrusions 24 formed on the side of the emission surface 6 of the light guide plate 3 are also formed to expect the same light diffusing function as that of the surface light source device 11 in the above described second preferred embodiment, and can more effectively prevent bright lines from being caused in combination with the prism protrusions 23 which are formed on the side of the back surface 10 of the light guide plate 3.

[Third Preferred Embodiment]

Figure 22:
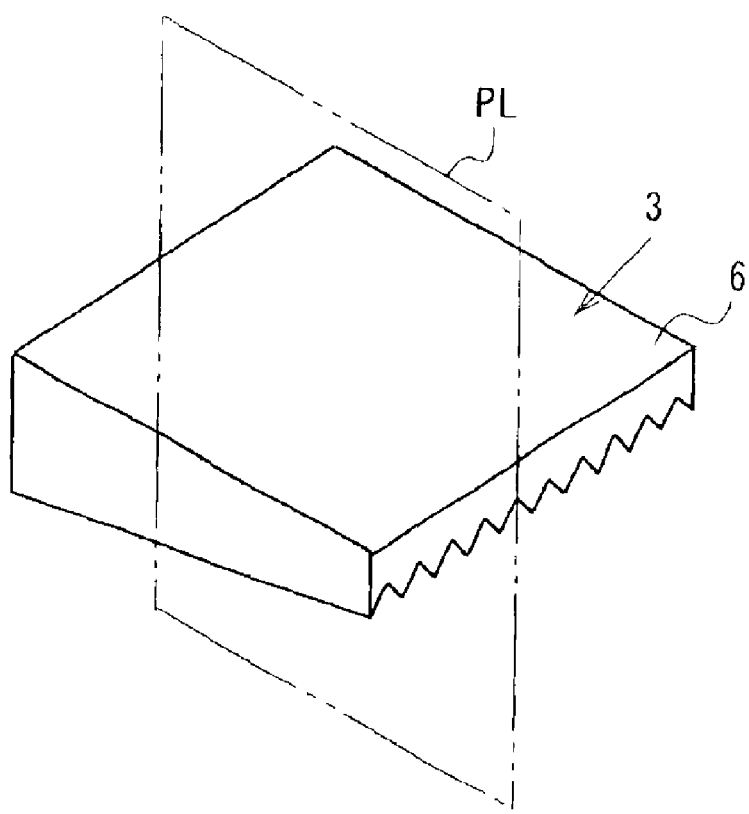
FIG. 22 is an illustration for explaining a cross section of a light guide plate.

FIGS. 18A through 18D show the third preferred embodiment of a light guide plate 3 according to the present invention, which is another embodiment of the light guide plate 3 in the second preferred embodiment. FIG. 18A is a plan view of the light guide plate 3 viewed from the side of the emission surface 6, FIG. 18B is a sectional view taken along line XVIIIB—XVIIIB of FIG. 18A, FIG. 18C is a sectional view taken along line XVIIIC—XVIIIC of FIG. 18A, and FIG. 18D is a sectional view taken along line XVIIID—XVIIID of FIG. 18A. Each of the cross sections taken along lines XVIIIB—XVIIIB, XVIIIC—XVIIIC and XVIIID—XVIIID means a cross section taken along a plane PL which is perpendicular to the emission surface 6 of the light guide plate 3 and which passes through the bottom of a groove between adjacent prism protrusions, as shown in FIG. 22.

As shown in these figures, similar to the light guide plates 3 in the above described first and second preferred embodiments, a light guide plate 3 in this preferred embodiment has a substantially wedge-shaped cross section so as to have a thickness decreasing as a distance from the incidence surface 4 increases, and has a substantially rectangular shape on a plane. On the back surface 10 of the light guide plate 3 in the whole region thereof, a large number of prism protrusions 20 are formed. On an emission surface 6 of the light guide plate 3 in a predetermined range away from the incidence surface 4, a large number of prism protrusions 21 are formed. These prism protrusions 20 and 21 extend in parallel to directions substantially perpendicular to the incidence surface 4 and are arranged along the incidence surface 4. The predetermined range is a range away from the incidence surface 4 of the light guide plate 3 to point P1 shown in FIGS. 18A through 18D, and substantially corresponds to a range which is a distance of 20 T away from the entrance plate 4 assuming that the thickness of the light guide plate 3 on the side of the entrance plate 4 is T.

Figure 19A:
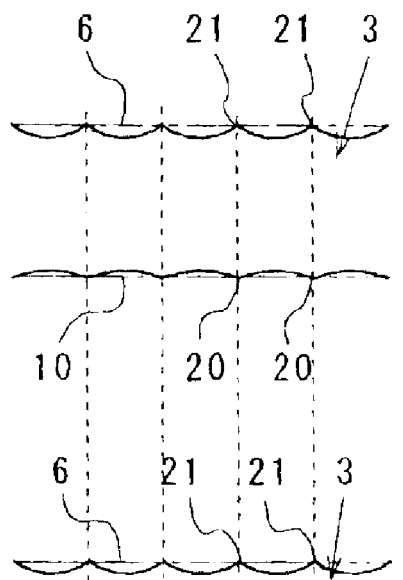
FIGS. 19A through 19D are enlarged sectional views of a part of the light guide plate taken along lines XIXA—XIXA through XIXD—XIXD of FIG. 18B, respectively.
Figure 19B:
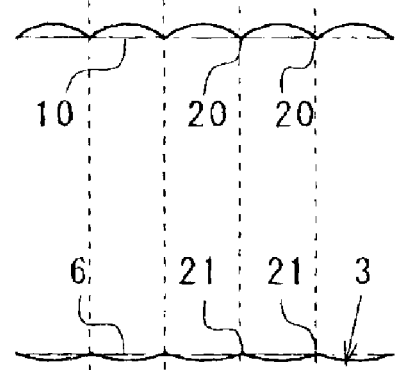
Figure 19C:
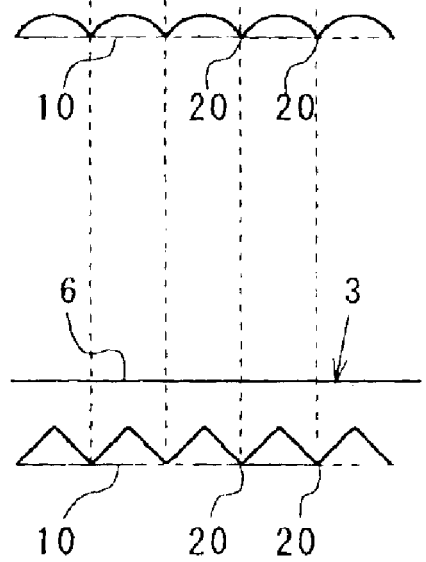
Figure 19D:
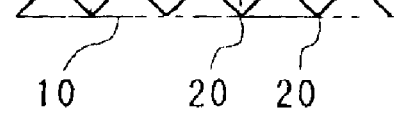
Figure 20A:
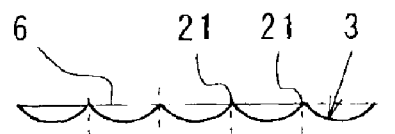
FIGS. 20A through 20D are enlarged sectional views of a part of the light guide plate taken along lines XXA—XXA through XXD—XXD of FIG. 18C, respectively.
Figure 20B:
Figure 20C:
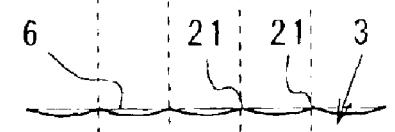
Figure 20D:
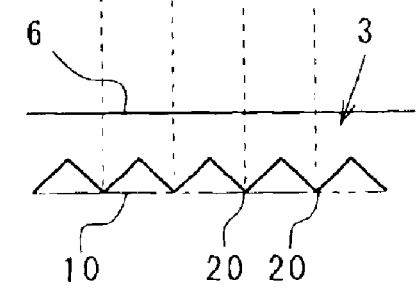
Figure 21A:
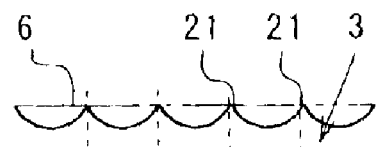
FIGS. 21A through 21D are enlarged sectional views of a part of the light guide plate taken along lines XXIA—XXIA through XXID—XXID of FIG. 18D, respectively.
Figure 21B:
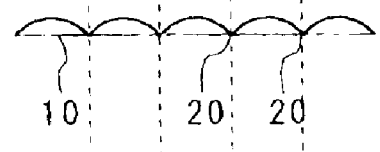
Figure 21C:
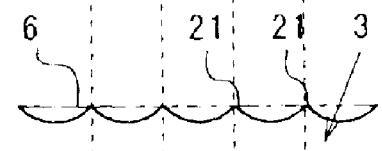
Figure 21D:
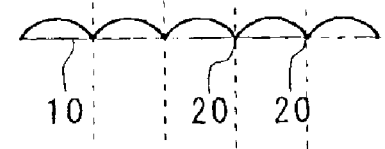

Each of the prism protrusions 20 on the side of the back surface 10 of the light guide plate 3 has the same height and shape (substantially triangle) in a range from a position P0, which is a predetermined distance away from the incidence surface 4 in directions of the optical axis, to the tip end of the light guide plate 3 (to the side face 22 opposite to the incidence surface 4) (see FIGS. 19D, 20D and 21D).

As shown in FIG. 18B, the height of each of the prism protrusions 20 on an optical axis La of a corresponding one of LEDs 5 on the side of the back surface 10 of the light guide plate 3 gradually decreases as a distance from the position P0, which is the predetermined distance away from the incidence surface 4, increases toward the incidence surface 4. As shown in FIG. 18A, the optical axis La is a line which passes through the center of the LED 5 and which is perpendicular to the incidence surface 4.

FIGS. 19A through 19D are enlarged sectional views of a part of the light guide plate 3, which are taken along lines XIXA—XIXA through XIXD—XIXD of FIG. 18B, respectively. As shown in these figures, on the side of the back surface 10 of the light guide plate 3, the shape of each groove between adjacent prism protrusions 20 and 20 is substantially triangular at the position P0 which is the predetermined distance away from the entrance plate 4 in directions of the optical axis (see FIG. 19D). In addition, the depth of each groove between adjacent prism protrusions 20 and 20 gradually decreases as a distance from the incidence surface 4 decreases, and the shape of each groove between adjacent prism protrusions 20 and 20 smoothly varies from the substantially triangle to a substantially circular-arc.

The height of the prism protrusions 20 on the side of the back surface 10 of the light guide plate 3 in the vicinity of the incidence surface 4 also varies in lateral directions (in directions perpendicular to the optical axis La as shown in FIG. 18A) so as to be greatest at the intermediate position between adjacent LEDs 5 and 5 and on both end portions of the light guide plate 3 in the lateral directions. That is, in this preferred embodiment, as shown in FIGS. 18C and 18D, the height of each of the prism protrusions 20 on the side of the back surface 10 of the light guide plate 3 gradually decreases as a distance from the position P0 increases toward the incidence surface 4, and is constant in a range which increases as a distance from the optical axis La increases in the lateral directions and which is the largest at the intermediate position between adjacent LEDs 5 and 5 and on both end portions of the light guide plate 3 in the lateral directions. This range corresponds to a range surrounded by the incidence surface 4 and the locus (curve M1 shown by dotted lines in FIG. 18A) of intersections Pa between a protrusion height varying portion (a third portion) and a protrusion height constant portion (a fourth portion). In the prism protrusions 20 on the side of the back surface 10 of the light guide plate 3, the protrusion height constant portion comprises the portion (the third portion) from the intersections Pa to the incidence surface 4 and a portion (a fifth portion) from the position P0 to the side face 22.

FIGS. 20A through 20D are enlarged sectional views of a part of the light guide plate 3 taken along lines XXA—XXA through XXD—XXD of FIG. 18C, respectively. As shown in these figures, on the side of the back surface 10 of the light guide plate 3, the shape of each groove between adjacent prism protrusions 20 and 20 is substantially triangular at a position P0 which is a predetermined distance away from the incidence surface 4 in directions of the optical axis (see FIG. 20D). In addition, the depth of each groove between adjacent prism protrusions 20 and 20 gradually decreases as a distance from the position P0 increases toward the incidence surface 4, and the shape thereof smoothly varies from the substantially triangle to a substantially circular arc (see FIGS. 20C to 20B). Moreover, the height of each of the prism protrusions 20 is constant on the side of the incidence surface 4 from the intersection Pa in FIG. 18C (see FIG. 20A).

FIGS. 21A through 21D are enlarged sectional views of a part of the light guide plate 3 taken along lines XXIA—XXIA through XXID—XXID of FIG. 18D, respectively. As shown in these figures, on the side of the back surface 10 of the light guide plate 3, the shape of each groove between adjacent prism protrusions 20 and 20 is substantially triangular at the position P0 which is the predetermined distance away from the incidence surface 4 in directions of the optical axis (see FIG. 21D). In addition, the depth of each groove between adjacent prism protrusions 20 and 20 gradually decreases as a distance from the position P0 increases toward the incidence surface 4, and the shape thereof smoothly varies from the substantially triangle to a substantially circular arc (see FIG. 21C). Moreover, the height of each of the prism protrusions 20 is constant on the side of the incidence surface 4 from the intersection Pa in FIG. 18D (see FIGS. 21B to 21A).

On the side of the back surface 10 of the light guide plate 3 in FIGS. 19A, 20A and 21A, the height of the prism protrusions 20 in FIGS. 19A, 20A and 21A increase in that order, and the height thereof smoothly varies in the lateral directions.

As shown in FIG. 18B, the height of each of the prism protrusions 21 on the side of the emission surface 6 of the light guide plate 3 and on the optical axis La of the LED 5 gradually increases as a distance from a position P1, which is a predetermined distance away from the incidence surface 4, increases toward the incidence surface 4, and is constant between a point Pb and the incidence surface 4.

FIGS. 19A through 19D are enlarged sectional views of a part of the light guide plate 3 taken along lines XIXA—XIXA through XIXD—XIXD of FIG. 18B, respectively. As shown in these figures, on the side of the emission surface 6 of the light guide plate 3, no prism protrusions 21 are formed between the position P1, which is the predetermined distance away from the incidence surface 4 in the directions of the optical axis, and the side face 22 on the tip end side (see FIG. 19D). In addition, the height of each of the prism protrusions 21 gradually increases between the position P1 and the point Pb as a distance from the incidence surface 4 decreases, and the height of each of the prism protrusions 21 is constant between the position Pb and the incidence surface 4. As shown in FIGS. 19A through 19C, the sectional shape of the prism protrusions 21 on the side of the emission surface 6 of the light guide plate 3 is a substantially wave shape so that the sectional shape of each groove between adjacent prism protrusions 21 and 21 is a substantially circular arc.

The height of the prism protrusions 21 on the side of the emission surface 6 of the light guide plate 3 in the vicinity of the incidence surface 4 also varies in the lateral directions so as to be greatest at the intermediate position between adjacent LEDs 5 and 5 and on both end portions of the light guide plate 3 in the lateral directions. That is, in this preferred embodiment, as shown in FIGS. 18B and 18C, the area of a range, in which the height of each of the prism protrusions 21 on the side of the emission surface 6 of the light guide plate 3 is constant, gradually decreases as a distance from the optical axis La increases, and is substantially zero at the intermediate position between adjacent LEDs 5 and 5 and on both end portions of the light guide plate 3 in the lateral directions. In other words, the range, in which the height of each of the prism protrusions 21 on the side of the emission surface 6 of the light guide plate is constant, is a range surrounded by the incidence surface 4 and the locus (curve M2 shown by thin lines in FIG. 18A) of intersections Pb between a protrusion height varying portion (a second portion) and a protrusion height constant portion (a first portion).

FIGS. 20A through 20D are enlarged sectional views of a part of the light guide plate 3 taken along lines XXA—XXA through XXD—XXD of FIG. 18C, respectively. As shown in these figures, on the side of the emission surface 6 of the light guide plate 3, the height of each of the prism protrusions 21 is constant between the incidence. surface 4 and the point Pb (see FIG. 20A), and gradually decreases between the point Pb and the position P1 as a distance from the position P1 decreases (see FIGS. 20B to 20C). As shown in FIGS. 20A through 20C, the sectional shape of the prism protrusions 21 has a substantially wave shape so that the sectional shape of each groove between adjacent prism protrusions 21 and 21 is a substantially circular arc.

FIGS. 21A through 21D are enlarged sectional views of a part of the light guide plate 3 taken along lines XXIA—XXIA through XXID—XXID of FIG. 18D, respectively. As shown in these figures, on the side of the emission surface 6 of the light guide plate 3, the height of each of the prism protrusions 21 gradually decreases as a distance from the position P1 increases toward the incidence surface 4. As shown in FIGS. 21A through 21C, the sectional shape of the prism protrusions 21 has a substantially wave shape so that the sectional shape of each groove between adjacent prism protrusions 21 and 21 is a substantially circular arc.

On the side of the emission surface 6 of the light guide plate 3 in FIGS. 19A, 20A and 21A, the height of the prism protrusions 21 in FIGS. 19A, 20A and 21A increases in that order, and the height thereof smoothly varies in the lateral directions of the light guide plate 3 similar to the back surface 10 of the light guide plate 3.

According to this preferred embodiment with the above described construction, it is possible to suppress the quantity of light leaving the light guide plate in the vicinity of the LEDs 5 serving as point light sources, and it is possible to increase the quality of light leaving portions, which are easy to be dark, between the LEDs 5 and 5 and on both end portions in the lateral directions, so that the luminance of the whole emission surface 6 can be uniform. Thus, bright lines H (see FIG. 40), which cause conventional problems, can be inconspicuous. As a result, the surface light source device 11 using the light guide plate 3 in this preferred embodiment can provide bright and uniform surface illumination. The image display unit 1 using the light guide plate 3 in this preferred embodiment can have improved display quality.

In this preferred embodiment, the respective points P0, P1, Pa and Pb may be suitably changed in accordance with the size of the light guide plate 3, the thickness T of the light guide plate 3 on the side of the incidence surface 4, the distance between adjacent LEDs 5 and 5 and so forth. However, in the case of a light guide plate which is used for illuminating a liquid display unit of a portable telephone or the like and in which the area of the emission surface 6 is smaller than that in a light guide plate for a liquid crystal monitor of a personal computer, it has been verified by experiment that the positions P0 and P1 are effectively set to be substantially 20 T from the entrance plate 4.

(Modified Example of Third Preferred Embodiment)

While the LEDs 5 serving as point light sources have been used in the above described third preferred embodiment, a fluorescent lamp 5A serving as a linear light source may be substituted for the LEDs 5 as shown in FIGS. 23A through 23D. In the surface light source device 11 shown in FIGS. 23A through 23D, the same reference numbers are given to the same portions as those in the above described third preferred embodiment, and repeated descriptions thereof are omitted.

Each of the prism protrusions 20 on the side of the back surface 10 of the light guide plate 3 has the same height and shape (substantially triangle) in a range between a position P0, which is a predetermined distance away from the incidence surface 4 in directions of the optical axis, and the tip end of the light guide plate 3 (the side face 22 opposite to the incidence surface 4) (see FIGS. 19D, 20D and 21D) As shown in FIG. 23A, the direction of the optical axis is a direction which is perpendicular to the longitudinal direction of the fluorescent lamp 5A and which is perpendicular to the incidence surface 4.

As shown in FIG. 23B, the height of each of the prism protrusions 20 formed on the side of the back surface 10 of the light guide plate 3 at a lateral position, which is a distance Lb away from the end face of the fluorescent lamp 5A, gradually decreases as a distance from the position P0, which is the predetermined distance away from the incidence surface 4, increases toward the incidence surface 4.

The enlarged sectional views of a part of the light guide plate 3, which are taken along lines XIXA—XIXA through XIXD—XIXD of FIG. 23B are the same as FIGS. 19A through 19D, respectively. As shown in these figures, on the side of the back surface 10 of the light guide plate 3, the shape of each groove between adjacent prism protrusions 20 and 20 is substantially triangular at the position P0 which is the predetermined distance away from the entrance plate 4 in directions of the optical axis (see FIG. 19D). In addition, as a distance from the incidence surface 4 decreases, the depth of each groove between adjacent prism protrusions 20 and 20 gradually decreases, and the shape of each groove between adjacent prism protrusions 20 and 20 smoothly varies from the substantially triangle to a substantially circular-arc.

The height of the prism protrusions 20 on the side of the back surface 10 of the light guide plate 3 in the vicinity of the incidence surface 4 also varies in lateral directions (along the incidence surface 4 as shown in FIG. 23A) so as to be greatest on both end portions of the light guide plate 3 in the lateral directions. That is, in this modified example, as shown in FIGS. 23C and 23D, the height of each of the prism protrusions 20 on the side of the back surface 10 of the light guide plate 3 gradually decreases as a distance from the position P0 increases toward the incidence surface 4, and is constant in a range which increases from the vicinity of each of the end portions of the fluorescent lamp 5A toward a corresponding one of both ends of the fluorescent lamp 5A and which is the largest on both end portions of the light guide plate 3 in the lateral directions. These prism protrusions 20 on the side of the back surface 10 of the light guide plate 3 are arranged in corner portions on the side of the incidence surface 4, which are surrounded by the loci (curves M3 shown by dotted lines in FIG. 23A) of intersections Pa between a protrusion height varying portion (a third portion) and a protrusion height constant portion (a fourth portion). In the prism protrusions 20 on the side of the back surface 10 of the light guide plate 3, the protrusion height constant portion comprises the portion (the third portion) from the intersections Pa to the incidence surface 4 and a portion (a fifth portion) from the position P0 to the side face 22.

The enlarged sectional views of a part of the light guide plate 3 taken along lines XXA—XXA through XXD—XXD of FIG. 23C are the same as FIGS. 20A through 20D, respectively. As shown in these figures, on the side of the back surface 10 of the light guide plate 3, the shape of each groove between adjacent prism protrusions 20 and 20 is substantially triangular at a position P0 which is a predetermined distance away from the incidence surface 4 in directions of the optical axis (see FIG. 20D). In addition, as a distance from the position P0 increases toward the incidence surface 4, the depth of each groove between adjacent prism protrusions 20 and 20 gradually decreases, and the shape thereof smoothly varies from the substantially triangle to a substantially circular arc (see FIGS. 20C to 20B). Moreover, the height of each of the prism protrusions 20 is constant between the incidence surface 4 and the intersection Pa in FIG. 23C (see FIG. 20A).

The enlarged sectional views of a part of the light guide plate 3 taken along lines XXIA—XXIA through XXID—XXID of FIG. 23D are the same as FIGS. 21A through 21D, respectively. As shown in these figures, on the side of the back surface 10 of the light guide plate 3, the shape of each groove between adjacent prism protrusions 20 and 20 is substantially triangular at the position P0 which is the predetermined distance away from the incidence surface 4 in directions of the optical axis (see FIG. 21D). In addition, as a distance from the position P0 increases toward the incidence surface 4, the depth of each groove between adjacent prism protrusions 20 and 20 gradually decreases, and the shape thereof smoothly varies from the substantially triangle to a substantially circular arc (see FIG. 21C) . Moreover, the height of each of the prism protrusions 20 is constant between the incidence surface 4 and the intersection Pa in FIG. 23D (see FIGS. 21B to 21A).

On the side of the back surface 10 of the light guide plate 3 in FIGS. 19A, 20A and 21A, the height of the prism protrusions 20 in FIGS. 19A, 20A and 21A increases in that order, and the height thereof smoothly increases (in the lateral directions) from a position in the vicinity of each of the end portions of the fluorescent lamp 5A (a position which is a distance Lb away from each of the end faces) toward a corresponding one of both ends of the fluorescent lamp 5A.

As shown in FIG. 23B, in the vicinity of each of the end portions of the fluorescent lamp 5A, which is a predetermined distance Lb away from the corresponding one of both ends of the fluorescent lamp 5A, the height of the prism protrusion 21 formed on the side of the emission surface 6 of the light guide plate 3 gradually increases as a distance from a position P1, which is a predetermined distance away from the incidence surface 4, increases toward the incidence surface 4, and is constant between a point Pb and the incidence surface 4.

The enlarged sectional views of a part of the light guide plate 3 taken along lines XIXA—XIXA through XIXD—XIXD of FIG. 23B are the same as FIGS. 19A through 19D, respectively. As shown in these figures, on the side of the emission surface 6 of the light guide plate 3, no prism protrusions 21 are formed between the position P1, which is the predetermined distance away from the incidence surface 4 in the directions of the optical axis, and the side face 22 on the tip end side (see FIG. 19D). In addition, the height of each of the prism protrusions 21 gradually increases between the position P1 and the point Pb as a distance from the incidence surface 4 decreases, and the height of each of the prism protrusions 21 is constant between the position Pb and the incidence surface 4. As shown in FIGS. 19A through 19C, the sectional shape of the prism protrusions 21 on the side of the emission surface 6 of the light guide plate 3 is a substantially wave shape so that the sectional shape of each groove between adjacent prism protrusions 21 and 21 is a substantially circular arc.

The height of the prism protrusions 21 on the side of the emission surface 6 of the light guide plate 3 in the vicinity of the incidence surface 4 also varies in the lateral directions so as to be greatest on both end portions of the light guide plate 3 in the lateral directions. That is, in this modified example, as shown in FIGS. 23B and 23C, the area of a range, in which the height of each of the prism protrusions 21 on the side of the emission surface 6 of the light guide plate 3 is constant, gradually decreases from the vicinity of each of the end portions of the fluorescent lamp 5A toward a corresponding one of both ends of the fluorescent lamp 5A, and is substantially zero in both end portions of the light guide plate 3 in the lateral directions on the side of the incidence surface 4. In other words, the range, in which the height of each of the prism protrusions 21 on the side of the emission surface 6 of the light guide plate 3 is constant, is a range surrounded by the incidence surface 4 and the locus (curve M4 shown by thin lines in FIG. 23A) of intersections Pb between a protrusion height varying portion (a second portion) and a protrusion height constant portion (a first portion).

The enlarged sectional views of a part of the light guide plate 3 taken along lines XXA—XXA through XXD—XXD of FIG. 23C are the same as FIGS. 20A through 20D, respectively. As shown in these figures, on the side of the emission surface 6 of the light guide plate 3, the height of each of the prism protrusions 21 is constant between the incidence surface 4 and the point Pb (see FIG. 20A), and gradually decreases as a distance from the point Pb increases toward the position P1 (see FIGS. 20B to 20C) As shown in FIGS. 20A through 20C, the sectional shape of the prism protrusions 21 has a substantially wave shape so that the sectional shape of each groove between adjacent prism protrusions 21 and 21 is a substantially circular arc.

The enlarged sectional views of a part of the light guide plate 3 taken along lines XXIA—XXIA through XXID—XXID of FIG. 23D are the same as FIGS. 21A through 21D, respectively. As shown in these figures, on the side of the emission surface 6 of the light guide plate 3, the height of each of the prism protrusions 21 gradually increases as a distance from the position P1 increases toward the incidence surface 4. As shown in FIGS. 21A through 21C, the sectional shape of the prism protrusions 21 has a substantially wave shape so that the sectional shape of each groove between adjacent prism protrusions 21 and 21 is a substantially circular arc.

On the side of the emission surface 6 of the light guide plate 3 in FIGS. 19A, 20A and 21A, the height of the prism protrusions 21 in FIGS. 19A, 20A and 21A increases in that order, and the height thereof smoothly varies in the lateral directions of the light guide plate 3 similar to the back surface 10 of the light guide plate 3.

According to the light guide plate 3 in this modified example with the above described construction, it is possible to increase the quantity of light leaving the corner portions of the light guide plate 3 on the side of the incidence surface 4, which correspond to both end portions of the fluorescent lamp 5A, so that low luminance portions, which are easily caused when the fluorescent lamp 5A is used as a light source, can be inconspicuous. According to the light guide plate 3 in this modified example, the height of the prism protrusions 20 and 21 on the side of the incidence surface 4 varies in the lateral directions, and the shape of each groove between adjacent prism protrusions 20 or 21 is the substantially circular arc, so that the light reflecting/diffusing function of the prism protrusions 20 and 21 is devised. Thus, bright lines caused by light entering the upper and lower edges 4A and 4B of the incidence surface 4 can be inconspicuous. As a result, the surface light source device 11 using the light guide plate 3 in this modified example can provide bright and uniform surface illumination. The image display unit 1 using the light guide plate 3 in this modified example can have improved display quality.

[Fourth Preferred Embodiment]

FIGS. 24A through 24D show the fourth preferred embodiment of a light guide plate 3 according to the present invention. FIG. 24A is a plan view of the light guide plate 3 viewed from the side of an emission surface 6 of the light guide plate 3, FIG. 24B is a sectional view taken along line XXIVB—XXIVB of FIG. 24A, FIG. 24C is a sectional view taken along line XXIVC—XXIVC of FIG. 24A, and FIG. 24D is a sectional view taken along line XXIVD—XXIVD of FIG. 24A.

In the light guide plate 3 in this preferred embodiment, the height of prism protrusions 25 and 26 on both of the back surface 10 and emission surface 6 varies in lateral directions similar to the light guide plate 3 in the above described third preferred embodiment. However, how to vary the height of the prism protrusions 25 and 26 is different from that in the light guide plate 3 in the above described third preferred embodiment.

That is, similar to the light guide plates 3 in the above described first through third preferred embodiments, the light guide plate 3 in this preferred embodiment has a substantially wedge-shaped cross section so as to have a thickness decreasing as a distance from an incidence surface 4 increases, and has a substantially rectangular shape on a plane. On a back surface 10 of the light guide plate 3 in the whole region thereof, a large number of prism protrusions 25 are formed. On an emission surface 6 of the light guide plate 3 in a predetermined range from the incidence surface 4, a large number of prism protrusions 26 are formed. These prism protrusions 25 and 26 extend in parallel to directions substantially perpendicular to the incidence surface 4 and are arranged along the incidence surface 4.

The height of each of the prism protrusions 26 on the emission surface gradually increases as a distance from a point P2, which is a predetermined distance away from the incidence surface 4 (for example, which is about 20 T away from the incidence surface 4 assuming that the thickness of the light guide plate 3 on the incidence surface 4 is T), increases toward the incidence surface 4. In addition, the height of the prism protrusions 26 on the emission surface 6 gradually increases as a distance from the optical axis of each of the LEDs 5 increases in lateral directions of the light guide plate 3, and is greatest at the intermediate position between adjacent LEDs 5 and 5 and on both end portions of the light guide plate 3 in the lateral directions. As shown in FIGS. 24B, 24C and 24D, the prism protrusions 26 on the emission surface 6 are formed so that an angle a of inclination of a groove 26a between adjacent prism protrusions 26 and 26 (an angle between the groove 26a and the emission surface 6) increases as a distance from the optical axis La increases in the lateral directions of the light guide plate 3. As a result, the height of the prism protrusions 26 on the emission surface 6 gradually increases as a distance from the optical axis La increases in the lateral directions of the light guide plate 3 as described above.

The prism protrusions 25 on the back surface 10 are formed so as to have the same height in a range between a point P3 which is a predetermine distance away from the incidence surface 4 (e.g., a position which is about 20 T away from the incidence surface 4 assuming that the thickness of the light guide plate 3 on the side of the incidence surface 4 is T), and the tip end (the side face 22) of the light guide plate 3. The prism protrusions 25 on the back surface 10 are also formed so as to have a height gradually decreasing in a range between the incidence surface 4 and the point P3 as a distance from the incidence surface 4 decreases. In addition, the height of the prism protrusions 25 on the back surface 10 gradually increases as a distance from the optical axis La increases in the lateral directions of the light guide plate 3. Moreover, the height of the prism protrusions 25 on the back surface 10 is greatest at the intermediate position between adjacent LEDs 5 and 5 and on both end portions of the light guide plate 3 in the lateral directions. As shown in FIGS. 24B, 24C and 24D, the prism protrusions 25 on the back surface 10 are formed so that an angle β of inclination of a groove 25a between adjacent prism protrusions 25 and 25 (an angle between the groove 25a and the back surface 10) decreases as a distance from the optical axis La increases in the lateral directions of the light guide plate 3. Furthermore, the angle β of inclination of the groove 25a between adjacent prism protrusions 25 and 25 may be β=0° at the intermediate position between adjacent LEDs 5 and 5 and on both end portions of the light guide plate 3 in the lateral directions.

Similar to the light guide plate 3 in the above described third preferred embodiment, the light guide plate 3 in this preferred embodiment with the above described construction can suppress the quantity of light leaving the light guide plate 3 in the vicinity of each of the LEDs 5, and can increase the quantity of light leaving portions, which are easy to be dark, between the LEDs 5 and 5 and on both end portions in the lateral directions, so that the luminance of the whole emission surface 6 can be uniform. Thus, bright lines H (see FIG. 40), which cause conventional problems, can be inconspicuous. As a result, the surface light source device 11 using the light guide plate 3 in this preferred embodiment can provide bright and uniform surface illumination (see FIGS. 1 and 8). The image display unit 1 using the light guide plate 3 in this preferred embodiment can have improved display quality (see FIGS. 1 and 8).

If the sectional shape of the groove 26a (25a) between adjacent prism protrusions 26 and 26 (25 and 25) between the point P2 (P3) and incidence surface 4 of the light guide plate 3 is a substantially circular arc as shown in FIG. 19A, the diffusion or irregular reflection of light can be effectively caused, so that the luminance of light leaving the light guide plate 3 can be more effectively uniform and enhanced.

(Modified Example of Fourth Preferred Embodiment)

Figure 25A:
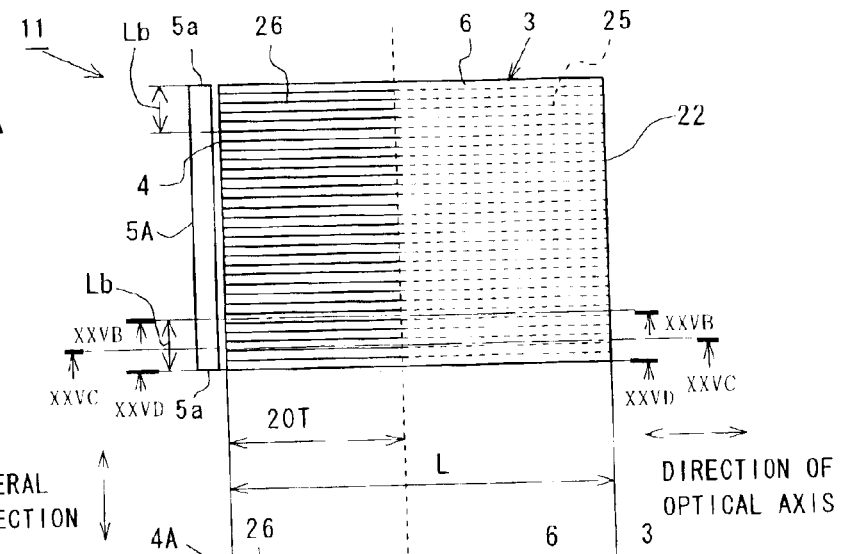
FIGS. 25A through 25D are views showing a modified example of the fourth preferred embodiment of a light guide plate according to the present invention, FIG. 25A being a plan view of the light guide plate, FIG. 25B being a sectional view taken along line XXVB—XXVB of FIG. 25A, FIG. 25C being a sectional view taken along line XXVC—XXVC of FIG. 25A, and FIG. 25D being a sectional view taken along line XXVD—XXVD of FIG. 25A.
Figure 25B:
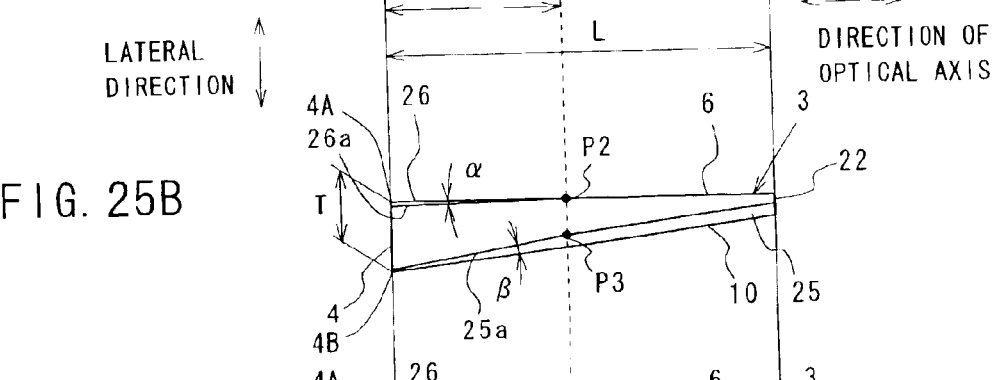
Figure 25C:
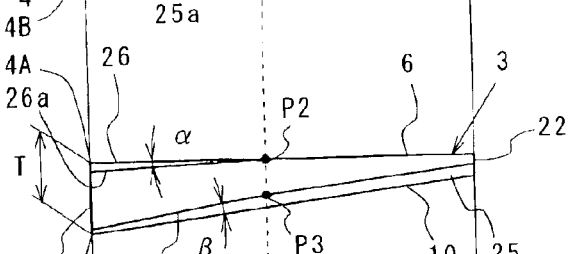
Figure 25D:
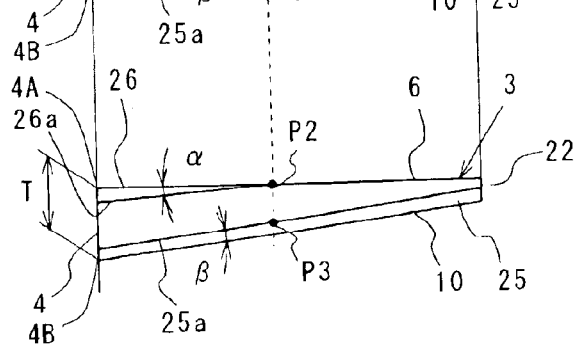

While the LEDs 5 serving as point light sources have been used in the above described fourth preferred embodiment, a fluorescent lamp 5A serving as a linear light source may be substituted for the LEDs 5 as shown in FIGS. 25A through 25D. In the surface light source device 11 shown in FIGS. 25A through 25D, the same reference numbers are given to the same portions as those in the above described fourth preferred embodiment, and repeated descriptions thereof are omitted. FIG. 25A is a plan view of a light guide plate 3 viewed from the side of an emission surface 6 thereof, FIG. 25B is a sectional view taken along line XXVB—XXVB of FIG. 25A, FIG. 25C is a sectional view taken along line XXVC—XXVC of FIG. 25A, and FIG. 25D is a sectional view taken along line XXVD—XXVD of FIG. 25A.

Similar to the light guide plates 3 in the above described first through fourth preferred embodiments, the light guide plate 3 in this modified example has a substantially wedge-shaped cross section so as to have a thickness decreasing as a distance from an incidence surface 4 increases, and has a substantially rectangular shape on a plane. On a back surface 10 of the light guide plate 3 in the whole region thereof, a large number of prism protrusions 25 are formed. On an emission surface 6 of the light guide plate 3 in a predetermined range from the incidence surface 4, a large number of prism protrusions 26 are formed. These prism protrusions 25 and 26 extend in parallel to directions substantially perpendicular to the incidence surface 4 and are arranged along the incidence surface 4.

The height of each of the prism protrusions 26 on the emission surface 6 gradually increases as a distance from a point P2 which is a predetermined distance away from the incidence surface 4 (e.g., a position which is about 20 T away from the incidence surface 4 assuming that the thickness of the light guide plate 3 on the incidence surface 4 is T), increases toward the incidence surface 4. In addition, the height of the prism protrusions 26 on the emission surface 6 gradually increases in a direction from a position in the vicinity of each of the end portions of the fluorescent lamp 5A (a position which is a distance of La away from each of the end faces of the fluorescent lamp 5A) toward a corresponding one of the end faces of the fluorescent lamp 5A, so as to be greatest on both end portions of the light guide plate 3 in lateral directions. As shown in FIGS. 25B, 25C and 25D, the prism protrusions 26 on the emission surface 6 are formed so that an angle α of inclination of a groove 26a between adjacent prism protrusions 26 and 26 (an angle between the groove 26a and the emission surface 6) increases in a direction from the position in the vicinity of each of the end portions of the fluorescent lamp 5A toward the corresponding one of the end faces of the fluorescent lamp 5A. As a result, the height of each of the prism protrusions 26 on the emission surface 6 gradually increases in a direction from the position in the vicinity of each of the end portions of the fluorescent lamp 5A toward the corresponding one of the end faces of the fluorescent lamp 5A.

Each of the prism protrusions 25 on the back surface 10 has the same height in a range between a point P3 which is a predetermine distance away from the incidence surface 4 (e.g., a position which is about 20 T away from the incidence surface 4 assuming that the thickness of the light guide plate 3 on the side of the incidence surface 4 is T), and the tip end (the side face 22) of the light guide plate 3. Each of the prism protrusions 25 on the back surface 10 also has a height gradually decreasing in a range between the incidence surface 4 and the point P3 as a distance from the incidence surface 4 decreases. In addition, the height of the prism protrusions 25 on the back surface 10 gradually increases in a direction from the position in the vicinity of each of the end portions of the fluorescent lamp 5A toward the corresponding one of the end faces of the fluorescent lamp 5A. Moreover, the height of the prism protrusions 25 on the back surface 10 is greatest on both end portions of the light guide plate 3 in the lateral directions. As shown in FIGS. 25B, 25C and 25D, the prism protrusions 25 on the back surface 10 are formed so that an angle β of inclination of a groove 25a between adjacent prism protrusions 25 and 25 (an angle between the groove 25a and the back surface 10) decreases in a direction from the position in the vicinity of each of the end portions of the fluorescent lamp 5A toward the corresponding one of the end faces of the fluorescent lamp 5A. Furthermore, the angle β of inclination of the groove 25a between adjacent prism protrusions 25 and 25 may be β=0° on both end portions of the light guide plate 3 in the lateral directions.

The light guide plate 3 in this modified example with the above described construction can suppress the quantity of light leaving the corner portions of the light guide plate 3 on the side of the incidence surface 4, which correspond to both end portions of the fluorescent lamp 5A, so that low luminance portions, which are easily caused when the fluorescent lamp 5A is used as a light source, can be inconspicuous. According to the light guide plate 3 in this modified example, the height of the prism protrusions 25 and 26 on the side of both ends in the lateral directions and on the side of the incidence surface 4 varies in the lateral directions so as to be greatest on both end portions in the lateral directions. Thus, bright lines caused by light entering the upper and lower edges 4A and 4B of the incidence surface 4 can be inconspicuous. As a result, the surface light source device 11 using the light guide plate 3 in this modified example can provide bright and uniform surface illumination. The image display unit 1 using the light guide plate 3 in this modified example can have improved display quality.

For example, if the sectional shape of the groove 26a (25a) between adjacent prism protrusions 26 and 26 (25 and 25) in a region between the point P2 (P3) and the incidence surface 4 of the light guide plate 3 is a substantially circular arc as shown in FIG. 19A, the diffusion or irregular reflection of light can be effectively caused, so that the luminance of light leaving the light guide plate 3 can be more effectively uniform and enhanced.

[Fifth Preferred Embodiment]

FIGS. 26A through 26D show the fifth preferred embodiment of a surface light source device 11 according to the present invention. FIG. 26A is a plan view of a light guide plate 3 viewed from the side of an emission surface 6 thereof, FIG. 26B is a sectional view taken along line XXVIB—XXVIB of FIG. 26A, FIG. 26C is a sectional view taken along line XXVIC—XXVIC of FIG. 26A, and FIG. 26D is a sectional view taken along line XXVID—XXVID of FIG. 26A.

In the light guide plate 3 in this preferred embodiment, the height of prism protrusions 27 and 28 on both of the back surface 10 and emission surface 6 of the light guide plate 3 varies in lateral directions similar to the light guide plates 3 in the above described third and fourth preferred embodiments. However, how to vary the height of the prism protrusions 27 and 28 is different from that in the light guide plates 3 in the above described third and fourth preferred embodiments.

That is, similar to the light guide plates 3 in the above described first through fourth preferred embodiments, the light guide plate 3 in this preferred embodiment has a substantially wedge-shaped cross section so as to have a thickness decreasing as a distance from an incidence surface 4 increases, and has a substantially rectangular shape on a plane. On the back surface 10 of the light guide plate 3 in the whole region thereof, a large number of prism protrusions 27 are formed. On the emission surface 6 in the vicinity of the incidence surface 4 (particularly in a portion in which abnormal emissions (bright lines) are easily caused), a large number of prism protrusions 28 are formed. These prism protrusions 27 and 28 extend in parallel to directions substantially perpendicular to the incidence surface 4 and are arranged along the incidence surface 4.

The height of each of the prism protrusions 28 on the emission surface 6 gradually increases as a distance from the incidence surface 4 decreases. In addition, the height of the prism protrusions 28 on the emission surface 6 gradually increases as a distance from the optical axis La of each of the LEDs 5 increases in lateral directions of the light guide plate 3, so that it is greatest at the intermediate position between adjacent LEDs 5 and 5 and on both end portions of the light guide plate 3 in the lateral directions. As shown in FIGS. 26B through 26D, the prism protrusions 28 on the emission surface 6 are formed so as to have the same angle δ of inclination of a groove 28a between adjacent prism protrusions 28 and 28 (an angle between the groove 28a and the emission surface 6). As a result, as shown in FIG. 26A, a position P4 at which no prism protrusion 28 is formed on the emission surface 6 (a point at which the height of the prism protrusion 28 is zero) is nearest to the incidence surface 4 on the optical axis La, and farthest from the incidence surface 4 at the intermediate position between adjacent LEDs 5 and 5 and on both end portions of the light guide plate 3. As shown in FIG. 26A, the locus of the points P4 at which the height of the prism protrusions 28 on the emission surface 6 is zero has a shape which is formed by connecting smooth curves M5 in a wave form. In this preferred embodiment, the position at which the height of the prism protrusion 28 on the emission surface 6 is zero and which is farthest from the incidence surface 4 is determined so as to be a position which is about 20 T away from the incidence surface 4 in the directions of the optical axis assuming that the thickness of the light guide plate 3 on the side of the incidence surface 4 is T.

The prism protrusions 27 on the back surface 10 are formed so as to have the same height in at least a region between points which are a predetermined distance from the incidence surface 4 (positions which are about 20 T away from the incidence surface assuming that the thickness of the light guide plate on the incidence surface is T), and the tip end (the side face 22) of the light guide plate 3. The height of each of the prism protrusions 27 on the back surface 10 gradually decreases in the vicinity of the incidence surface 4 as a distance from a portion, in which the height of the prism protrusions 27 is constant, increases toward the incidence surface 4. In addition, the height of the prism protrusions 27 on the back surface 10 gradually increases as a distance from the optical axis La increases in the lateral directions of the light guide plate 3. Moreover, the height of the prism protrusions 27 on the back surface 10 is greatest at the intermediate position between adjacent LEDs 5 and 5 and on both end portions of the light guide plate 3 in the lateral directions. As shown in FIGS. 26B, 26C and 26D, the prism protrusions 27 on the back surface 10 are formed so that an angle θ of inclination of a groove 27a between adjacent prism protrusions 27 and 27 (an angle between the groove 27a and the back surface 10) is constant on any cross sections. Therefore, an intersection P5 between a portion, in which the height of the prism protrusions 27 on the back surface 10 is constant, and a portion, in which the height of the prism protrusions 27 varies, is farthest from the incidence surface 4 on the optical axis La, and approaches the incidence surface 4 as a distance from the optical axis La increases in the lateral directions of the light guide plate 3. Thus, as shown in FIG. 26A, the locus of the intersections P5, at which the height of the prism protrusions 27 on the back surface 10 varies, has a shape which is formed by connecting smooth curves (curves shown by dotted lines) M6 in a wave form and which is substantially formed by inverting the locus M5 on the side of the emission surface 6. On the cross section shown in FIG. 26D, the height of the prism protrusion 27 may be substantially constant in the whole region of the back surface 10. In this case, the locus of the intersections P5 between the portion, in which the height of the prism protrusions 27 on the back surface 10 is constant, and the portion, in which the height of the prism protrusions 27 varies, is a smooth curve extending from a position, which is a predetermined distance 20 T away from the incidence surface 4, to the incidence surface 4.

Similar to the light guide plates 3 in the above described third and fourth preferred embodiments, the light guide plate 3 in this preferred embodiment with the above described construction can suppress the quantity of light leaving the light guide plate 3 in the vicinity of the LEDs 5, and can increase the quantity of light leaving portions, which are easy to be dark, between the LEDs 5 and 5 and on both end portions in the lateral directions, so that the luminance of the whole emission surface 6 can be uniform. Thus, bright lines H (see FIG. 40), which cause conventional problems, can be inconspicuous. As a result, the surface light source device 11 using the light guide plate 3 in this preferred embodiment can provide bright and uniform surface illumination (see FIGS. 1 and 8). The image display unit 1 using the light guide plate 3 in this preferred embodiment can have improved display quality (see FIGS. 1 and 8).

(Modified Example of Fifth Preferred Embodiment)

Figure 27A:
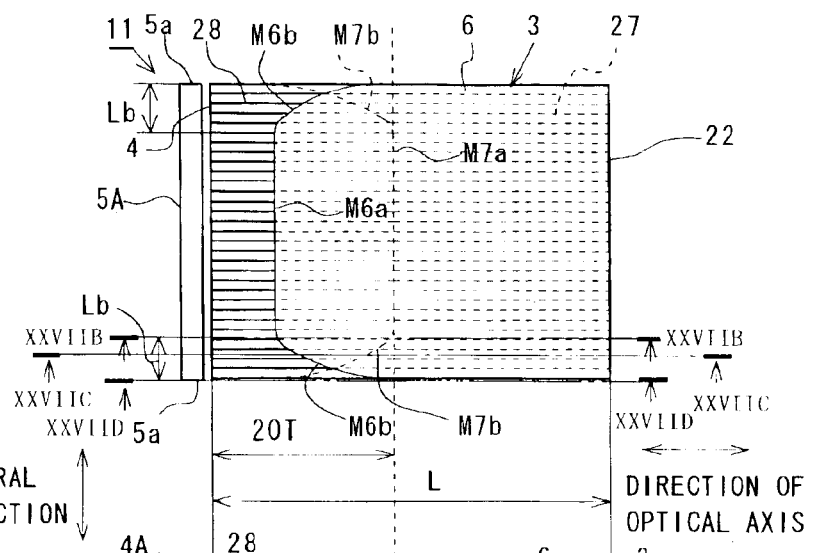
FIGS. 27A through 27D are views showing a modified example of the fifth preferred embodiment of a light guide plate according to the present invention, FIG. 27A being a plan view of the light guide plate, FIG. 27B being a sectional view taken along line XXVIIB—XXVIIB of FIG. 27A, FIG. 27C being a sectional view taken along line XXVIIC—XXVIIC of FIG. 27A, and FIG. 27D being a sectional view taken along line XXVIID—XXVIID of FIG. 27A.
Figure 27B:
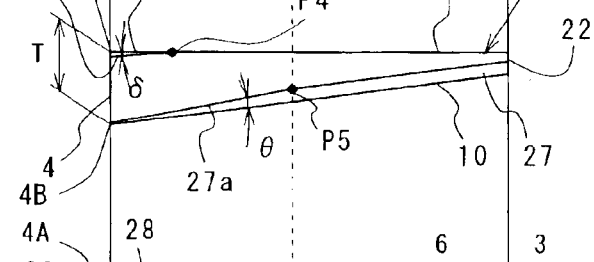
Figure 27C:
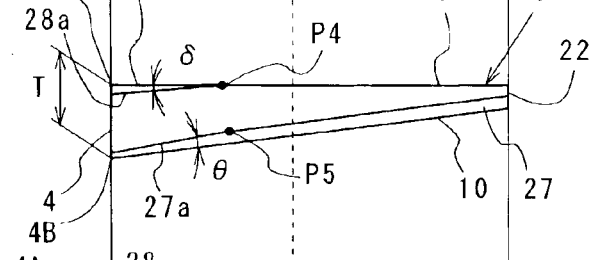
Figure 27D:
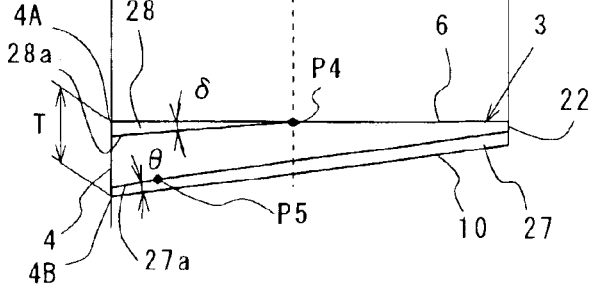

While the LEDs 5 serving as point light sources have been used in the above described fifth preferred embodiment, a fluorescent lamp 5A serving as a linear light source may be substituted for the LEDs 5 as shown in FIGS. 27A through 27D. In a surface light source device 11 shown in FIGS. 27A through 27D, the same reference numbers are given to the same portions as those in the above described fifth preferred embodiment, and repeated descriptions thereof are omitted. FIG. 27A is a plan view of a light guide plate 3 viewed from the side of an emission surface 6 thereof, FIG. 27B is a sectional view taken along line XXVIIB—XXVIIB of FIG. 27A, FIG. 27C is a sectional view taken along line XXVIIC—XXVIIC of FIG. 27A, and FIG. 27D is a sectional view taken along line XXVIID—XXVIID of FIG. 27A.

Similar to the light guide plate 3 in the above described fifth preferred embodiment, the light guide plate 3 in this modified example has a substantially wedge-shaped cross section so as to have a thickness decreasing as a distance from an incidence surface 4 increases, and has a substantially rectangular shape on a plane. On a back surface 10 of the light guide plate 3 in the whole region thereof, a large number of prism protrusions 27 are formed. On the emission surface 6 in the vicinity of the incidence surface 4 (particularly in a portion in which abnormal emissions (bright lines) are easily caused), a large number of prism protrusions 28 are formed. These prism protrusions 27 and 28 extend in parallel to directions substantially perpendicular to the incidence surface 4 and are arranged along the incidence surface 4.

The height of each of the prism protrusions 28 on the emission surface 6 gradually increases as a distance from the incidence surface 4 decreases. In addition, the height of the prism protrusions 28 on the emission surface 6 gradually increases in a direction from a position (a position in the vicinity of each of the end portions of the fluorescent lamp 5A), which is a distance Lb away from each of the end faces of the fluorescent lamp 5A, toward a corresponding one of the end faces of the fluorescent lamp 5A, so as to be greatest on both end portions of the light guide plate 3 in the lateral directions.

As shown in FIGS. 27B through 27D, the prism protrusions 28 on the emission surface 6 are formed so as to have the same angle δ of inclination of a groove 28a between adjacent prism protrusions 28 and 28 (an angle between the groove 28a and the emission surface 6). As a result, as shown in FIG. 27A, positions P4 at which no prism protrusion 28 is formed on the emission surface 6 (points at which the height of the prism protrusion 28 is zero) are nearest to the incidence surface 4 between the positions in the vicinity of both end portions of the fluorescent lamp 5A to be arranged along a straight line M6a which is substantially parallel to the incidence surface 4, and farthest from the incidence surface 4 on both end portions of the light guide plate 3. As shown in FIG. 27A, the locus of the points P4 at which the height of the prism protrusions 28 on the emission surface 6 is zero has a shape which is formed by connecting smooth curves M6b and M6b to both ends of the straight line M6a. In this preferred embodiment, the positions P4 at which the height of the prism protrusion 28 on the emission surface 6 is zero and which are farthest from the incidence surface 4 are determined so as to be positions which are about 20 T away from the incidence surface 4 in the directions of the optical axis assuming that the thickness of the light guide plate 3 on the side of the incidence surface 4 is T.

The prism protrusions 27 on the back surface 10 are formed so as to have the same height in at least a region between points which are a predetermined distance from the incidence surface 4 (positions which are about 20 T away from the incidence surface assuming that the thickness of the light guide plate on the incidence surface is T), and the tip end (the side face 22) of the light guide plate 3. The height of the prism protrusions 27 on the back surface 10 gradually decreases in the vicinity of the incidence surface 4 in a direction from a portion, in which the height of the prism protrusions 27 is constant, toward the incidence surface 4. In addition, the height of the prism protrusions 27 on the back surface 10 gradually increase in a direction from the position in the vicinity of each of the end portions of the fluorescent lamp 5A, toward a corresponding one of the end faces of the fluorescent lamp 5A. Moreover, the height of the prism protrusions 27 on the back surface 10 is greatest on both end portions of the light guide plate 3 in the lateral directions.

As shown in FIGS. 27B, 27C and 27D, the prism protrusions 27 on the back surface 10 are formed so that an angle θ of inclination of a groove 27a between adjacent prism protrusions 27 and 27 (an angle between the groove 27a and the back surface 10) is constant on any cross sections. Therefore, intersections P5 between a portion, in which the height of the prism protrusions 27 on the back surface 10 is constant, and a portion, in which the height of the prism protrusions 27 varies, are farthest from the incidence surface 4 between positions in the vicinity of each of both end portions of the fluorescent lamp 5A, and approach the incidence surface 4 in a direction from the position in the vicinity of each of both end portions of the fluorescent lamp 5A toward a corresponding one of the end faces of the fluorescent lamp 5A. Thus, as shown in FIG. 27A, the locus of the intersections P5, at which the height of the prism protrusions 27 on the back surface 10 varies, has a shape which is formed by connecting smooth curves (curves shown by dotted lines) M7b and M7b on both sides to a straight line M7a and which is substantially formed by inverting the locus on the side of the emission surface 6 (the line formed by connecting the curves M6b and M6b to the straight line M6a). On the cross section shown in FIG. 27D, the height of the prism protrusions 27 may be substantially constant in the whole region of the back surface 10. In this case, the locus of the intersections P5 between the portion, in which the height of the prism protrusions 27 on the back surface 10 is constant, and the portion, in which the height of the prism protrusions 27 varies, is a smooth curve extending from a position, which is a predetermined distance 20 T away from the incidence surface 4, to the incidence surface 4.

The light guide plate 3 in this modified example with the above described construction can suppress the quantity of light leaving the corner portions of the light guide plate 3 on the side of the incidence surface 4, which correspond to both end portions of the fluorescent lamp 5A, so that low luminance portions, which are easily caused when the fluorescent lamp 5A is used as a light source, can be inconspicuous.

According to the light guide plate 3 in this modified example, the height of the prism protrusions 27 and 28 on both end sides in the lateral directions and on the side of the incidence surface 4 varies in the lateral directions so as to be greatest on both end portions in the lateral directions. Thus, bright lines caused by light entering the upper and lower edges 4A and 4B of the incidence surface 4 can be inconspicuous. As a result, the surface light source device 11 using the light guide plate 3 in this modified example can provide bright and uniform surface illumination. The image display unit 1 using the light guide plate 3 in this modified example can have improved display quality.

For example, if the sectional shape of the groove 28a (27a) between adjacent prism protrusions 28 and 28 (27 and 27) in a region between the point P4 (P5) and the incidence surface 4 of the light guide plate 3 is a substantially circular arc as shown in FIG. 19A, the diffusion or irregular reflection of light can be effectively caused, so that the luminance of light leaving the light guide plate 3 can be more effectively uniform and enhanced.

[Sixth Preferred Embodiment]

Figures 28A, 28B, 28C, 28D:
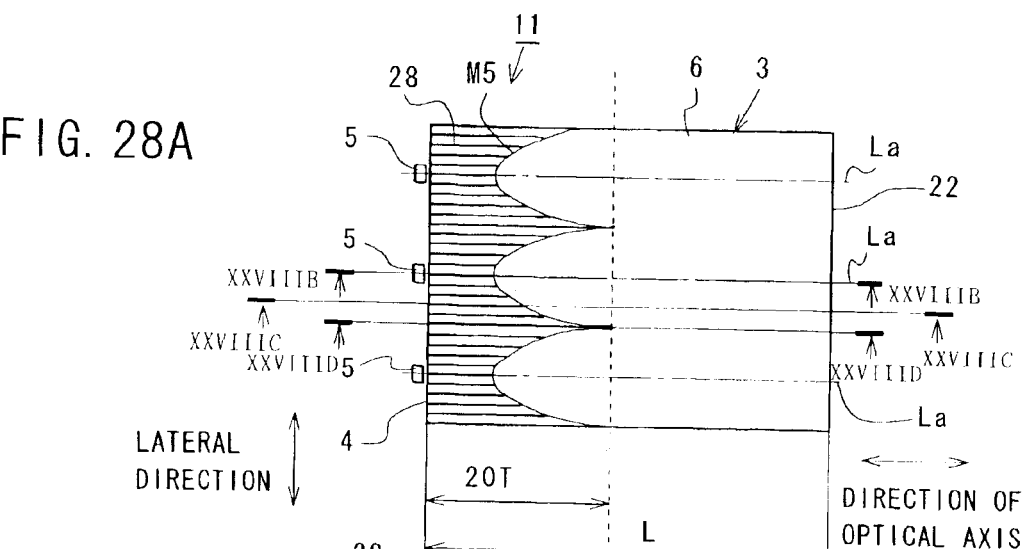
FIGS. 28A through 28D are views showing the sixth preferred embodiment of a light guide plate according to the present invention, FIG. 28A being a plan view of the light guide plate, FIG. 28B being a sectional view taken along line XXVIIIB—XXVIIIB of FIG. 28A, FIG. 28C being a sectional view taken along line XXVIIIC—XXVIIIC of FIG. 28A, and FIG. 28D being a sectional view taken along line XXVIIID—XXVIIID of FIG. 28A.

FIGS. 28A through 28D show the sixth preferred embodiment of a surface light source device 11 according to the present invention. FIG. 28A is a plan view of a light guide plate 3 viewed from the side of an emission surface 6 thereof, FIG. 28B is a sectional view taken along line XXVIIIB—XXVIIIB of FIG. 28A, FIG. 28C is a sectional view taken along line XXVIIIC—XXVIIIC of FIG. 28A, and FIG. 28D is a sectional view taken along line XXVIIID—XXVIIID of FIG. 28A.

The basic construction of the surface light source device 11 shown in FIGS. 28A through 28D is the same as that of the surface light source device 11 in the above described fifth preferred embodiment, except that a back surface 10 of the light guide plate 3 is roughened by a well-known technique in place of the prism protrusions 27 which are formed on the back surface 10 of the light guide plate 3 in the above described fifth preferred embodiment. Therefore, in the description of the surface light source devices 11 in this preferred embodiment, the same reference numbers are given to the same portions as those in the above described fifth preferred embodiment, and repeated descriptions thereof are omitted. Furthermore, the back surface 10 of the light guide plate 3 is roughened by transferring a molded surface of an injection molding die by the injection molding, the molded surface having been roughened by a well-known technique, such as blasting or etching.

Figure 29:
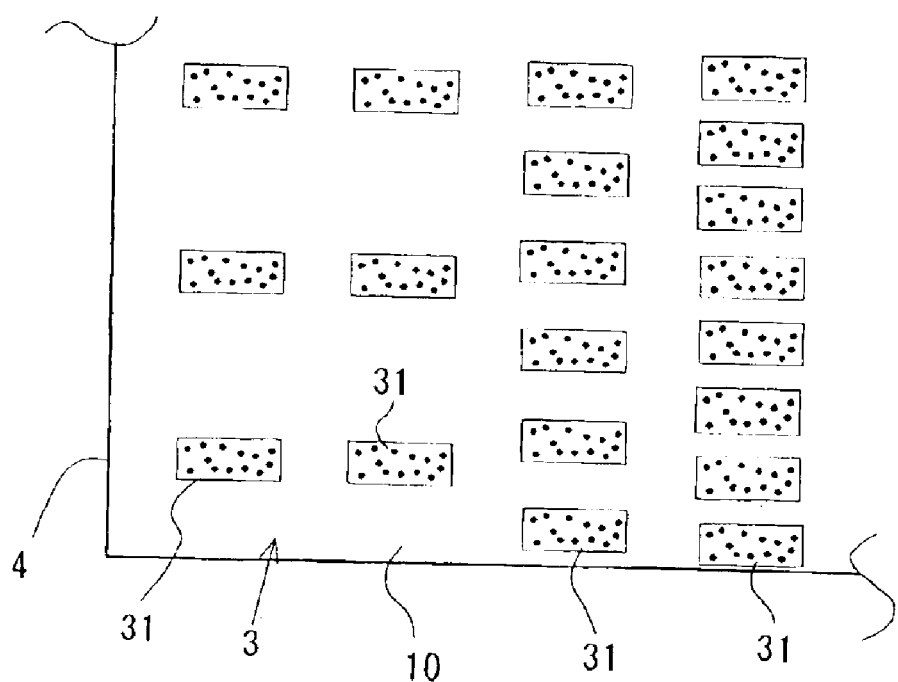
FIG. 29 is an enlarged view of a part of a back face of the sixth preferred embodiment of the light guide plate according to the present invention.

That is, in the surface light source device 11 in this preferred embodiment shown in FIGS. 28A through 28D, a large number of frosting patterns 31 comprising fine irregularities shown in FIG. 29 are formed on the back surface 10 of the light guide plate 3 to roughen the back surface 10 of the light guide plate 3. The optimum density distribution of the frosting patterns 31 is determined in accordance with the relationship to the prism protrusions 28 formed on the side of the emission surface 6 of the light guide plate 3.

According to this preferred embodiment with this construction, by the synergistic effects of the prism protrusions 28 and frosting patterns 31 having the light scattering function, it is possible to suppress the quantity of light leaving the light guide plate 3 in the vicinity of the LEDs 5, and it is possible to increase the quantity of light leaving portions, which are easy to be dark, between the LEDs 5 and 5 and on both end portions in lateral directions, so that the luminance of the whole emission surface 6 can be uniform. Thus, bright lines H (see FIG. 40), which cause-conventional problems, can be inconspicuous. As a result, the surface light source device 11 using the light guide plate 3 in this preferred embodiment can provide bright and uniform surface illumination (see FIGS. 1 and 8). The image display unit 1 using the light guide plate 3 in this preferred embodiment can have improved display quality (see FIGS. 1 and 8).

In this preferred embodiment, the frosting patterns 31 may be directly formed on the back surface 10 of the light guide plate 3 by a well-known technique, such as printing, to roughen the back surface 10 of the light guide plate 3.

While the emission surface 6 of the light guide plate 3 has been formed with the prism protrusions 28 and the back surface 10 of the light guide plate 3 has been formed with the frosting patterns 31 to be roughened in this preferred embodiment, the present invention should not be limited thereto, but the back surface 10 of the light guide plate 3 may be formed with the prism protrusions 28 and the emission surface 6 of the light guide plate 3 may be roughened with the frosting patterns 31 or the like. Moreover, the emission surface 6 of the light guide plate 3 may be formed with the prism protrusions 28 and with the frosting patterns 31 to be roughened. In addition, the back surface 10 of the light guide plate 3 maybe formed with the prism protrusions 28 and with the frosting patterns 31 to be roughened. Alternatively, at least one of the emission surface 6 and back surface 10 of the light guide plate 3 may be formed with the prism protrusions 28, and both of the emission surface 6 and back surface 10 of the light guide plate 3 may be formed with the frosting patterns 31 or the like to be roughened. By thus forming the prism protrusions 28 and roughened surface (frosting patterns 31) on the light guide plate 3, the synergistic effects of the light scattering or diffusing function of the roughened surface and the light control function of the prism protrusions 28 can be fulfilled to allow dark portions and bright lines to be inconspicuous, so that it is possible to obtain uniform and bright surface illumination.

[Seventh Preferred Embodiment]

FIGS. 30A through 30D show the seventh preferred embodiment of a surface light source device 11 according to the present invention. FIG. 30A is a plan view of a light guide plate 3 viewed from the side of an emission surface 6 thereof, FIG. 30B is a sectional view taken along line XXXB—XXXB of FIG. 30A, FIG. 30C is a sectional view taken along line XXXC—XXXC of FIG. 30A, and FIG. 30D is a sectional view taken along line XXXD—XXXD of FIG. 30A.

The basic construction of the surface light source device 11 shown in FIGS. 30A through 30D is the same as that of the surface light source device 11 in the above described modified example of the fifth preferred embodiment, except that a back surface 10 of the light guide plate 3 is roughened by a well-known technique in place of the prism protrusions 27 which are formed on the back surface 10 of the light guide plate 3 in the above described modified example of the fifth preferred embodiment. Therefore, in the description of the surface light source devices 11 in this preferred embodiment, the same reference numbers are given to the same portions as those in the above described modified example of the fifth preferred embodiment, and repeated descriptions thereof are omitted. Furthermore, the back surface 10 of the light guide plate 3 is roughened by transferring a molded surface of an injection molding die by the injection molding, the molded surface having been roughened by a well-known technique, such as blasting or etching.

That is, in the surface light source device 11 in this preferred embodiment shown in FIGS. 30A through 30D, a large number of frosting patterns 31 comprising fine irregularities shown in FIG. 29 are formed on the back surface 10 of the light guide plate 3 to roughen the back surface 10 of the light guide plate 3. The optimum density distribution of the frosting patterns 31 is determined in accordance with the relationship to the prism protrusions 28 formed on the side of the emission surface 6 of the light guide plate 3.

According to this preferred embodiment with this construction, by the synergistic effects of the prism protrusions 28 and frosting patterns 31 having the light scattering function, it is possible to increase the quantity of light leaving portions, which are easy to be dark, on both end portions of the light guide plate 3 in lateral directions thereof, which correspond to portions in the vicinity of each of both end portions of the fluorescent lamp 5A, and bright lines caused by light entering the upper and lower edges 4A and 4B of the incidence surface 4 of the light guide plate 3 can be inconspicuous, so that the luminance of the whole emission surface 6 can be uniform to enhance the luminance of exiting light. As a result, the surface light source device 11 using the light guide plate 3 in this preferred embodiment can provide bright and uniform surface illumination (see FIGS. 1 and 8). The image display unit 1 using the light guide plate 3 in this preferred embodiment can have improved display quality (see FIGS. 1 and 8).

In this preferred embodiment, the frosting patterns 31 may be directly formed on the back surface 10 of the light guide plate 3 by a well-known technique, such as printing, to roughen the back surface 10 of the light guide plate 3.

While the emission surface 6 of the light guide plate 3 has been formed with the prism protrusions 28 and the back surface 10 of the light guide plate 3 has been formed with the frosting patterns 31 to be roughened in this preferred embodiment, the present invention should not be limited thereto, but the back surface 10 of the light guide plate 3 may be formed with the prism protrusions 28 and the emission surface 6 of the light guide plate 3 may be roughened with the frosting patterns 31 or the like. Moreover, the emission surface 6 of the light guide plate 3 may be formed with the prism protrusions 28 and with the frosting patterns 31 to be roughened. In addition, the back surface 10 of the light guide plate 3 may be formed with the prism protrusions 28 and with the frosting patterns 31 to be roughened. Alternatively, at least one of the emission surface 6 and back surface 10 of the light guide plate 3 may be formed with the prism protrusions 28, and both of the emission surface 6 and back surface 10 of the light guide plate 3 may be formed with the frosting patterns 31 or the like to be roughened. By thus forming the prism protrusions 28 and roughened surface (frosting patterns 31) on the light guide plate 3, the synergistic effects of the light scattering or diffusing function of the roughened surface and the light control function of the prism protrusions 28 can be fulfilled to allow dark portions and bright lines to be inconspicuous, so that it is possible to obtain uniform and bright surface illumination.

[Eighth Preferred Embodiment]

Figure 31A:
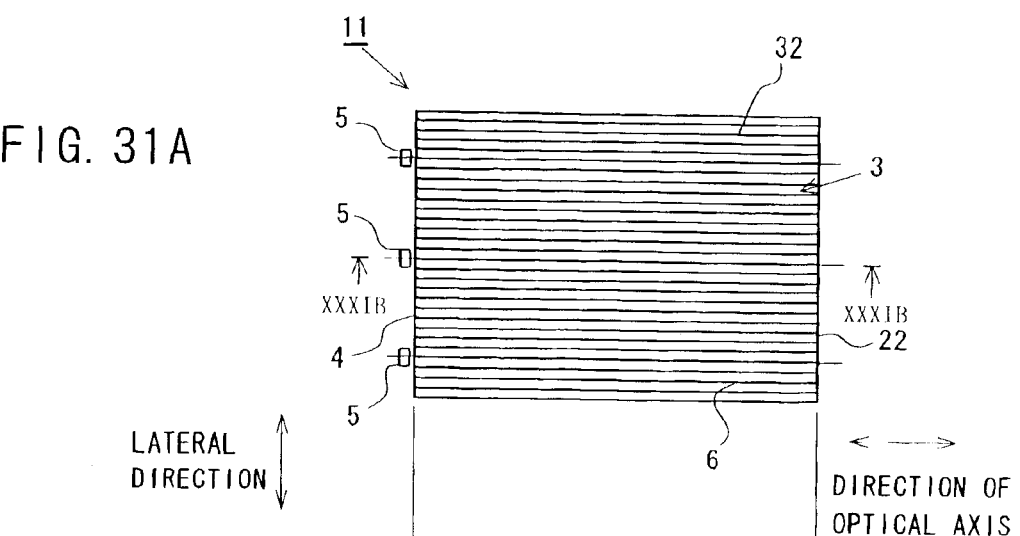
FIGS. 31A and 31B are views showing the eighth preferred embodiment of a light guide plate according to the present invention, FIG. 31A being a plan view of the light guide plate, and FIG. 31B being a sectional view taken along line XXXIB—XXXIB of FIG. 31A.
Figure 31B:
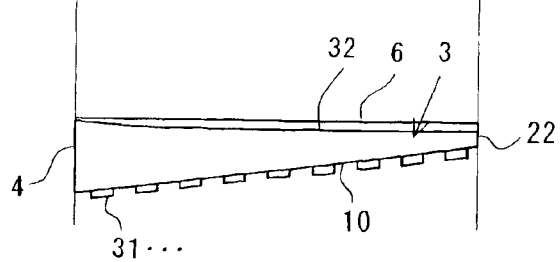

The basic construction of a surface light source device 11 shown in FIGS. 31A and 31B is the same as that in the above described sixth preferred embodiment, except that the same prism protrusions 32 as the prism protrusions 23 formed on the back surface 10 of the light guide plate 3 in the second preferred embodiment shown in FIGS. 15A and 15B are substituted for the prism protrusions 28 formed on the emission surface 6 of the light guide plate 3 in the sixth preferred embodiment shown in FIGS. 28A through 28D and 29. Therefore, the same reference numbers are given to the same portions as those of the surface light source device 11 in the above described sixth preferred embodiment, and repeated descriptions thereof are omitted.

That is, in the surface light source device 11 in this preferred embodiment, a large number of prism protrusions 32 extending in parallel to directions substantially perpendicular to an incidence surface 4 of a light guide plate 3 are formed on an emission surface 6 of the light guide plate 3. The height of the prism protrusions 32 on the side of the incidence surface 4 gradually decreases as a distance from the incidence surface 4 decreases. The sectional shape of each groove between adjacent prism protrusions 32 and 32 is a substantially circular arc. The surface light source device 11 with this construction can obtain the same advantageous effects as those in the above described sixth preferred embodiment if the prism protrusions 32 on the side of the incidence surface 4 have the same shape as that of the prism protrusions 28 in the sixth preferred embodiment. In other portions, the condensing function of the prism protrusions having a rectangular cross section can be fulfilled. In this preferred embodiment similar to the sixth preferred embodiment, the height of the prism protrusions 32 on the side of the incidence surface 4 can be suitably varied in accordance with the positions of LEDs 5.

[Ninth Preferred Embodiment]

Figure 32A:
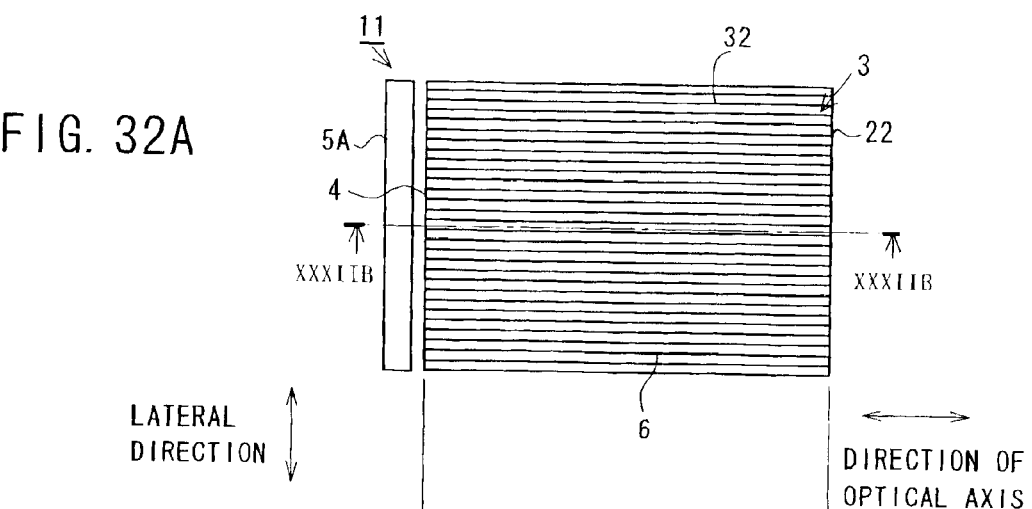
FIGS. 32A and 32B are views showing the ninth preferred embodiment of a light guide plate according to the present invention, FIG. 32A being a plan view of the light guide plate, and FIG. 32B being a sectional view taken along line XXXIIB—XXXIIB of FIG. 32A.
Figure 32B:
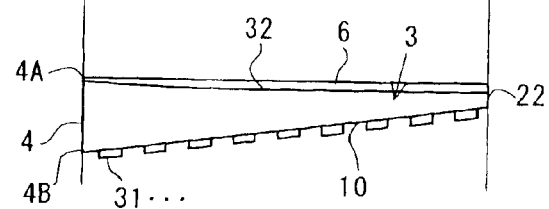

The basic construction of a surface light source device 11 shown in FIGS. 32A and 32B is the same as that in the above described seventh preferred embodiment, except that the same prism protrusions 32 as the prism protrusions 23 formed on the back surface 10 of the light guide plate 3 in the modified example of the second preferred embodiment shown in FIGS. 17A and 17B are substituted for the prism protrusions 28 formed on the emission surface 6 of the light guide plate 3 in the seventh preferred embodiment shown in FIGS. 30A through 30D. Therefore, the same reference numbers are given to the same portions as those of the surface light source device 11 in the above described seventh preferred embodiment, and repeated descriptions thereof are omitted.

That is, in the surface light source device 11 in this preferred embodiment, a large number of prism protrusions 32 extending in parallel to directions substantially perpendicular to an incidence surface 4 of a light guide plate 3 are formed on the emission surface 6 of the light guide plate 3. The height of the prism protrusions 32 on the side of the incidence surface 4 gradually decreases as a distance from the incidence surface 4 decreases. The sectional shape of each groove between adjacent prism protrusions 32 and 32 is a substantially circular arc. The surface light source device 11 with this construction can obtain the same advantageous effects as those in the above described seventh preferred embodiment if the prism protrusions 32 on the side of the incidence surface 4 have the same shape as that of the prism protrusions 28 in the seventh preferred embodiment. In other portions, the condensing function of the prism protrusions having a rectangular cross section can be fulfilled. In this preferred embodiment similar to the seventh preferred embodiment, the height of the prism protrusions 32 on the side of the incidence surface 4 can be suitably varied in accordance with the position of the axial direction (longitudinal direction) of the fluorescent lamp 5A.

[Tenth Preferred Embodiment]

FIGS. 34A through 34C show the tenth preferred embodiment of a light guide plate 3 according to the present invention, and shows a modified example of the light guide plate 3 shown in FIGS. 1 through 9. FIG. 34A is a longitudinal sectional view which schematically shows the relationship between the light guide plate and a liquid crystal display panel 8 and which is taken along line XXXIVA—XXXIVA of FIG. 34B. FIG. 34B is a plan view of the light guide plate 3 (which is viewed from a direction normal to an emission surface 6). FIG. 34C is a graph (coating rate curve 41) showing the variation in coating rate of frosting patterns (fine surface-roughened regions for causing the irregular reflection of light) 40 which are formed on the emission surface 6 of the light guide plate 3.

As shown in FIG. 34A, the light guide plate 3 has prism protrusions 39 on a back surface 10 thereof, and has frosting patterns 40 on the emission surface 6. The frosting patterns 40 has a coating rate shown in FIG. 34C. The frosting patterns 40 are formed from a starting position S1 of an effective emission area in the vicinity of an incidence surface 4 of the light guide plate 3. The coating rate of the frosting patterns 40 increases up to a position which is a distance W away from the incidence surface 4 of the light guide plate 3 (assuming that the distance between adjacent LEDs 5 and 5 is W), and decreases from the position, which is the distance W away from the incidence surface 4 of the light guide plate 3, as a distance from the incidence surface 4 increases. The curve showing the variation in coating rate of the frosting patterns 40 shown in FIG. 34C is a continuous smooth curve as a whole. The effective emission area is an area of the emission surface 6 of the light guide plate 3, which is used for illuminating the liquid crystal display panel 8 and the size of which is substantially the same as the image display area of the liquid crystal panel 8.

The peak position S2 of the coating rate curve of the frosting patterns 40, which is the distance of W away from the incidence surface 4 of the light guide plate 3, is a position at which light emitted from adjacent LEDs 5 and 5 is mixed and at which light emitted from the LEDs 5 on a cross section parallel to the incidence surface 4 of the light guide plate 3 can be regarded as the same as light emitted from a fluorescent lamp serving as a linear light source. The peak position S2 of the coating rate curve of the frosting patterns 40 varies in accordance with characteristics of the LEDs 5 and so forth. Therefore, while the distance W from the incidence surface 4 of the light guide plate 3 has been the distance between adjacent LEDs 5 and 5 in this preferred embodiment, the distance W may vary in accordance with characteristics of the LEDs 5 and so forth.

According to this preferred embodiment with this construction, the frosting patterns 40 are not formed in the vicinity of the incidence surface 4 of the light guide plate 3, and the coating rate of the frosting patterns 40 gradually decreases as a distance from the position (the peak position S2 on the coating rate curve 41), at which light emitted from adjacent LEDs 5 and 5 is mixed to be regarded as the same as light emitted from the fluorescent lamp, increases toward the incidence surface 4. Thus, V-shaped abnormal emission caused by light emitted from the LEDs 5 can be inconspicuous, and the effective emission area can be enlarged up to the position in the vicinity of the incidence surface 4, so that the area of illumination can be enlarged. Furthermore, as shown in FIG. 34B, the emission limit line 42 of the LED 5 is schematically shown by a substantially V-shaped line.

According to this preferred embodiment, the light guide plate 3 has a wedge-shaped cross section, and has a thickness decreasing as a distance from the incidence surface 4 increases. Therefore, if light propagated through the light guide plate 3 repeatedly reflects between the emission surface 6 and back surface 10 of the light guide plate 3, the angle of incidence on the emission surface 6 varies, so that light is easy to exit as a distance from the incidence surface 4 increases. Therefore, if the coating rate of the frosting patterns 40 gradually decreases from the position at which light emitted from adjacent LEDs 5 is mixed to be regarded as the same as light emitted from the fluorescent lamp (the position which is the distance W away from the incidence surface of the light guide plate 3) as this preferred embodiment, the luminance of exiting light can be more effectively uniform with the advantageous effects of the wedge-shaped light guide plate 3.

According to this preferred embodiment, the emission surface 6 of the light guide plate 3 is formed with the frosting patterns 40 to be roughened. Therefore, it is possible to prevent the prism sheet 7 or another light control member, which is arranged so as to face the emission surface 6 of the light guide plate 3, from adhering to the emission surface 6 of the light guide plate 3, so that it is possible to prevent the deterioration of the quality of illumination caused by the adhering of the prism sheet 7 or another light control member (see FIG. 1).

According to this preferred embodiment, the light guide plate 3 is designed to cause light, which is emitted from the LEDs 5 to be propagated through the light guide plate 3, to reflect on the prism protrusions 39 formed on the back surface 10 of the light guide plate 3, and to cause the reflected light to emit from the emission surface 6 so as to have directivity in a specific direction. Therefore, the frosting patterns 40 are formed so as to have a coating rate to such an extent that the directivity of the light reflecting on the prism protrusions 39 is not damaged. The peak value of the coating rate of the frosting patterns 40 formed on the emission surface 6 of the light guide plate 3 is preferably about 10% so as to prevent the directivity of light reflecting on the prism protrusions 39 from being damaged as described above. However, the peak value may be set to be the optimum value in accordance with required light exiting characteristics. The coating rate of the frosting patterns 40 shown in FIG. 34C gradually decreases from the position, which is the distance of W away from the incidence surface 4 of the light guide plate 3, as a distance from the incidence surface 4 increases. However, the coating rate may partially increase or decrease in accordance with required light exiting characteristics.

While the prism protrusions 39 have been formed on only the back surface 10 of the light guide plate 3 in this preferred embodiment, the present invention should not be limited thereto. As the light guide plate 3 shown in FIGS. 15A through 16D, 18A through 22, 24A through 24D, or 26A through 26D, the frosting patterns 40 having the coating rate shown in FIG. 34C may be formed on the light guide plate 3 having the prism protrusions 24, 21, 26 or 28 on the emission surface 6. While the frosting patterns 40 have been formed on the emission surface 6 of the light guide plate 3 in this preferred embodiment, the present invention should not be limited thereto, but the frosting patterns 40 may be formed on at least one of the emission surface 6 and back surface 10 of the light guide plate 3.

(Modified Example of Tenth Preferred Embodiment)

FIGS. 35A through 35C show a modified example of a light guide plate 3 in the tenth preferred embodiment, which uses a fluorescent lamp 5A as a light source and which is a modified example of the light guide plate 3 shown in FIGS. 10 through 14. FIG. 35A is a longitudinal sectional view which schematically shows the relationship between the light guide plate 3 and a liquid crystal display panel 8 and which is taken along line XXXVA—XXXVA of FIG. 35B. FIG. 35B is a plan view of the light guide plate 3 (which is viewed from a direction normal to an emission surface 6).

FIG. 35C is a graph (coating rate curve) showing the variation in coating rate of frosting patterns (fine surface-roughened regions for causing the irregular reflection of light) 43 which are formed on the emission surface 6 of the light guide plate 3.

In this modified example, an emission surface 6 of the light guide plate 3 is formed with the frosting patterns 43 having a coating rate which decreases from the end portion on the side of the incidence surface 4 toward the tip end of the light guide plate 3 (the opposite side to the incidence surface 4). In the light guide plate 3 in the above described tenth preferred embodiment, the coating rate curve 41A (see FIG. 35C) of the frosting patterns 43 is similar to a portion of the coating rate curve formed between the position, which is the distance of W away from the incidence surface 4, and the tip end face of the light guide plate 3 (the opposite face 22 to the incidence surface of the light guide plate).

According to this modified example with this construction, it is possible to prevent a light control member, such as a prism sheet 7, from adhering to the emission surface 6 of the light guide plate 3, and it is possible to cause luminance to be more uniform with the advantageous effects of the wedge-shaped light guide plate 3, so that it is possible to improve the quality of illumination (see FIG. 10).

While the prism protrusions 39 have been formed on only the bottom surface 10 of the light guide plate 3 in this modified example, the present invention should not be limited thereto. As the light guide plate 3 shown in FIGS. 17A and 17B, 23A through 23D, 25A through 25D, or 27A through 27D, the frosting patterns 43 having the coating rate shown in FIG. 35C may be formed on the light guide plate 3 which has the prism protrusions 24, 21, 26 or 28 on the emission surface 6. While the frosting patterns 43 have been formed on the emission surface 6 of the light guide plate 3 in this modified example, the present invention should not be limited thereto, but the frosting patterns 43 may be formed on at least one of the emission surface 6 and back surface 10 of the light guide plate 3.

[Eleventh Preferred Embodiment]

This preferred embodiment is an applied example of the light guide plate 3 (which will be hereinafter briefly referred to as a light guide plate 3 in this preferred embodiment) shown in FIGS. 1 through 7, 8, 9, 15A through 16D, 24A through 24D or 31A and 31B. That is, in the light guide plates 3 shown in these figures, the height of the prism protrusions 12, 23, 24, 25, 26 and 32 is substantially constant in the lateral directions of the light guide plate 3 (in directions parallel to the incidence surface 4). Thus, it is possible to decrease the difference in contrast of light leaving the light guide plate 3 in the vicinity of the incidence surface 4, so that substantially V-shaped abnormal emission of light emitted from the LEDs 5 can be inconspicuous, thereby causing light leaving the emission surface 6 to be uniform.

Figure 36:
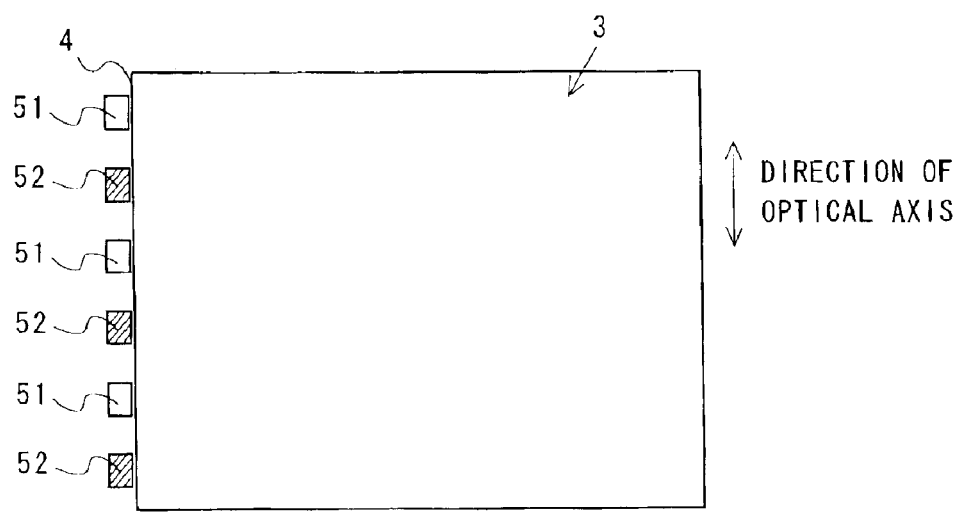
FIG. 36 is an illustration showing an applied example of the eleventh preferred embodiment of a light guide plate according to the present invention.

Therefore, the light guide plate 3 in this preferred embodiment can effectively prevent abnormal emission in the vicinity of the incidence surface 4 and emit uniform illuminating light even if two kinds of LEDs 51 and 52 having different luminescent colors are alternately arranged in the lateral directions of the light guide plate 3 as shown in, e.g., FIG. 36, to be selectively turned on so as to be capable of illuminating with two kinds of different colors. That is, the light guide plate 3 in this applied example can suppress the occurrence of characteristic abnormal emission of the LEDs 51 and 52 to provide uniform surface illumination at any positions in the lateral directions of the LEDs 51 and 52.

Figure 37:
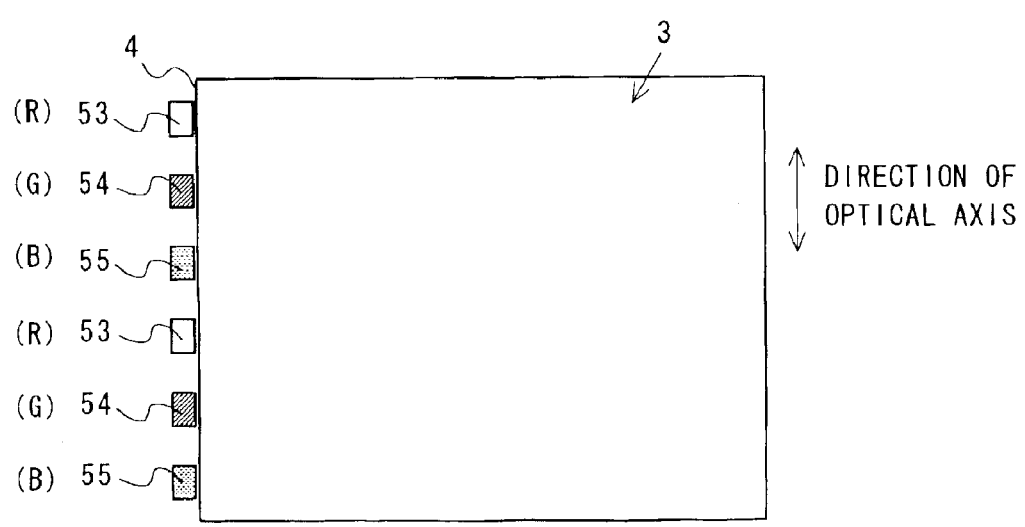
FIG. 37 is an illustration showing another applied example of the eleventh preferred embodiment of a light guide plate according to the present invention.

When LEDs 53, 54 and 55 for emitting red (R), green (G) and blue (B), respectively, are arranged so as to face the incidence surface 4 as shown in FIG. 37, and when the LEDs 53 through 55 of three colors are simultaneously turned on to emit white illuminating light, or when the timing in turning the LEDs 53 through 55 of three colors on is synchronized with the period of ON/OFF of liquid crystal forming a liquid crystal panel to omit any color filters, the light guide plate 3 in this preferred embodiment can emit uniform illuminating light regardless of the positions of LEDs 53 through 55.

[Twelfth Preferred Embodiment]

(First Example)

Figure 38:
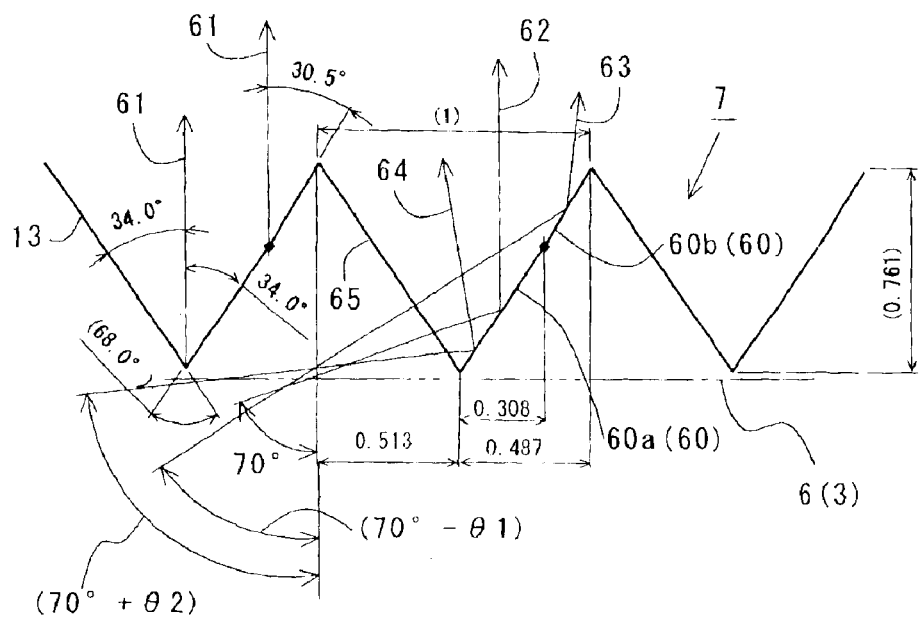
FIG. 38 is an illustration showing a first example of a prism protrusion shape of the twelfth preferred embodiment of a prism sheet according to the present invention.

FIG. 38 shows the twelfth preferred embodiment of the present invention, and is an enlarged view of a part of a sectional shape showing an embodiment of the prism protrusions 13 of the prism sheet 7 arranged on the side of the emission surface 6 of the light guide plate 3 as shown in FIG. 1. The large number of prism protrusions 13 of the prism sheet 7 extend in directions substantially parallel to the incidence surface 4 of the light guide plate 3, and are continuously arranged in directions substantially perpendicular to the incidence surface 4 of the light guide plate 3. FIG. 38 shows a cross section of the prism sheet 7 taken along a line perpendicular to the incidence surface 4 of the light guide plate 3. As an example of the prism sheet 7 in this preferred embodiment, a prism sheet of PMMA will be described below.

The prism protrusions 13 shown in FIG. 38 are designed to improve the function of reflecting light having directivity, which leaves the emission surface 6 of the light guide plate 3, to enhance the function of reflecting light in a direction substantially normal to the emission surface 6 of the light guide plate 3, so that it is possible to more highly increase the luminance of illuminating light (see FIG. 1).

That is, each of the prism protrusions 13 shown in FIG. 38 comprises one surface 60 and the other surface 65 gradually separated from one end of the one surface 60, which corresponds to the tip of a corresponding one of the prism protrusions 13. The other surface 65 mainly serving as an incidence surface comprises one plane, and the one surface 60 mainly serving as a reflecting surface comprises two planes of first and second inclined planes 60a and 60b which have different angles of inclination. The first inclined surface 60a of the one surface 60 of the prism protrusion 13 is formed at an angle of 34.0 degrees to a direction (which will be hereinafter referred to as a normal direction) 61 normal to the emission surface 6 of the light guide plate 3, and the second inclined surface 60b thereof is formed at an angle of 30.5 degrees to the normal direction 61. The vertical angle of the prism protrusion 13 is set to be 68 degrees. Assuming that the distance on the cross section between the root portions of adjacent prism protrusions 13 and 13 (the distance between adjacent prism protrusions 13 and 13) is 1, the first inclined surface 60a is formed so as to have a projected length of 0.308 to a plane perpendicular to the normal direction 61. Assuming that the distance between the root portions of adjacent prism protrusions 13 and 13 (the distance between adjacent prism protrusions 13 and 13) is 1, the second inclined surface 60b is formed so as to have a projected length of 0.179 (=0.487−0.308) to the plane perpendicular to the normal direction 61. The height of each of the prism protrusions 13 is set to be 0.761 assuming that the distance on the cross section between the root portions of adjacent prism protrusions 13 and 13 is 1.

If light leaving the emission surface 6 of the light guide plate 3 at an angle of inclination of about 70 degrees to the normal direction 61 is main exiting light 62, the prism sheet 7 having the prism protrusions 13 is, of course, designed to reflect the main exiting light 62 substantially in the normal direction 61, and is also designed to reflect light (sub-exiting light), which leaves the emission surface 6 of the light guide plate 3 around the main exiting light 62, in directions close to the normal direction 61. That is, the above described first and second inclined surfaces 60a and 60b are formed to reflect a larger quantity of exiting light 63 within an angular range of (70 degrees−θ1) to the angle of inclination of the main exiting light 62 and a larger quantity of exiting light 64 within an angular range of (70 degrees+θ2), in directions close to the normal direction 61. With this construction, as compared with a case where the angle of inclination of the one surface 60 of the prism protrusion 13 is set to be a single angle (e.g., 34.0 degrees), a larger quantity of light can leave the light guide plate 3 in directions close to the normal direction 61, so that it is possible to improve the luminance of exiting light. In this first example, the other surface 65 of each of the prism protrusions 13 is an inclined surface which is inclined at an angle of 34.0 degrees to the normal direction 61, and serves as the incidence surface or reflecting surface for light leaving the light guide plate 3.

(Second Example)

Figure 39:
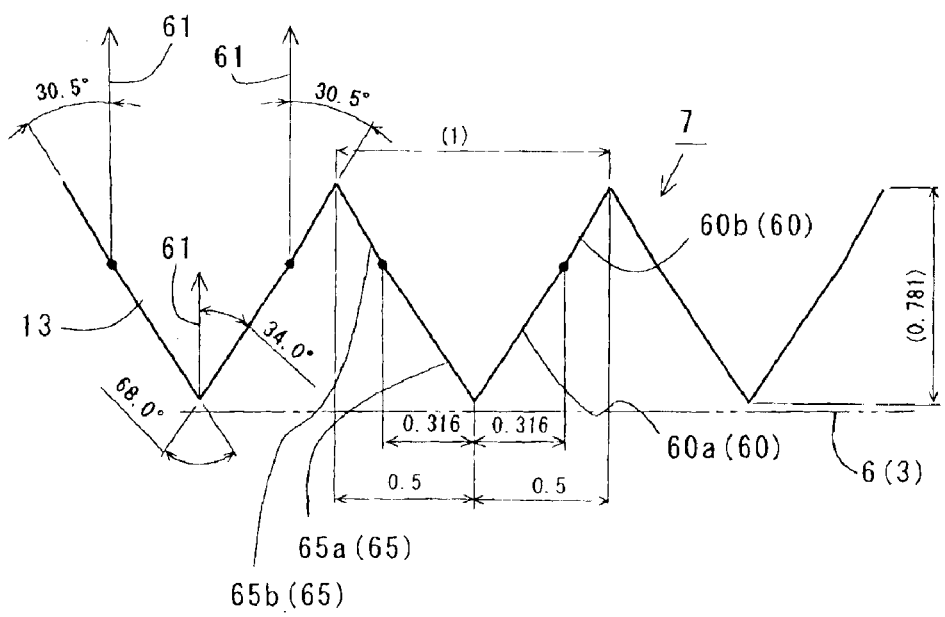
FIG. 39 is an illustration showing a second example of a prism protrusion shape of the twelfth preferred embodiment of a prism sheet according to the present invention.

FIG. 39 shows a second example of the prism protrusions 13 of the prism sheet 7. In each of the prism protrusions 13 shown in FIG. 39, one surface 60 comprises two planes of first and second inclined planes 60a and 60b and the other surface 65 comprises two planes of first and second inclined planes 65a and 65b so that the one surface 60 and the other surface 65 are symmetrical with respect to a vertical plane passing through the top of a corresponding one of the prism protrusions 13. The first inclined surfaces 60a and 65a of the one surface 60 and other surface 65 of the prism protrusion 13 are formed at an angle of 34.0 degrees to the normal direction 61, and the second inclined surfaces 60b and 65b thereof are formed at an angle of 30.5 degrees to the normal direction 61. The vertical angle of the prism protrusion 13 is set to be 68 degrees. Both of the one surface 60 and other surface 65 of the prism protrusion 13 serve as the incidence surface and reflecting surface. The angles of inclination of the first inclined surfaces 60a, 65a and second inclined surfaces 60b, 65b are the same as those in the above described first example. However, assuming that the distance on the cross section between the root portions of adjacent prism protrusions 13 and 13 (the distance between adjacent prism protrusions 13 and 13) is 1, each of the first inclined surfaces 60a and 65a of the prism protrusions 13 in this example is formed so as to have a projected length of 0.316 to a plane perpendicular to the normal direction 61. Assuming that the distance between the root portions of adjacent prism protrusions 13 and 13 (the distance between adjacent prism protrusions 13 and 13) is 1, each of the second inclined surfaces 60b and 65b is formed so as to have a projected length of 0.184 (=0.5−0.316) to the plane perpendicular to the normal direction 61. The height of each of the prism protrusions 13 is set to be 0.781 assuming that the distance on the cross section between the root portions of adjacent prism protrusions 13 and 13 is 1.

Of course, the prism sheet 7 with the prism protrusions 13 having such a shape can obtain the same advantageous effects as those in the first example. In addition, the prism sheet 7 can effectively reflect exiting light of light traveling toward the tip end face (the side face 22 opposite to the incidence surface) from the incidence surface 4 of the light guide plate, as well as exiting light of light reflecting on the tip end face 22 of the light guide plate 3 to travel toward the incidence surface 4, in the normal direction 61, so that it is possible to more highly enhance the luminance of exiting light (see FIG. 1).

Since each of the prism protrusions 13 of the prism sheet 7 in the second example shown in FIG. 39 is symmetrical with respect to the vertical plane, the prism sheet 7 in the second example can be more easily formed than the prism sheet 7 in the first example wherein each of the prism protrusions 13 is asymmetrical with respect to the vertical plane.

In the above described first and second examples, various values with respect to the prism protrusions 13 have been only described as examples, and the values with respect to the prism sheet 7 according to the present invention should not be limited to these values. For example, the optimum angles of inclination of the first inclined surfaces 60a and 65a and second inclined surfaces 60b and 65b of the prism protrusions 13 may be suitably set in accordance with conditions, such as light exiting characteristics of the light guide plate 3 and the material of the prism sheet 7. The reflecting direction of the first inclined surfaces 60a and 65a and second inclined surfaces 60b and 65b should not be limited to the normal direction 61, and the optimum reflecting direction may be suitably set in accordance with required design conditions. That is, in the example shown in FIG. 38, the exiting direction of the exiting light 63 may be inclined with respect to the normal direction so as to be symmetrical with the exiting direction of the light 64. Such light exiting characteristics are preferred to obtain the uniform spread of angles of visibility. However, if it is intended to further improve luminance in the normal direction, the angles of inclination of the second inclined surfaces 60b and 65b may be set so that most of the exiting light 63 reflecting on the second inclined surfaces 60b and 65b leave the light guide plate 3 in the normal direction substantially in parallel to the exiting light 62.

The shape of each of the prism protrusions 13 of the prism sheet 7 in this preferred embodiment should not be limited to the shape of each of the prism protrusions 13 in the first and second examples. The one surface 60 or the one surface 60 and other surface 65 of each of the prism protrusions 13 may be inclined in multi stages (two or more stages), or may be formed by smooth curves.

[Other Preferred Embodiments]

In each of the above described preferred embodiments, fine grains of a material having a different refractive index from the refractive index of the light guide plate 3 may be mixed in the light guide plate 3.

In each of the above described preferred embodiments and modified examples, fine regions of the surface of the prism protrusions 12, 20, 21, 23, 24, 25, 26, 27, 28 or 32 on at least one side of the back surface 10 and emission surface 6 of the light guide plate 3 may have fine irregularities for irregularly reflecting light, and a large number of such fine regions maybe formed in suitable patterns.

Particularly, in each of the second through seventh preferred embodiments and modified examples thereof, the tip of each of at least prism protrusions, which are formed in portions extending from P0–P5 toward the incidence surface 4 and/or which are formed on the side of the emission surface 6, of the prism protrusions formed on the side of the back surface 10 of the light guide plate 3 may be round so that no ridge line appears at the top portion thereof.

The present invention should not be limited to the above described preferred embodiments. The prism protrusions 21, 24, 26 and 28 on the side of the emission surface 6 in the second through fifth preferred embodiments and modified examples thereof may be formed on the side of the back surface 10 of the light guide plate 3, and the prism protrusions 20, 23, 25 and 27 on the side of the back surface 10 in the second through fifth preferred embodiments and modified examples thereof may be formed on the side of the emission surface 6 of the light guide plate 3.

In the second through fifth preferred embodiments and modified examples thereof, the portion of the surface having the prism protrusions 20, 23, 25 or 27 in the vicinity of the incidence surface 4 may be a flat surface similar to that in the first preferred embodiment.

The present invention should not be limited to the above described preferred embodiments. For example, the prism protrusions 12, 20, 21, 23, 24, 25, 26, 27 and 28 in the first through fourth preferred embodiments may be suitably combined to be formed on the light guide plate 3 so that the prism protrusions 21 on the side of the emission surface 6, of the prism protrusions 20 and 21 in the third preferred embodiment, are formed on the emission surface 6 of the light guide plate 3 and so that the prism protrusions 25 on the side of the back surface 10, of the prism protrusions 25 and 26 in the fourth preferred embodiment, are formed on the back surface 10 of the light guide plate 3.

While the respective prism protrusions have been continuously formed along the incidence surface of the light guide plate in the above described preferred embodiments, the prism protrusions may be intermittently formed along the incidence surface to form flat portions between adjacent prism protrusions if necessary, according to the present invention. In this case, the substantially circular-ach of the cross section of each groove between adjacent prism protrusions means a shape which includes such a flat portion and in which the inclined surfaces forming the prism protrusions are loosely curved to be continuously connected to the flat portions.

While the grooves 25a between adjacent prism protrusions 25 and 25 and the grooves 26a between adjacent prism protrusions 26 and 26 in the above described fourth preferred embodiment have been linearly inclined, the present invention should not be limited thereto, but the height of the prism protrusions 25 and 26 may be varied by forming loosely curved grooves 25a and 26a. While the grooves 27a between adjacent prism protrusions 27 and 27 and the grooves 28a between adjacent prism protrusions 28 and 28 in the above described fifth preferred embodiment have been linearly inclined, the present invention should not be limited thereto, but the height of the prism protrusions 27 and 28 may be varied by forming loosely curved grooves 27a and 28a.

While the cross section taken along line II—II of FIG. 1 and the cross section taken along line XVIIIB—XVIIIB of FIG. 18A have been substantially wedge shaped in the above described preferred embodiments and modified examples thereof, the present invention should not be limited thereto, but the cross section taken along line II—II of FIG. 1 and the cross section taken along line XVIIIB—XVIIIB of FIG. 18A may be rectangular. Alternatively, the technical idea in the above described preferred embodiments maybe applied to a light guide plate which is thinner at the central portion and which is thicker on both end faces. In such a case, LEDs 5 or fluorescent lamps 5A serving as light sources may be arranged on both of facing end faces. While two or three LEDs 5 have been arranged so as to face the incidence surface 4 in the above described preferred embodiments, the present invention should not be limited thereto, but the number of LEDs 5 to be arranged may be determined in accordance with the size of the light guide plate 3 and so forth, and a single LED 5 or four or more LEDs 5 may be arranged.

Figure 33:
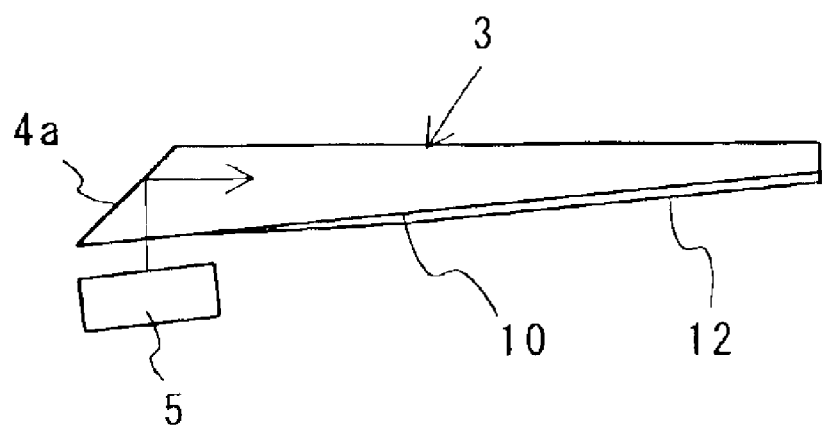
FIG. 33 is an illustration showing a modified example of the arrangement of LED.

While the LEDs 5 have been arranged on the side of the incidence surface (side face) 4 of the light guide plate 3 so as to face the incidence surface 4 (see FIGS. 2 and 18A) in the above described preferred embodiments, the LEDs 5 may be arranged on the side of the inclined side face 4a of the light guide plate 3 so as to face the back surface 10 to reflect light, which is emitted from the LEDs 5, on the side face 4a to allow the light to enter the light guide plate 3 as shown in FIG. 33.

As described above, according to the present invention, even if the LEDs are used as light sources, if the position and height of each of the large number of prism protrusions, which are formed on at least one of the emission surface and opposite surface of the light guide plate and which extend so as to leave the vicinity of the side face of the light guide plate on which the LEDs are arranged, are devised, abnormal emission caused in the vicinity of the side face of the light guide plate can be inconspicuous, so that the luminance of light leaving the emission surface of the light guide plate can be uniform to provide uniform surface illumination.

What is claimed is:

1. A surface light source device comprising:
   a light guide plate having a side face and an emission surface; and
   a point light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated,
   wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face,
   part of said first prism protrusions on the side of said side face have a height having a tendency to gradually decrease as a distance from said side face decreases, and
   said first prism protrusions have a height which is minimum on an optical axis of said point light source and which gradually increases as a distance from said optical axis of said point light source increases in directions in parallel to said side face, in at least the vicinity of said side face.

2. A surface light source device as set forth in claim 1, wherein the same prism protrusions as said first prism protrusions formed on said one of said emission surface of said light guide plate and said surface opposite to said emission surface of said light guide plate are formed on the other of said emission surface of said light guide plate and said surface opposite to said emission surface of said light guide plate.

3. A surface light source device as set forth in claim 1, wherein said one of said emission surface of said light guide plate and said surface opposite to said emission surface of said light guide plate is flat in the vicinity of said side face.

4. A surface light source device comprising:
   a light guide plate having a side face and an emission surface; and
   a point light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, and part of said first prism protrusions on the side of said side face include a portion in which a groove between adjacent two of said first prism protrusions has a substantially circular-arc-shaped cross section.

5. A surface light source device comprising:

a light guide plate having a side face and an emission surface; and a point light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, and said light guide plate has second prism protrusions which are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, and said second prism protrusions including a portion in which a groove between adjacent two of said second prism protrusions has a substantially circular-arc-shaped cross section.

6. A surface light source device comprising:

a light guide plate having a side face and an emission surface; and a point light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, part of said first prism protrusions on the side of said side face include a portion in which a groove between adjacent two of said first prism protrusions has a substantially circular-arc-shaped cross section, and said light guide plate has second prism protrusions which are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, and said second prism protrusions including a portion in which a groove between adjacent two of said second prism protrusions has a substantially circular-arc-shaped cross section.

7. A surface light source device comprising:

a light guide plate having a side face and an emission surface; and a point light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, and said light guide plate has second prism protrusions which are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, said second prism protrusions including a portion in which a groove between adjacent two of said second prism protrusions has a substantially circular-arc-shaped cross section, and said height of said second prism protrusions being minimum on an optical axis of said point light source and gradually increasing as a distance from said optical axis of said point light source increases in directions in parallel to said side face, in at least the vicinity of said side face.

8. A surface light source device comprising:

a light guide plate having a side face and an emission surface; and a point light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, part of said first prism protrusions on the side of said side face include a portion in which a groove between adjacent two of said first prism protrusions has a substantially circular-arc-shaped cross section, and said light guide plate has second prism protrusions which are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, said second prism protrusions including a portion in which a groove between adjacent two of said second prism protrusions has a substantially circular-arc-shaped cross section, and said height of said second prism protrusions being minimum on an optical axis of said point light source and gradually increasing as a distance from said optical axis of said point light source increases in directions in parallel to said side face, in at least the vicinity of said side face.

9. A surface light source device comprising:

a light guide plate having a side face and an emission surface; and a point light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, said light guide plate has a large number of second prism protrusions which are formed on the other of said emission surface of said light guide plate and said surface opposite to said emission surface of said light guide plate to extend in parallel to such a direction that a distance from said side face increases and which are arranged along the side face, and said second prism protrusions have a height which has a tendency to gradually decrease as a distance from said side face increases and which is zero at a position being a predetermined distance away from said side face.

10. A surface light source device as set forth in claim 9, wherein said second prism protrusions include a portion in which a groove between adjacent two of said second prism protrusions has a substantially circular-arc-shaped cross section.

11. A surface light source device as set forth in claim 9 or 10, wherein said second prism protrusions have a height which is minimum on an optical axis of said point source and which gradually increases as a distance from said optical axis of said point light source increases in directions in parallel to said side face, in at least the vicinity of said side face.

12. A surface light source device as set forth in claim 9 or 10, wherein part of said first prism protrusions on the side of said side face include a portion in which a groove between adjacent two of said first prism protrusions has a substantially circular-arc-shaped cross section.

13. A surface light source device as set forth in claim 9 or 10, wherein said second prism protrusions have a height which is minimum on an optical axis of said point source and which gradually increases as a distance from said optical axis of said point light source increases in directions in parallel to said side face, in at least the vicinity of said side face, and part of said first prism protrusions on the side of said side face include a portion in which a groove between adjacent two of said first prism protrusions has a substantially circular-arc-shaped cross section.

14. A surface light source device as set forth in claim 9 or 10, wherein said first prism protrusions have a height which is minimum on an optical axis of said point source and which gradually increases as a distance from said optical axis of said point light source increases in directions in parallel to said side face, in at least the vicinity of said side face.

15. A surface light source device as set forth in claim 9 or 10, wherein said second prism protrusions have a height which is minimum on an optical axis of said point source and which gradually increases as a distance from said optical axis of said point light source increases in directions in parallel to said side face, in at least the vicinity of said side face, and said first prism protrusions have a height which is minimum on an optical axis of said point source and which gradually increases as a distance from said optical axis of said point light source increases in directions in parallel to said side face, in at least the vicinity of said side face.

16. A surface light source device as set forth in claim 9 or 10, wherein said second prism protrusions have a height which is minimum on an optical axis of said point source and which gradually increases as a distance from said optical axis of said point light source increases in directions in parallel to said side face, in at least the vicinity of said side face, part of said first prism protrusions on the side of said side face include a portion in which a groove between adjacent two of said first prism protrusions has a substantially circular-arc-shaped cross section, and said first prism protrusions have a height which is minimum on an optical axis of said point source and which gradually increases as a distance from said optical axis of said point light source increases in directions in parallel to said side face, in at least the vicinity of said side face.

17. A surface light source device comprising:
a light guide plate having a side face and an emission surface; and
a light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated,
wherein said light guide plate has a large number of prism protrusions which are formed on one of said emission surface of said light guide plate and a surface opposite to said emission surface of said light guide plate to extend in parallel and which are arranged along the side face, said prism protrusions having a height which has a tendency to gradually decrease as a distance from said side face increases and which is zero at a position being a predetermined distance away from said side face,
said light guide plate has a roughened surface which. is formed on at least one of said emission surface of said light guide plate and said surface opposite to said emission surface of said light guide plate, said roughened surface being capable of irregularly reflecting or diffusing light, and
said prism protrusions include a portion in which a groove between adjacent two of said prism protrusions has a substantially circular-arc-shaped cross section.

18. A surface light source device as set forth in claim 17, wherein said light source is a point light source.

19. A surface light source device as set forth in claim 18, wherein said prism protrusions have a height which is minimum on an optical axis of said point light source and which gradually increases as a distance from said optical axis of said point light source increases in directions in parallel to said side face, in at least the vicinity of said side face.

20. A surface light source device as set forth in claim 17, wherein said light source is a linear light source.

21. A surface light source device as set forth in claim 20, wherein said prism protrusions have a height which gradually increases in a direction from a vicinity of each of both end portions of said linear light source toward a corresponding one of said both end portions of said linear light source, in at least the vicinity of said side face.

22. A surface light source device comprising:
a light guide plate having a side face and an emission surface; and
a point light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated,
wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face,
part of said first prism protrusions on the side of said side face have a height having a tendency to gradually decrease as a distance from said side face decreases,
a roughened surface capable of irregularly reflecting or diffusing light is formed on at least one of said emission surface of said light guide plate and said surface opposite to said emission surface of said light guide plate, and
part of said first prism protrusions on the side of said side face include a portion in which a groove between adjacent two of said first prism protrusions has a substantially circular-arc-shaped cross section.

23. A light guide plate comprising:
a side face on which light emitted from a point light source is incident; and
an emission surface for allowing the light, which is incident on said side face to be propagated through said light guide plate, to leave said light guide plate when an angle of incidence of the light on said emission surface is a critical angle or less while the light is propagated,
wherein a large number of first prism protrusions are formed on one of said emission surface of said light guide plate and a surface opposite to said emission surface of said light guide plate to extend in parallel to such a direction that a distance from said side face increases, and are arranged along the side face,
part of said first prism protrusions on the side of said side face have a height having a tendency to gradually decrease as a distance from said side face decreases, and
said first prism protrusions have a height which is minimum on an optical axis of said point light source and which gradually increases as a distance from said optical axis of said point light source increases in directions in parallel to said side face, in at least the vicinity of said side face.

24. A light guide plate as set forth in claim 23, wherein the same prism protrusions as said first prism protrusions formed on said one of said emission surface of said light guide plate and said surface opposite to said emission surface of said light guide plate are formed on the other of said emission surface of said light guide plate and said surface opposite to said emission surface of said light guide plate.

25. A light guide plate as set forth in claim 23, wherein said one of said emission surface of said light guide plate and said surface opposite to said emission surface of said light guide plate is flat in the vicinity of said side face.

26. A light guide plate comprising:
a side face on which light emitted from a point light source is incident; and
an emission surface for allowing the light, which is incident on said side face to be propagated through said light guide plate, to leave said light guide plate when an angle of incidence of the light on said emission surface is a critical angle or less while the light is propagated,
wherein a large number of first prism protrusions are formed on one of said emission surface of said light guide plate and a surface opposite to said emission surface of said light guide plate to extend in parallel to such a direction that a distance from said side face increases, and are arranged along the side face,
part of said first prism protrusions on the side of said side face have a height having a tendency to gradually decrease as a distance from said side face decreases, and
part of said first prism protrusions on the side of said side face include a portion in which a groove between adjacent two of said first prism protrusions has a substantially circular-arc-shaped cross section.

27. A light guide plate comprising:

a side face on which light emitted from a point light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, second prism protrusions are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, and said second prism protrusions including a portion in which a groove between adjacent two of said second prism protrusions has a substantially circular-arc-shaped cross section.

28. A light guide plate comprising:

a side face on which light emitted from a point light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, part of said first prism protrusions on the side of said side face include a portion in which a groove between adjacent two of said first prism protrusions has a substantially circular-arc-shaped cross section, and second prism protrusions are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, and said second prism protrusions including a portion in which a groove between adjacent two of said second prism protrusions has a substantially circular-arc-shaped cross section.

29. A light guide plate comprising:

a side face on which light emitted from a point light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, second prism protrusions are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, said second prism protrusions including a portion in which a groove between adjacent two of said second prism protrusions has a substantially circular-arc-shaped cross section, and said height of said second prism protrusions being minimum on an optical axis of said point light source and gradually increasing as a distance from said optical axis of said point light source increases in directions in parallel to said side face, in at least the vicinity of said side face.

30. A light guide plate comprising:

a side face on which light emitted from a point light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, part of said first prism protrusions on the side of said side face include a portion in which a groove between adjacent two of said first prism protrusions has a substantially circular-arc-shaped cross section, and second prism protrusions are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, said second prism protrusions including a portion in which a groove between adjacent two of said second prism protrusions has a substantially circular-arc-shaped cross section, and said height of said second prism protrusions being minimum on an optical axis of said point light source and gradually increasing as a distance from said optical axis of said point light source increases in directions in parallel to said side face, in at least the vicinity of said side face.

31. A light guide plate comprising:
a side face on which light emitted from a point light source is incident; and
an emission surface for allowing the light, which is incident on said side face to be propagated through said light guide plate, to leave said light guide plate when an angle of incidence of the light on said emission surface is a critical angle or less while the light is propagated,
wherein a large number of first prism protrusions are formed on one of said emission surface of said light guide plate and a surface opposite to said emission surface of said light guide plate to extend in parallel to such a direction that a distance from said side face increases, and are arranged along the side face,
part of said first prism protrusions on the side of said side face have a height having a tendency to gradually decrease as a distance from said side face decreases,
a large number of second prism protrusions are formed on the other of said emission surface and said surface opposite to said emission surface to extend in parallel to such a direction that a distance from said side face increases, and are arranged along the side face, and
said second prism protrusions has a height which has a tendency to gradually decrease as a distance from said side face increases and which is zero at a position being a predetermined distance away from said side face.

32. A light guide plate as set forth in claim 31, wherein said second prism protrusions include a portion in which a groove between adjacent two of said second prism protrusions has a substantially circular-arc-shaped cross section.

33. A light guide plate as set forth in claim 31 or 32, wherein said second prism protrusions have a height which is minimum on an optical axis of said point source and which gradually increases as a distance from said optical axis of said point light source increases in directions in parallel to said side face, in at least the vicinity of said side face.

34. A light guide plate as set forth in claim 31 or 32, wherein part of said first prism protrusions on the side of said side face include a portion in which a groove between adjacent two of said first prism protrusions has a substantially circular-arc-shaped cross section.

35. A light guide plate as set forth in claim 31 or 32, wherein said second prism protrusions have a height which is minimum on an optical axis of said point source and which gradually increases as a distance from said optical axis of said point light source increases in directions in parallel to said side face, in at least the vicinity of said side face, and
part of said first prism protrusions on the side of said side face include a portion in which a groove between adjacent two of said first prism protrusions has a substantially circular-arc-shaped cross section.

36. A light guide plate as set forth in claim 31 or 32, wherein said first prism protrusions have a height which is minimum on an optical axis of said point source and which gradually increases as a distance from said optical axis of said point light source increases in directions in parallel to said side face, in at least the vicinity of said side face.

37. A light guide plate as set forth in claim 31 or 32, wherein said second prism protrusions have a height which is minimum on an optical axis of said point source and which gradually increases as a distance from said optical axis of said point light source increases in directions in parallel to said side face, in at least the vicinity of said side face, and
said first prism protrusions have a height which is minimum on an optical axis of said point source and which gradually increases as a distance from said optical axis of said point light source increases in directions in parallel to said side face, in at least the vicinity of said side face.

38. A light guide plate as set forth in claim 31 or 32, wherein said second prism protrusions have a height which is minimum on an optical axis of said point source and which gradually increases as a distance from said optical axis of said point light source increases in directions in parallel to said side face, in at least the vicinity of said side face,
part of said first prism protrusions on the side of said side face include a portion in which a groove between adjacent two of said first prism protrusions has a substantially circular-arc-shaped cross section, and
said first prism protrusions have a height which is minimum on an optical axis of said point source and which gradually increases as a distance from said optical axis of said point light source increases in directions in parallel to said side face, in at least the vicinity of said side face.

39. A light guide plate comprising:
a side face on which light emitted from a light source is incident; and
an emission surface for allowing the light, which is incident on said side face to be propagated through said light guide plate, to leave said light guide plate when an angle of incidence of the light on said emission surface is a critical angle or less while the light is propagated,
wherein a large number of prism protrusions are formed on one of said emission surface and a surface opposite to said emission surface to extend in parallel and are arranged along the side face, said prism protrusions having a height which has a tendency to gradually decrease as a distance from said side face increases and which is zero at a position being a predetermined distance away from said side face,
a roughened surface is formed on at least one of said emission surface of said light guide plate and said surface opposite to said emission surface, said roughened surface being capable of irregularly reflecting or diffusing light, and
said prism protrusions include a portion in which a groove between adjacent two of said prism protrusions has a substantially circular-arc-shaped cross section.

40. A light guide plate as set forth in claim 39, wherein said light source is a point light source.

41. A light guide plate as set forth in claim 40, wherein said prism protrusions have a height which is minimum on an optical axis of said point source and which gradually increases as a distance from said optical axis of said point light source increases in directions in parallel to said side face, in at least the vicinity of said side face.

42. A light guide plate as set forth in claim 39, wherein said light source is a linear light source.

43. A light guide plate as set forth in claim 42, wherein said prism protrusions have a height which gradually increases in a direction from a vicinity of each of both end portions of said linear light source toward a corresponding one of said both end portions of said linear light source, in at least the vicinity of said side face.

44. A light guide plate comprising:
- a side face on which light emitted from a point light source is incident; and
- an emission surface for allowing the light, which is incident on said side face to be propagated through said light guide plate, to leave said light guide plate when an angle of incidence of the light on said emission surface is a critical angle or less while the light is propagated,
- wherein a large number of first prism protrusions are formed on one of said emission surface of said light guide plate and a surface opposite to said emission surface of said light guide plate to extend in parallel to such a direction that a distance from said side face increases, and are arranged along the side face,
- part of said first prism protrusions on the side of said side face have a height having a tendency to gradually decrease as a distance from said side face decreases,
- a roughened surface capable of irregularly reflecting or diffusing light is formed on at least one of said emission surface and said surface opposite to said emission surface, and
- part of said first prism protrusions on the side of said side face include a portion in which a groove between adjacent two of said first prism protrusions has a substantially circular-arc-shaped cross section.

45. A surface light source device comprising:
- a light guide plate having a side face and an emission surface; and
- a linear light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated,
- wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face,
- part of said first prism protrusions on the side of said side face have a height having a tendency to gradually decrease as a distance from said side face decreases, and
- said first prism protrusions have a height which gradually increases in a direction from a vicinity of each of both end portions of said linear light source toward a corresponding one of said both end portions of said linear light source, in at least the vicinity of said side face.

46. A surface light source device as set forth in claim 45, wherein said one of said emission surface of said light guide plate and said surface opposite to said emission surface of said light guide plate is flat in the vicinity of said side face.

47. A surface light source device comprising:
- a light guide plate having a side face and an emission surface; and
- a linear light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated,
- wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face,
- part of said first prism protrusions on the side of said side face have a height having a tendency to gradually decrease as a distance from said side face decreases, and
- part of said first prism protrusions on the side of said side face include a portion in which a groove between adjacent two of said first prism protrusions has a substantially circular-arc-shaped cross section.

48. A surface light source device comprising:
- a light guide plate having a side face and an emission surface; and
- a linear light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated,
- wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face,
- part of said first prism protrusions on the side of said side face have a height having a tendency to gradually decrease as a distance from said side face decreases, and
- said light guide plate has second prism protrusions which are formed on the other of said emission surface of said light guide plate and said surface opposite to said emission surface of said light guide plate,
- said second prism protrusions having a height which has a tendency to gradually decrease as a distance from said side face increases and which is zero at a position being a predetermined distance away from said side face, and
- said second prism protrusions including a portion in which a groove between adjacent two of said second prism protrusions has a substantially circular-arc-shaped cross section.

49. A surface light source device comprising:
- a light guide plate having a side face and an emission surface; and
- a linear light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated,
- wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, part of said first prism protrusions on the side of said side face include a portion in which a groove between adjacent two of said first prism protrusions has a substantially circular-arc-shaped cross section, and said light guide plate has second prism protrusions which are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, and said second prism protrusions including a portion in which a groove between adjacent two of said second prism protrusions has a substantially circular-arc-shaped cross section.

50. A surface light source device comprising:

a light guide plate having a side face and an emission surface; and a linear light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, and said light guide plate has second prism protrusions which are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, said second prism protrusions including a portion in which a groove between adjacent two of said second prism protrusions has a substantially circular-arc-shaped cross section, and said height of said second prism protrusions gradually increasing in a direction from a vicinity of each of both end portions of said linear light source toward a corresponding one of said both end portions of said linear light source, in at least the vicinity of said side face.

51. A surface light source device comprising:

a light guide plate having a side face and an emission surface; and a linear light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, part of said first prism protrusions on the side of said side face include a portion in which a groove between adjacent two of said first prism protrusions has a substantially circular-arc-shaped cross section, and said light guide plate has second prism protrusions which are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, said second prism protrusions including a portion in which a groove between adjacent two of said second prism protrusions has a substantially circular-arc-shaped cross section, and said height of said second prism protrusions gradually increasing in a direction from a vicinity of each of both end portions of said linear light source toward a corresponding one of said both end portions of said linear light source, in at least the vicinity of said side face.

52. A surface light source device comprising:

a light guide plate having a side face and an emission surface; and a linear light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, said light guide plate has a large number of second prism protrusions which are formed on the other of said emission surface of said light guide plate and said surface opposite to said emission surface of said light guide plate to extend in parallel to such a direction that a distance from said side face increases and which are arranged along the side face, and said second prism protrusions have a height which has a tendency to gradually decrease as a distance from said side face increases and which is zero at a position being a predetermined distance away from said side face.

53. A surface light source device as set forth in claim 52, wherein said second prism protrusions include a portion in which a groove between adjacent two of said second prism protrusions has a substantially circular-arc-shaped cross section.

54. A surface light source device as set forth in claim 52 or 53, wherein said second prism protrusions have a height which gradually increases in a direction from a vicinity of each of both end portions of said linear light source toward a corresponding one of said both end portions of said linear light source, in at least the vicinity of said side face.

55. A surface light source device as set forth in claim 52 or 53, wherein part of said first prism protrusions on the side of said side face include a portion in which a groove between adjacent two of said first prism protrusions has a substantially circular-arc-shaped cross section.

56. A surface light source device as set forth in claim 52 or 53, wherein said second prism protrusions have a height which gradually increases in a direction from a vicinity of each of both end portions of said linear light source toward a corresponding one of said both end portions of said linear light source, in at least the vicinity of said side face, and part of said first prism protrusions on the side of said side face include a portion in which a groove between adjacent two of said first prism protrusions has a substantially circular-arc-shaped cross section.

57. A surface light source device as set forth in claim 52 or 53, wherein said first prism protrusions have a height which gradually increases in a direction from a vicinity of each of both end portions of said linear light source toward a corresponding one of said both end portions of said linear light source, in at least the vicinity of said side face.

58. A surface light source device as set forth in claim 52 or 53, wherein said second prism protrusions have a height which gradually increases in a direction from a vicinity of each of both end portions of said linear light source toward a corresponding one of said both end portions of said linear light source, in at least the vicinity of said side face, and said first prism protrusions have a height which gradually increases in a direction from a vicinity of each of both end portions of said linear light source toward a corresponding one of said both end portions of said linear light source, in at least the vicinity of said side face.

59. A surface light source device as set forth in claim 52 or 53, wherein said second prism protrusions have a height which gradually increases in a direction from a vicinity of each of both end portions of said linear light source toward a corresponding one of said both end portions of said linear light source, in at least the vicinity of said side face, part of said first prism protrusions on the side of said side face include a portion in which a groove between adjacent two of said first prism protrusions has a substantially circular-arc-shaped cross section, and said first prism protrusions have a height which gradually increases in a direction from a vicinity of each of both end portions of said linear light source toward a corresponding one of said both end portions of said linear light source, in at least the vicinity of said side face.

60. A surface light source device comprising:

a light guide plate having a side face and an emission surface; and a linear light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated, wherein said light guide plate has a large number of first prism protrusions which are formed on one of said emission surface of said light guide plate and a surface opposite to said emission surface of said light guide plate to extend in parallel to such a direction that a distance from said side face increases and which are arranged along the side face, part of said first prism protrusions on the side of said side face have a height having a tendency to gradually decrease as a distance from said side face decreases, a roughened surface capable of irregularly reflecting or diffusing light is formed on at least one of said emission surface of said light guide plate and said surface opposite to said emission surface of said light guide plate, and part of said first prism protrusions on the side of said side face include a portion in which a groove between adjacent two of said first prism protrusions has a substantially circular-arc-shaped cross section.

61. A light guide plate comprising:

a side face on which light emitted from a linear light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, and said first prism protrusions have a height which gradually increases in a direction from a vicinity of each of both end portions of said linear light source toward a corresponding one of said both end portions of said linear light source, in at least the vicinity of said side face.

62. A light guide plate as set forth in claim 61, wherein said one of said emission surface of said light guide plate and said surface opposite to said emission surface of said light guide plate is flat in the vicinity of said side face.

63. A light guide plate comprising:

a side face on which light emitted from a linear light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, and part of said first prism protrusions on the side of said side face include a portion in which a groove between adjacent two of said first prism protrusions has a substantially circular-arc-shaped cross section.

64. A light guide plate comprising:

a side face on which light emitted from a linear light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, and second prism protrusions are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, and said second prism protrusions including a portion in which a groove between adjacent two of said second prism protrusions has a substantially circular-arc-shaped cross section.

65. A light guide plate comprising:

a side face on which light emitted from a linear light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, part of said first prism protrusions on the side of said side face include a portion in which a groove between adjacent two of said first prism protrusions has a substantially circular-arc-shaped cross section, and second prism protrusions are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, and said second prism protrusions including a portion in which a groove between adjacent two of said second prism protrusions has a substantially circular-arc-shaped cross section.

66. A light guide plate comprising:

a side face on which light emitted from a linear light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, and second prism protrusions are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, said second prism protrusions including a portion in which a groove between adjacent two of said second prism protrusions has a substantially circular-arc-shaped cross section, and said height of said second prism protrusions gradually increasing in a direction from a vicinity of each of both end portions of said linear light source toward a corresponding one of said both end portions of said linear light source, in at least the vicinity of said side face.

67. A light guide plate comprising:

a side face on which light emitted from a linear light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, part of said first prism protrusions on the side of said side face include a portion in which a groove between adjacent two of said first prism protrusions has a substantially circular-arc-shaped cross section, and second prism protrusions are formed on the other of said emission surface of said light guide plate and said surface opposite to said emission surface of said light guide plate, said second prism protrusions having a height which has a tendency to gradually decrease as a distance from said side face increases and which is zero at a position being a predetermined distance away from said side face, said second prism protrusions including a portion in which a groove between adjacent two of said second prism protrusions has a substantially circular-arc-shaped cross section, and said height of said second prism protrusions gradually increasing in a direction from a vicinity of each of both end portions of said linear light source toward a corresponding one of said both end portions of said linear light source, in at least the vicinity of said side face.

68. A light guide plate comprising:

a side face on which light emitted from a linear light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, a large number of second prism protrusions are formed on the other of said emission surface of said light guide plate and said surface opposite to said emission surface of said light guide plate to extend in parallel to such a direction that a distance from said side face increases, and are arranged along the side face, and said second prism protrusions have a height which has a tendency to gradually decrease as a distance from said side face increases and which is zero at a position being a predetermined distance away from said side face.

69. A light guide plate as set forth in claim 68, wherein said second prism protrusions include a portion in which a groove between adjacent two of said second prism protrusions has a substantially circular-arc-shaped cross section.

70. A light guide plate as set forth in claim 68 or 69, wherein said second prism protrusions have a height which gradually increases in a direction from a vicinity of each of both end portions of said linear light source toward a corresponding one of said both end portions of said linear light source, in at least the vicinity of said side face.

71. A light guide plate as set forth in claim 68 or 69, wherein part of said first prism protrusions on the side of said side face include a portion in which a groove between adjacent two of said first prism protrusions has a substantially circular-arc-shaped cross section.

72. A light guide plate as set forth in claim 68 or 69, wherein said second prism protrusions have a height which gradually increases in a direction from a vicinity of each of both end portions of said linear light source toward a corresponding one of said both end portions of said linear light source, in at least the vicinity of said side face, and part of said first prism protrusions on the side of said side face include a portion in which a groove between adjacent two of said first prism protrusions has a substantially circular-arc-shaped cross section.

73. A light guide plate as set forth in claim 68 or 69, wherein said first prism protrusions have a height which gradually increases in a direction from a vicinity of each of both end portions of said linear light source toward a corresponding one of said both end portions of said linear light source, in at least the vicinity of said side face.

74. A light guide plate as set forth in claim 68 or 69, wherein said second prism protrusions have a height which gradually increases in a direction from a vicinity of each of both end portions of said linear light source toward a corresponding one of said both end portions of said linear light source, in at least the vicinity of said side face, and said first prism protrusions have a height which gradually increases in a direction from a vicinity of each of both end portions of said linear light source toward a corresponding one of said both end portions of said linear light source, in at least the vicinity of said side face.

75. A light guide plate as set forth in claim 68 or 69, wherein said second prism protrusions have a height which gradually increases in a direction from a vicinity of each of both end portions of said linear light source toward a corresponding one of said both end portions of said linear light source, in at least the vicinity of said side face, part of said first prism protrusions on the side of said side face include a portion in which a groove between adjacent two of said first prism protrusions has a substantially circular-arc-shaped cross section, and said first prism protrusions have a height which gradually increases in a direction from a vicinity of each of both end portions of said linear light source toward a corresponding one of said both end portions of said linear light source, in at least the vicinity of said side face.

76. A light guide plate comprising:

a side face on which light emitted from a linear light source is incident; and an emission surface for allowing the light, which is incident on said side face to be propagated through said light guide plate, to leave said light guide plate when an angle of incidence of the light on said emission surface is a critical angle or less while the light is propagated, wherein a large number of first prism protrusions are formed on one of said emission surface of said light guide plate and a surface opposite to said emission surface of said light guide plate to extend in parallel to such a direction that a distance from said side face increases, and are arranged along the side face, part of said first prism protrusions on the side of said side face have a height having a tendency to gradually decrease as a distance from said side face decreases, a roughened surface capable of irregularly reflecting or diffusing light is formed on at least one of said emission surface of said light guide plate and said surface opposite to said emission surface of said light guide plate, and part of said first prism protrusions on the side of said side face include a portion in which a groove between adjacent two of said first prism protrusions has a substantially circular-arc-shaped cross section.

77. An image display unit comprising:

a surface light source device as set forth in any one of claims 1, 2, 3, 9, 10, 17, through 22, 45, 46, 52, 53 and 20 through 60; and a member to be illuminated, light emitted from said surface light source device illuminating a plane of said member.

78. A surface light source device comprising:

a light guide plate having a side face and an emission surface;

a light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated; and a large number of prism protrusions which are formed on one of said emission surface of said light guide plate and a surface opposite to said emission surface of said light guide plate and which are arranged along the side face, said one of the emission surface of the light guide plate and the surface opposite to the emission surface of the light guide plate being formed by a first portion, which is arranged on the side of said side face, and a second portion except for said first portion, said prism protrusions extending in said first and second portions in parallel to such a direction that a distance from said side face increases, wherein said prism protrusions extending in said first portion have a height having a tendency to gradually decrease from a maximum height as a distance from said side face decreases, and said prism protrusions extending in said second portion have a substantially constant height in said direction, said substantially constant height being substantially equal to said maximum height.

79. A surface light source device as set forth in claim 78, wherein said prism protrusions extend in directions substantially perpendicular to said side face.

80. A surface light source device as set forth in claim 78, wherein said prism protrusions extend to an edge of a surface which faces said side face and which is opposite to said side face.

81. A surface light source device as set forth in claim 78, wherein said light source is a point light source or a linear light source.

82. A surface light source device as set forth in claim 78, wherein said prism protrusions extending in said second portion have a substantially triangular sectional shape.

83. A light guide plate comprising:

a side face on which light emitted from a light source is incident;

an emission surface for allowing the light, which is incident on said side face to be propagated through said light guide plate, to leave said light guide plate when an angle of incidence of the light on said emission surface is a critical angle or less while the light is propagated;

a large number of prism protrusions which are formed on one of said emission surface of said light guide plate and a surface opposite to said emission surface of said light guide plate and which are arranged along the side face, said one of the emission surface of the light guide plate and the surface opposite to the emission surface of the light guide plate being formed by a first portion, which is arranged on the side of said side face, and a second portion except for said first portion, said prism protrusions extending in said first and second portions in parallel to such a direction that a distance from said side face increases, wherein said prism protrusions extending in said first portion have a height having a tendency to gradually decrease from a maximum height as a distance from said side face decreases, and said prism protrusions extending in said second portion have a substantially constant height in said direction, said substantially constant height being substantially equal to said maximum height.

84. A light guide plate as set forth in claim 83, wherein said prism protrusions extend in directions substantially perpendicular to said side face.

85. A light guide plate as set forth in claim 83, wherein said prism protrusions extend to an edge of a surface which faces said side face and which is opposite to said side face.

86. A light guide plate as set forth in claim 83, wherein said light source is a point light source or a linear light source.

87. A light guide plate as set forth in claim 83, wherein said prism protrusions extending in said second portion have a substantially triangular sectional shape.

88. A surface light source device comprising:

a light guide plate having a side face and an emission surface;

a light source, arranged on said side face of said light guide plate, for emitting light which enters said light guide plate to be propagated through said light guide and which leaves said emission surface of said light guide plate when an angle of incidence of the light on said emission surface is a critical angle or less while the light is propagated; and a large number of prism protrusions which are formed on one of said emission surface of said light guide plate and a surface opposite to said emission surface of said light guide plate and which are arranged along the side face, said prism protrusions extending in parallel to each other and in directions substantially perpendicular to said side face, wherein each of said prism protrusions has a height having a tendency to gradually increase from a first point, which is spaced from said side face by a predetermined distance, to a second point, said height being substantially constant from said second point to a third point which is further from said side face than said second point.

89. A surface light source device as set forth in claim 88, wherein said third point is a point on an edge of a surface which faces said side face and which is opposite to said side face.

90. A surface light source device as set forth in claim 88, wherein said predetermined distance is zero.

91. A light guide plate comprising:

a side face on which light emitted from a light source is incident;

an emission surface for allowing the light, which is incident on said side face to be propagated through said light guide plate, to leave said light guide plate when an angle of incidence of the light on said emission surface is a critical angle or less while the light is propagated;

a large number of prism protrusions which are formed on one of said emission surface of said light guide plate and a surface opposite to said emission surface of said light guide plate and which are arranged along the side face, said prism protrusions extending in parallel to each other and in directions substantially perpendicular to said side face, wherein each of said prism protrusions has a height having a tendency to gradually increase from a first point, which is spaced from said side face by a predetermined distance, to a second point, said height being substantially constant from said second point to a third point which is further from said side face than said second point.

92. A light guide plate as set forth in claim 91, wherein said third point is a point on an edge of a surface which faces said side face and which is opposite to said side face.

93. A light guide plate as set forth in claim 91, wherein said predetermined distance is zero.

* * * * *